US012718518B2

(12) United States Patent
Bava et al.

(10) Patent No.: US 12,718,518 B2
(45) Date of Patent: Aug. 25, 2026

(54) MULTI-RESOLUTION IN SITU DECODING

(71) Applicant: 10x Genomics, Inc., Pleasanton, CA (US)

(72) Inventors: Felice Alessio Bava, Rome (IT); David Hoffman, Pleasanton, CA (US); Elijah Roberts, Pleasanton, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 250 days.

(21) Appl. No.: 18/737,862

(22) Filed: Jun. 7, 2024

(65) Prior Publication Data

US 2024/0331348 A1 Oct. 3, 2024

Related U.S. Application Data

(63) Continuation of application No. PCT/US2022/081298, filed on Dec. 9, 2022.

(Continued)

(51) Int. Cl.
*G06K 9/00* (2022.01)
*G06T 3/40* (2006.01)

(Continued)

(52) U.S. Cl.
CPC ................ *G06V 10/60* (2022.01); *G06T 3/40* (2013.01); *G06T 7/70* (2017.01); *G06V 10/19* (2022.01); *G06V 20/693* (2022.01)

(58) Field of Classification Search
USPC ........ 382/100, 103, 115, 128–129, 156, 168, 382/181, 254, 305, 312; 700/245;

(Continued)

(56) References Cited

U.S. PATENT DOCUMENTS 5,635,352 A * 6/1997 Urdea .................. C12Q 1/6813 435/808
5,695,940 A 12/1997 Drmanac et al.

(Continued)

FOREIGN PATENT DOCUMENTS

WO WO 2017/143155 8/2017
WO WO 2019/199579 10/2019

(Continued)

OTHER PUBLICATIONS

Ali et al. "Rolling circle amplification: a versatile tool for chemical biology, materials science and medicine." *Chemical Society Reviews* 43.10 (2014): 3324-3341.

(Continued)

*Primary Examiner* — Seyed H Azarian
(74) *Attorney, Agent, or Firm* — MORRISON & FOERSTER LLP

(57) ABSTRACT

Methods and systems for performing multi-resolution in situ decoding are described. The method may comprise, for example, acquiring at least one first image of a biological sample at a first optical resolution; identifying locations for a plurality of target analytes based on the at least one first image; acquiring at least one second image of the biological sample at a second optical resolution in at least one decoding cycle of a plurality of decoding cycles used for in situ decoding of the target analytes; and extracting signal intensity data for signals associated with all or a portion of the target analytes from the at least one second image based on the locations for the target analytes identified in the at least one first image. In some instances, the method may further comprise using the signal intensity data extracted from the at least one second image to decode the target analytes.

25 Claims, 13 Drawing Sheets
(8 of 13 Drawing Sheet(s) Filed in Color)

Related U.S. Application Data

(60) Provisional application No. 63/288,230, filed on Dec. 10, 2021.

(51) Int. Cl.
*G06T 7/70* (2017.01)
*G06V 10/10* (2022.01)
*G06V 10/60* (2022.01)
*G06V 20/69* (2022.01)

(58) Field of Classification Search
USPC .................................................. 435/7.5, 808
See application file for complete search history.

(56) References Cited

U.S. PATENT DOCUMENTS 6,054,274 A 4/2000 Sampson et al.
6,265,552 B1* 7/2001 Schatz ................ C07K 1/1077 435/7.5
6,291,187 B1 9/2001 Kingsmore et al.
6,306,597 B1 10/2001 Macevicz
6,323,009 B1 11/2001 Lasken et al.
6,344,329 B1 2/2002 Lizardi et al.
6,368,801 B1 4/2002 Faruqi
6,534,266 B1 3/2003 Singer
6,828,109 B2 12/2004 Kaplan et al.
7,255,994 B2 8/2007 Lao
7,264,929 B2 9/2007 Rothberg et al.
7,345,159 B2 3/2008 Ju et al.
7,473,767 B2 1/2009 Dimitrov
7,534,991 B2 5/2009 Miller et al.
7,544,794 B1 6/2009 Benner
7,555,155 B2 6/2009 Levenson et al.
7,566,537 B2 7/2009 Balasubramanian et al.
7,632,641 B2 12/2009 Dirks et al.
7,655,898 B2 2/2010 Miller
7,893,227 B2* 2/2011 Wu ....................... C07H 19/20 536/25.32
7,910,304 B2 3/2011 Drmanac
7,941,279 B2 5/2011 Hwang et al.
7,989,166 B2 8/2011 Koch et al.
8,124,751 B2 2/2012 Pierce et al.
8,199,999 B2 6/2012 Hoyt et al.
8,268,554 B2 9/2012 Schallmeiner
8,330,087 B2 12/2012 Domenicali
8,415,102 B2 4/2013 Geiss et al.
8,431,691 B2 4/2013 McKernan et al.
8,460,865 B2 6/2013 Chee et al.
8,462,981 B2 6/2013 Determan et al.
8,481,258 B2 7/2013 Church et al.
8,519,115 B2 8/2013 Webster et al.
8,551,710 B2 10/2013 Bernitz et al.
8,632,975 B2 1/2014 Vander Horn et al.
8,658,361 B2 2/2014 Wu et al.
8,771,950 B2 7/2014 Church et al.
8,986,926 B2 3/2015 Ferree et al.
9,201,063 B2 12/2015 Sood et al.
9,273,349 B2 3/2016 Nguyen et al.
9,371,563 B2 6/2016 Geiss et al.
9,371,598 B2 6/2016 Chee
9,376,717 B2 6/2016 Gao et al.
9,541,504 B2 1/2017 Hoyt
9,551,032 B2 1/2017 Landegren et al.
9,624,538 B2 4/2017 Church et al.
9,650,406 B2 5/2017 Zhou et al.
9,714,446 B2 7/2017 Webster et al.
9,714,937 B2 7/2017 Dunaway
9,727,810 B2 8/2017 Fodor et al.
9,778,155 B2 10/2017 Gradinaru et al.
9,783,841 B2 10/2017 Nolan et al.
9,909,167 B2 3/2018 Samusik et al.
10,032,064 B2 7/2018 Hoyt
10,059,990 B2 8/2018 Boyden et al.
10,126,242 B2 11/2018 Miller et al.
10,179,932 B2 1/2019 Church et al.
10,227,639 B2 3/2019 Levner et al.
10,246,700 B2 4/2019 Dunaway et al.
10,266,888 B2 4/2019 Daugharthy et al.
10,267,808 B2 4/2019 Cai
10,309,879 B2 6/2019 Chen et al.
10,317,321 B2 6/2019 Tillberg et al.
10,364,457 B2 7/2019 Wassie et al.
10,370,698 B2 8/2019 Nolan et al.
10,415,080 B2 9/2019 Dunaway et al.
10,457,980 B2 10/2019 Cai et al.
10,465,235 B2 11/2019 Gullberg et al.
10,494,662 B2 12/2019 Church et al.
10,495,554 B2 12/2019 Deisseroth et al.
10,501,777 B2 12/2019 Beechem et al.
10,501,791 B2 12/2019 Church et al.
10,510,435 B2 12/2019 Cai et al.
10,526,649 B2 1/2020 Chen et al.
10,545,075 B2 1/2020 Deisseroth et al.
10,550,429 B2 2/2020 Harada et al.
10,580,128 B2 3/2020 Miller
10,640,816 B2 5/2020 Beechem et al.
10,640,826 B2 5/2020 Church et al.
10,669,569 B2 6/2020 Gullberg et al.
10,746,981 B2 8/2020 Tomer et al.
10,774,372 B2 9/2020 Chee et al.
10,774,374 B2 9/2020 Frisén et al.
10,794,802 B2 10/2020 Gradinaru et al.
10,802,262 B2 10/2020 Tomer et al.
10,815,519 B2 10/2020 Husain et al.
10,829,814 B2 11/2020 Fan et al.
10,844,426 B2 11/2020 Daugharthy et al.
10,858,698 B2 12/2020 Church et al.
10,872,679 B2 12/2020 Cai et al.
10,964,001 B2 3/2021 Miller
11,021,737 B2 6/2021 Church et al.
11,174,281 B1 11/2021 Graham et al.
11,287,422 B2 3/2022 Previte et al.
11,354,803 B1* 6/2022 Sughrue ................. G16H 30/20
11,434,525 B2 9/2022 Glezer
11,459,603 B2 10/2022 Tyagi et al.
11,499,185 B2 11/2022 Vijayan et al.
11,643,679 B2 5/2023 Glezer et al.
11,999,999 B2 6/2024 Ju et al.
2006/0234261 A1 10/2006 Pierce et al.
2009/0198374 A1* 8/2009 Tsai ...................... G16H 40/67 700/245
2011/0223585 A1 9/2011 Gullberg et al.
2013/0288249 A1 10/2013 Gullbert
2013/0323729 A1 12/2013 Landegren et al.
2014/0194311 A1 7/2014 Gullberg et al.
2016/0108458 A1 4/2016 Frei et al.
2016/0305856 A1 10/2016 Boyden et al.
2016/0376642 A1 12/2016 Landegren et al.
2017/0009278 A1 1/2017 Söderberg et al.
2017/0081489 A1 3/2017 Rodriques et al.
2017/0101672 A1 4/2017 Luo et al.
2017/0205615 A1* 7/2017 Vaziri ................ G02B 21/0072
2017/0220733 A1 8/2017 Zhuang et al.
2017/0253918 A1 9/2017 Kohman
2018/0052081 A1 2/2018 Kohman
2018/0080876 A1 3/2018 Rockel et al.
2018/0208967 A1 7/2018 Larman et al.
2018/0237864 A1 8/2018 Imler et al.
2018/0320226 A1 11/2018 Church et al.
2019/0017106 A1 1/2019 Frisen et al.
2019/0032128 A1 1/2019 Chen et al.
2019/0055594 A1 2/2019 Samusik et al.
2019/0106733 A1 4/2019 Kishi et al.
2019/0112599 A1 4/2019 Church et al.
2019/0119735 A1 4/2019 Deisseroth et al.
2019/0155835 A1 5/2019 Daugharthy et al.
2019/0161796 A1 5/2019 Hauling et al.
2019/0177718 A1 6/2019 Church et al.
2019/0177800 A1 6/2019 Boutet et al.
2019/0194709 A1 6/2019 Church et al.
2019/0218608 A1 7/2019 Daugharthy et al.
2019/0249248 A1 8/2019 Beechem et al.
2019/0264270 A1 8/2019 Zhuang et al.

(56) References Cited

U.S. PATENT DOCUMENTS

2019/0271028 A1 9/2019 Khafizov et al.
2019/0276881 A1 9/2019 Zhuang et al.
2019/0339203 A1 11/2019 Miller et al.
2019/0367969 A1 12/2019 Belhocine
2019/0376956 A1 12/2019 Bobrow et al.
2020/0010891 A1 1/2020 Beechem et al.
2020/0071751 A1 3/2020 Daugharthy et al.
2020/0123597 A1 4/2020 Daniel
2020/0140920 A1 5/2020 Pierce et al.
2020/0224243 A1 7/2020 Desai et al.
2020/0224244 A1 7/2020 Nilsson et al.
2020/0239946 A1 7/2020 Dewal
2020/0277663 A1* 9/2020 Ramachandran .... C12Q 1/6837
2020/0354774 A1 11/2020 Church et al.
2020/0354782 A1 11/2020 Dewal
2020/0362398 A1 11/2020 Kishi et al.
2020/0393343 A1 12/2020 Kennedy-Darling et al.
2020/0399689 A1 12/2020 Luo et al.
2021/0017587 A1 1/2021 Cai et al.
2021/0115504 A1 4/2021 Cai et al.
2021/0238662 A1 8/2021 Bava
2021/0238674 A1 8/2021 Bava
2021/0254140 A1 8/2021 Stahl et al.
2021/0262018 A1 8/2021 Bava et al.
2021/0277460 A1 9/2021 Bava
2021/0340621 A1 11/2021 Daugharthy et al.
2021/0388423 A1 12/2021 Bava et al.
2021/0388424 A1 12/2021 Bava
2022/0049302 A1 2/2022 Daugharthy et al.
2022/0049303 A1 2/2022 Busby et al.
2022/0083832 A1 3/2022 Shah
2022/0084628 A1 3/2022 Shah
2022/0084629 A1 3/2022 Shah
2022/0136049 A1 5/2022 Bava et al.
2022/0186300 A1 6/2022 Bava
2022/0195498 A1 6/2022 Kuhnemund et al.
2022/0213529 A1 7/2022 Kuhnemund et al.
2022/0228200 A1 7/2022 Bava
2022/0235403 A1 7/2022 Costa
2022/0282306 A1 9/2022 Bava et al.
2022/0282316 A1 9/2022 Bava
2022/0282319 A1 9/2022 Verheyen
2022/0292674 A1* 9/2022 Braman ................ G16H 30/20
2022/0372570 A1 11/2022 Costa
2022/0380838 A1 12/2022 Kuhnemund et al.
2022/0403458 A1 12/2022 Bava
2023/0002808 A1 1/2023 Mignardi
2023/0012607 A1 1/2023 Kuhnemund et al.
2023/0013775 A1 1/2023 Chen et al.
2023/0015226 A1 1/2023 Chen et al.
2023/0026886 A1 1/2023 Chen
2023/0031305 A1 2/2023 Neuta et al.
2023/0031996 A1 2/2023 Neuta et al.
2023/0035685 A1 2/2023 Neuta et al.
2023/0037182 A1 2/2023 Bava et al.
2023/0039148 A1 2/2023 Verheyen
2023/0041485 A1 2/2023 Neuta et al.
2023/0044650 A1 2/2023 Dockter
2023/0057571 A1 2/2023 Costa et al.
2023/0061542 A1 3/2023 Kuhnemund
2023/0084407 A1 3/2023 Neuta et al.
2023/0159997 A1 5/2023 Belhocine et al.
2023/0160794 A1 5/2023 Dockter et al.
2023/0183787 A1 6/2023 Bava et al.
2023/0242974 A1 8/2023 Costa et al.
2023/0279465 A1 9/2023 He et al.
2023/0279475 A1 9/2023 Kuhnemund et al.
2023/0279480 A1 9/2023 Kuhnemund
2023/0287478 A1 9/2023 Bava
2023/0314327 A1 10/2023 Hoffman
2023/0314328 A1 10/2023 Costa
2023/0323427 A1 10/2023 Schnall-Levin
2023/0323430 A1 10/2023 Shastry
2023/0323437 A1 10/2023 Chen et al.
2023/0374573 A1 11/2023 Qian et al.
2023/0374580 A1 11/2023 Costa
2023/0416821 A1 12/2023 Bava et al.
2024/0002902 A1 1/2024 Jakobsen et al.
2024/0026426 A1 1/2024 Bava
2024/0026427 A1 1/2024 Kuhnemund et al.
2024/0026439 A1 1/2024 Sasaki
2024/0026448 A1 1/2024 Costa
2024/0035070 A1 2/2024 Christopherson
2024/0035071 A1 2/2024 Delaney et al.
2024/0035072 A1 2/2024 Christopherson
2024/0043910 A1 2/2024 Shastry
2024/0043914 A1 2/2024 Chen et al.
2024/0060119 A1 2/2024 Bava
2024/0084373 A1 3/2024 Shastry
2024/0084378 A1 3/2024 Marks et al.
2024/0101978 A1 3/2024 Boghospor et al.
2024/0132938 A1 4/2024 Kuhnemund
2024/0141418 A1 5/2024 Mielinis
2024/0150816 A1 5/2024 Feng et al.
2024/0158852 A1 5/2024 Belhocine et al.
2024/0167081 A1 5/2024 Bava et al.
2024/0175082 A1 5/2024 Costa
2024/0175083 A1 5/2024 Bava et al.
2024/0191297 A1 6/2024 Christopherson et al.
2024/0209330 A1 6/2024 Shastry et al.
2024/0218424 A1 7/2024 Costa et al.
2024/0218437 A1 7/2024 Belhocine et al.

FOREIGN PATENT DOCUMENTS

WO WO 2019/236841 12/2019
WO WO 2020/076976 4/2020
WO WO 2020/076979 4/2020
WO WO 2020/096687 5/2020
WO WO 2020/099640 5/2020
WO WO 2020/102094 5/2020
WO WO 2020/117914 6/2020
WO WO 2020/123316 6/2020
WO WO 2020/123742 6/2020
WO WO 2020/142490 7/2020
WO WO 2020/163397 8/2020
WO WO 2020/240025 12/2020
WO WO 2020/254519 12/2020
WO WO 2021/067475 4/2021
WO WO 2021/123282 6/2021
WO WO 2021/123286 6/2021
WO WO 2021/127019 6/2021
WO WO 2021/138676 7/2021
WO WO 2021/155063 8/2021
WO WO 2021/168326 8/2021
WO WO 2023/108139 6/2023
WO WO 2023/141476 7/2023
WO WO 2023/172915 9/2023
WO WO 2023/192302 10/2023
WO WO 2024/148300 7/2024

OTHER PUBLICATIONS

Appella et al., "Non-natural nucleic acids for synthetic biology," Curr Opin Chem Biol. (2009) 13(5-6):687-96.

Archer et al., "Selective and flexible depletion of problematic sequences from RNA-seq libraries at the cDNA stage," BMC Genomics. (2014) 15(1):401.

Asp et al., "Spatially Resolved Transcriptomes-Next Generation Tools for Tissue Exploration," Bioessays. (2020) 42(10):e1900221.

Baner et al., "Signal amplification of padlock probes by rolling circle replication," Nucleic Acids Res. (1998) 26(22):5073-5078.

Bibikova et al., "Quantitative gene expression profiling in formalin-fixed, paraffin-embedded tissues using universal bead arrays," Am J Pathol. Nov. 2004;165(5): 1799-807.

Bolognesi et al., "Multiplex Staining by Sequential Immunostaining and Antibody Removal on Routine Tissue Sections," J. Histochem. Cytochem. (2017); 65(8): 431-444.

Buschmann et al., "Levenshtein error-correcting barcodes for multiplexed DNA sequencing," BMC Bioinformatics. (2013) 11:14:272.

Capodieci et al., "Gene expression profiling in single cells within tissue," Nat Methods. (2005) 2(9): 663-5.

(56) References Cited

OTHER PUBLICATIONS

Chemeris et al., "Real-time hybridization chain reaction," Dokl Biochem Biophys. (2008) 419: 53-55.
Chen et al., "Nanoscale imaging of RNA with expansion microscopy," Nat Methods. (2016) 13:679-684.
Chen et al., "Expansion Microscopy," Science (2015) 347(6221):543-548.
Choi et al., "Programmable in situ amplification for multiplexed imaging of mRNA expression," Nat Biotechnol. (2010) 28(11): 1208-1212.
Combs et al., "Fluorescence Microscopy: A Concise Guide to Current Imaging Methods," Curr Protoc Neurosci. (2017) 79:2.1.1-2.1.25.
Conze et al., "Single molecule analysis of combinatorial splicing," Nucleic Acids Res. (2010) 38(16): e163.
Dean et al., "Rapid Amplification of Plasmid and Phage DNA Using Phi29 DNA Polymerase and Multiply-Primed Rolling Circle Amplification," Genome Research (2001) 11:1095-1099.
Dirks et al., "Triggered amplification by hybridization chain reaction," Proc Natl Acad Sci USA. (2004) 101(43): 15275-15278.
Duffy et al., "Modified nucleic acids: replication, evolution, and next-generation therapeutics," BMC Biol. Sep. 2, 2020;18(1):112.
Dutta et al., "Electroosmotic flow control in complex microgeometries," in Journal of Microelectromechanical Systems, (2002) 11(1); 36-44.
Fang et al., "Fluoride-Cleavable Biotinylation Phosphoramidite for 5'-end-Labelling and Affinity Purification of Synthetic Oligonucleotides," Nucleic Acids Res. (2003) 31(2): 708-715.
Faruqi et al., "High-throughput genotyping of single nucleotide polymorphisms with rolling circle amplification," BMC Genomics. (2001) 2:4.
Femino et al., "Visualization of single RNA transcripts in situ," Science. (1998) 280(5363): 585-90.
Gale et al., "A Review of Current Methods in Microfluidic Device Fabrication and Future Commercialization Prospects," Inventions 2018, 3(3), 60; 25 pages.
Gavrilovic et al., "Automated classification of multicolored rolling circle products in dual-channel wide-field fluorescence microscopy," Cytometry A. (2011) 79(7): 518-27.
Geiss et al., "Direct multiplexed measurement of gene expression with color-coded probe pairs," Nat Biotechnol. (2008) 26(3): 317-25.
Ghosal, S. "Fluid mechanics of electroosmotic flow and its effect on band broadening in capillary electrophoresis," Electrophoresis. (2004) 25(2):214-28.
Glass et al., "SIMPLE: a sequential immunoperoxidase labeling and erasing method," J Histochem Cytochem. (2009) 57(10); 899-905.
Goh, J.J.L et al. (Jul. 2020, e-pub. Jun. 15, 2020). "Highly Specific Multiplexed RNA Imaging In Tissues With Split-FISH," Nat Methods 17(7):689-693. doi: 10.1038/s41592-020-0858-0. Epub Jun. 15, 2020.
Goransson et al., "A single molecule array for digital targeted molecular analyses," Nucleic Acids Res. 2009 37(1):e7. doi: 10.1093/nar/gkn921.
Gunderson et al. "Decoding randomly ordered DNA arrays." Genome research 14.5 (2004): 870-877.
Gyllborg et al., "Hybridization-based in situ sequencing (HybISS) for spatially resolved transcriptomics in human and mouse brain tissue," Nucleic Acids Res. (2020) 48(19):e112.
Han et al., "Quantum-dot-tagged microbeads for multiplexed optical coding of biomolecules," Nat Biotechnol. (2001) 19(7): 631-5.
Itzkovitz et al., "Single-molecule transcript counting of stem-cell markers in the mouse intestine," Nat Cell Biol. (2011) 14(1): 106-14.
Itzkovitz et al., "Validating Transcripts with Probes and Imaging Technology," Nat Methods. (2011) 8(4 Suppl): S12-S19.
Jagadeesan, et al. "An Efficient Image Downsampling Technique Using Genetic Algorithm and Discrete Wavelet Transform", Journal of Theoretical and Applied Information Technology. (2014) 61(3):506-514.
Jamur et al., "Permeabilization of cell membranes," Method Mol. Biol. (2010) 588: 63-66 (abstract only).
Ke et al., "Fourth Generation of Next-Generation Sequencing Technologies: Promise and Consequences," Hum Mutat. (2016) 37(12):1363-1367.
Ke et al., "In situ sequencing for RNA analysis in preserved tissue and cells," Nat Methods. (2013) 10(9):857-60.
Lagunavicius et al., "Novel application of Phi29 DNA polymerase: RNA detection and analysis in vitro and in situ by target RNA-primed RCA," RNA. (2009) 15(5):765-71.
Larsson et al. "In situ detection and genotyping of individual mRNA molecules," Nat Methods. (2010) 7(5):395-397.
Levsky et al., "Fluorescence in situ hybridization: past, present and future," J Cell Sci. (2003) 116(Pt 14): 2833-8.
Levsky et al., "Single-cell gene expression profiling," Science. (2002) 297(5582): 836-40.
Lin et al., "Highly multiplexed imaging of single cells using a high-throughput cyclic immunofluorescence method," Nat Commun. (2015) 6:8390.
Liu et al. Barcoded oligonucleotides ligated on RNA amplified for multiplexed and parallel in situ analyses. Nucleic Acids Res. (2021) 49(10):e58, 15 pages. doi: 10.1093/nar/gkab120.
Lizardi et al., "Mutation detection and single-molecule counting using isothermal rolling-circle amplification," Nat Genet. (1998) 19(3): 225-232.
Lubeck et al., "Single-cell in situ RNA profiling by sequential hybridization," Nature Methods. (2014) 11; 360-361.
Maierhorfer et al., "Multicolor deconvolution microscopy of thick biological specimens," Am J Pathol. (2003) 162(2): 373-9.
McGinn et al., "New technologies for DNA analysis—a review of the READNA Project," N Biotechnol. (2016) 33(3): 311-30. doi: 10.1016/j.nbt.2015.10.003.
Meade et al. "Multiplexed DNA detection using spectrally encoded porous SiO2 photonic crystal particles," Anal Chem. (2009) 81(7): 2618-25.
Mertz, "Strategies for Volumetric Imaging with a Fluorescence Microscope", Optica. (2019) 6(10):1261-1268.
Miralles et al., "A Review of Heating and Temperature Control in Microfluidic Systems: Techniques and Applications," Diagnostics (Basel). 2013 3(1): 33-67.
Moffitt et al., "RNA Imaging with Multiplexed Error-Robust Fluorescence In Situ Hybridization (MERFISH)," Methods in Enzymology, (2016) 572; 1-49.
Mohsen et al., "The Discovery of Rolling Circle Amplification and Rolling Circle Transcription," Acc Chem Res. (2016) 49(11): 2540-2550.
Moor et al., "Spatial Transcriptomics: Paving the Way for Tissue-Level Systems Biology", Current Opinion in Biotechnology (2016) 46:126-133.
Murphy et al.. "Fundamentals of Light Microscopy and Electronic Imaging, Second Edition" Fundamentals of Light Microscopy and Electronic Imaging, Second Edition, Oct. 30, 2012 (Oct. 30, 2012), XP055394230, Hoboken, New Jersey; ISBN: 978-0-471-69214-0; 35 pages [retrieved on Jul. 27, 2017].
Nallur et al., "Signal amplification by rolling circle amplification on DNA microarrays," Nucleic Acids Res. (2001) 29(23): e118.
Niu et al., "Fluorescence detection for DNA using hybridization chain reaction with enzyme-amplification," Chem Commun (Camb). (2010) 46(18): 3089-3091.
Partel et al., "Graph-based image decoding for multiplexed in situ RNA detection," 2020 25th International Conference on Pattern Recognition (ICPR), IEEE, Jan. 10, 2021; 8 pages.
Payne et al. "In situ genome sequencing resolves DNA sequence and structure in intact biological samples," Science. (2021) 371(6532): eaay3446. doi: 10.1126/science.aay3446. Epub Dec. 31, 2020.
Pirici et al., "Antibody elution method for multiple immunohistochemistry on primary antibodies raised in the same species and of the same subtype," J Histochem Cytochem. (2009) 57(6); 567-75.
Power et al., A guide to light-sheet fluorescence microscopy for multiscale imaging. Nat Methods. (2017) 14(4):360-373.
Raj et al., "Imaging individual mRNA molecules using multiple singly labeled probes," Nat Methods. (2008) 5(10): 877-879.

(56) References Cited

OTHER PUBLICATIONS

Rouhanifard et al. "ClampFISH detects individual nucleic acid molecules using click chemistry-based amplification," Nat Biotechnol. (2018) 17 pages. doi: 10.1038/nbt.4286.
Sankaran et al., "Simultaneous spatiotemporal super-resolution and multi-parametric fluorescence microscopy," Nat Commun. (2021) 12(1):1748.
Schweitzer et al. "Immunoassays with rolling circle DNA amplification: A versatile platform for ultrasensitive antigen detection," Proc. Natl Acad. Sci. USA (2000) 97:10113-119.
Schweitzer et al., "Multiplexed protein profiling on microarrays by rolling-circle amplification," Nature Biotech. (2002) 20:359-365.
Soares et al., "Rolling Circle Amplification in Integrated Microsystems: An Uncut Gem toward Massively Multiplexed Pathogen Diagnostics and Genotyping," Acc Chem Res. (2021) 54(21):3979-3990.
Song et al., "Hybridization chain reaction-based aptameric system for the highly selective and sensitive detection of protein," Analyst. (2012) 137(6):1396-1401.
Sun et al., "Composite organic-inorganic nanoparticles as Raman labels for tissue analysis," Nano Lett. (2007) 7(2): 351-6.
Takei et al., (Feb. 2021, e-pub Jan. 27, 2021). "Integrated Spatial Genomics Reveals Global Architecture of Single Nuclei," Nature 590(7845): 344-350, 53 pages. doi: 10.1038/s41586-020-03126-2.
Vandernoot et al., "cDNA normalization by hydroxyapatite chromatography to enrich transcriptome diversity in RNA-seq applications," Biotechniques, (2012) 53(6) 373-80.
Wählby et al., "Sequential immunofluorescence staining and image analysis for detection of large numbers of antigens in individual cell nuclei," Cytometry. (2002) 47(1): 32-41.
Weibrecht et al., "Simultaneous visualization of both signaling cascade activity and end-point gene expression in single cells," PLoS One. (2011) 6(5): e20148.
Wilson et al., "Encoded microcarriers for high-throughput multiplexed detection," Angew Chem Int Ed Engl. (2006) 18;45(37): 6104-17.
Wu, C. et al. "RollFISh Achieves Robust Quantification of Single-Molecule RNA Biomarkers in Paraffin-Embedded Tumor Tissue Samples," Commun Biol. (2018) 1:(209): 1-8. doi: 10.1038/s42003-018-0218-0.
Xia et al. "Multiplexed detection of RNA using MERFISH and branched DNA amplification." Scientific reports 9.1 (2019): 1-13.
Zhang et al., "Interpolation-Dependent Image Downsampling," in IEEE Transactions on Image Processing. (2011) 20(11); 3291-3296.
Zhao et al., "Advances of multiplex and high throughput biomolecular detection technologies based on encoding microparticles," Sci China Chem. (2011) 54(8):1185.
Zhao et al., "Rolling circle amplification: applications in nanotechnology and biodetection with functional nucleic acids," Angew Chem Int Ed Engl. (2008) 47(34): 6330-7. (Abstract and Supporting Information only).

* cited by examiner

MULTI-RESOLUTION IN SITU DECODING

CROSS-REFERENCE TO RELATED APPLICATIONS

This application is a continuation of International Application No. PCT/US2022/081298, filed on Dec. 9, 2022, which claims the benefit of U.S. Provisional Patent Application No. 63/288,230, filed Dec. 10, 2021, the contents each of which are incorporated herein by reference in their entirety.

FIELD OF THE DISCLOSURE

The present disclosure relates generally to methods, devices, and systems for detection and analysis of fluorescent light signals, and more specifically to multi-resolution imaging techniques for use in performing in situ decoding of light signals in an instrument having integrated optics and fluidics modules (e.g., an in situ analysis system).

BACKGROUND OF THE DISCLOSURE

In situ detection and analysis methods are emerging from the rapidly developing field of spatial transcriptomics. The key objectives in spatial transcriptomics are to detect, quantify, and map gene activity to specific regions in a tissue sample at cellular or sub-cellular resolution. These techniques allow one to study the subcellular distribution of gene activity (as evidenced, e.g., by expressed gene transcripts), and have the potential to provide crucial insights in the fields of developmental biology, oncology, immunology, histology, etc.

In situ decoding is a process comprising a plurality of decoding cycles in each of which a different set of barcode probes (e.g., fluorescently-labeled oligonucleotides) is contacted with target analytes (e.g., mRNA sequences) or with target barcodes (e.g., nucleic acid barcodes) associated with the target analytes present in a sample (e.g., a tissue sample) under conditions that promote hybridization. One or more images (e.g., fluorescence images) are acquired in each decoding cycle, and the images are processed to detect the presence and locations of one or more barcode probes in each cycle. The presence and locations of one or more target analyte sequences or associated barcode sequences are then inferred based on the set of, e.g., fluorescence signals detected in each decoding cycle of the decoding process.

The precision with which the locations of features (e.g., labeled barcode probes bound to target analyte sequences or their associated barcode sequence) can be detected, and the ability to distinguish between two neighboring features in the image, are limited by the numerical aperture (NA) of the imaging instrument and/or by the pixel size of the image sensor (if the pixel size is larger than the optical limit imposed by the objective lens of the imaging instrument). The overall throughput for the decoding process, or the rate at which a given area of sample (e.g., a tissue specimen) can be decoded, is proportional to the field of view of the imaging instrument, which typically decreases with higher NA, therefore the ability of an imaging instrument to resolve closely-spaced features is inversely related to the resulting decoding throughput. For samples such as tissue specimens that comprise densely packed features, one currently has to sacrifice either the ability to resolve the closely-spaced features or the throughput of the decoding process. Thus there remains a need for methods which enable high resolution discrimination of closely-spaced features while maintaining high throughput for the decoding process.

SUMMARY OF THE DISCLOSURE

Disclosed herein are methods and systems that overcome both the image resolution and decoding speed limitations described above. The method works by extracting feature location information from a high resolution image, and using the feature location information to extract feature data, such as signal intensity data, from lower resolution images. In some embodiments, the high resolution image is acquired during a high resolution imaging cycle. Imaging during subsequent decoding cycles may then be performed either using a lower NA objective or a larger field of view. The high resolution feature location data is then used during processing of the low resolution images to calculate a given feature's fluorescence intensity in a given decoding cycle with an accuracy beyond what would be possible using the under-sampled image alone. The methods provide speed and data storage advantages similar to those obtained by using only low-resolution imaging, while providing feature location accuracy similar to that obtained by high-resolution imaging.

Disclosed herein are methods comprising: acquiring at least one first image of a biological sample at a first optical resolution; identifying locations for a plurality of target analytes based on the first image; acquiring at least one second image of the biological sample at a second optical resolution in at least one decoding cycle of a plurality of decoding cycles used for in situ decoding of the plurality of target analytes; and extracting feature data, e.g. signal intensity data, associated with all or a portion of the plurality of target analytes from the at least one second image based on the locations for the plurality of target analytes identified in the at least one first image.

In some embodiments, the first optical resolution is higher than the second optical resolution. In some embodiments, the first optical resolution is the same as the second optical resolution, and the at least one second image is computationally downsampled during or after acquisition to achieve a lower optical resolution.

In some embodiments, the method further comprises using feature data, e.g., signal intensity data, extracted from the at least one second image to decode the plurality of target analytes. In some embodiments, the target analytes comprise barcoded target analytes. In some embodiments, the at least one first image acquired at the first optical resolution is acquired independently of the plurality of decoding cycles. In some embodiments, the at least one first image acquired at the first optical resolution is acquired as part of a decoding cycle. In some embodiments, the at least one first image acquired at the first optical resolution is acquired after acquiring the at least one second image at the second optical resolution in at least one decoding cycle.

In some embodiments, locations for all target analytes of the plurality of target analytes are identified based on the at least one first image. In some embodiments, feature data, e.g. signal intensity data, for signals associated with all of the plurality of target analytes, is extracted from at least one second image.

In some embodiments, a ratio of the first optical resolution to the second optical resolution is at least 2×. In some embodiments, a ratio of the first optical resolution to the second optical resolution is at least 5×. In some embodiments, a ratio of the first optical resolution to the second optical resolution is at least 10×.

In some embodiments, the method comprises acquiring the at least one first image using a first objective lens, and acquiring the at least one second image using a second objective lens. In some embodiments, the method comprises acquiring the at least one first image using a first tube lens, and acquiring the at least one second image with a second tube lens. In some embodiments, the method comprises acquiring the at least one first image using a first image sensor, and acquiring the at least one second image by performing on-chip downsampling of the first image sensor.

Disclosed herein are methods comprising: obtaining at least one first image of a biological sample; identifying locations for a plurality of target analytes based on the at least one first image; obtaining at least one second image of the biological sample in at least one decoding cycle of a plurality of decoding cycles used for in situ decoding of the plurality of target analytes, wherein the second image is processed and downsampled; and extracting feature data associated with all or a portion of the plurality of target analytes from the at least one second image based on the locations for the plurality of target analytes identified in the at least one first image. In some embodiments, the at least one second image is acquired at a same optical resolution as the at least one first image. In some embodiments, the at least one second image is generated by processing and downsampling an initial second image acquired at a same optical resolution as the first image. In some embodiments, the feature data comprises signal intensity data.

In some embodiments of any of the methods disclosed herein, the at least one first image comprises signals detected from a plurality of probes associated with all target analytes. In some embodiments, the method further comprises performing a reverse transcription reaction to create cDNA copies of the plurality of target analytes prior to acquiring the at least one first image. In some embodiments, the method further comprises contacting the plurality of target analytes, or cDNA copies thereof, with a plurality of primary probes configured to hybridize to target analytes, or to cDNA copies thereof, prior to acquiring the at least one first image. In some embodiments, a primary probe of the plurality of primary probes comprises a barcode sequence that is unique for given target analyte. In some embodiments, a primary probe of the plurality of primary probes further comprises an anchor probe binding sequence. In some embodiments, the method further comprises performing rolling circle amplification (RCA) of the plurality of target analytes, or cDNA copies thereof, using the plurality of primary probes as primers to create rolling circle amplification products (RCPs). In some embodiments, the method further comprises contacting the rolling circle amplification products (RCPs) with a plurality of detectably labeled anchor probes configured to hybridize to anchor probe binding sequences within at least a portion of the RCPs prior to acquiring the at least one first image. In some embodiments, the plurality of detectably labeled anchor probes is configured to hybridize to anchor probe binding sequences within all of the RCPs. In some embodiments, the method further comprises contacting the rolling circle amplification products (RCPs) with a plurality of bridge probes configured to hybridize to barcode sequences within at least a portion of the RCPs in a first decoding cycle prior to acquiring the at least one first image. In some embodiments, the method further comprises contacting the hybridized bridge probes within at least a portion of the rolling circle amplification products (RCPs) with a plurality of detectably labeled detection probes configured to hybridize to the hybridized bridge probes in a first decoding cycle prior to acquiring the at least one first image.

In some embodiments, the method further comprises performing a plurality of decoding cycles, each comprising: contacting the rolling circle amplification products (RCPs) with a plurality of bridge probes configured to hybridize to barcode sequences within at least a portion of the RCPs; contacting the hybridized bridge probes with a plurality of detectably labeled detection probes; and acquiring one or more of the at least one second image. In some embodiments, the plurality of detectably labeled detection probes is different for at least two of the decoding cycles of the plurality of decoding cycles.

In some embodiments, the method comprises acquiring the at least one first image after contacting the biological sample with a mixture of detectably labeled detection probes that generates signals associated with all target analytes to be resolved in one or more decoding cycles. In some embodiments, the mixture of detectably labeled detection probes comprises two or more detectably labeled detection probes that are each configured to bind to a different target analyte or portion thereof. In some embodiments, the mixture of detectably labeled detection probes comprises two or more detectably labeled detection probes that are each configured to bind to a different target analyte or portion thereof, and wherein each detectably labeled detection probe is labeled with at least one of a plurality of labels.

In some embodiments, the method further comprises acquiring two or more first images at the first optical resolution to ensure that every barcoded target analyte of the plurality is resolved in at least one of the two or more first images. In some embodiments, each image of the two or more first images is acquired after contacting the biological sample with a different mixture of detectably labeled detection probes such that all target analytes are resolved in at least one of the two or more first images. In some embodiments, each second image is acquired after contacting the biological sample with a different mixture of detectably labeled detection probes such that all target analytes are resolved in at least one of a plurality of second images acquired in the plurality of decoding cycles. In some embodiments, one or more first images are acquired after contacting the biological sample with a different subset of detectably labeled detection probes that are selected according to a relative gene expression level for a corresponding target gene transcript. In some embodiments, each second image is acquired after contacting the biological sample with a different subset of detectably labeled detection probes that are selected according to a relative gene expression level for a corresponding barcoded target gene transcript.

In some embodiments, one or more first images are acquired after contacting the biological sample with a mixture of detectably labeled detection probes, and then removing unbound detectably labeled detection probes. In some embodiments, the unbound detectably labeled detection probes are removed by washing.

In some embodiments, the method further comprises acquiring two or more first images at the first optical resolution at two or more time points and using the two or more first images to correct for deformation of the tissue specimen.

In some embodiments, the extraction of feature data, e.g., signal intensity data, from the at least one second image comprises identifying a region of interest (ROI) in the at least one second image for each location of a target analyte identified in the first image. In some embodiments, the extraction of feature data, e.g., signal intensity data, from the at least one second image further comprises determining a signal intensity for each region of interest (ROI) identified in the at least one second image.

In some embodiments, the method further comprises acquiring a series of first images at the first optical resolution. In some embodiments, the series of first images comprises a series of images acquired in different detection channels. In some embodiments, the series of first images comprises a series of images acquired of different fields of view. In some embodiments, a focal plane of each image in the series of first images is offset relative to focal planes for other images in the series of first images in a direction parallel to an optical axis of an imaging system used to acquire the series of first images. In some embodiments, the series of first images comprises a z-stack of images. In some embodiments, the at least one second image comprises a single two-dimensional image having a larger depth of field than that for the series of first images, and wherein feature data, e.g. signal intensity data, for signals associated with all or a portion of the plurality of target analytes are extracted from the single second image based on two-dimensional coordinates of the locations for the plurality of target analytes identified in the series of first images. In some embodiments, the at least one second image comprises a larger depth of field than that for the series of first images, and wherein feature data, e.g., signal intensity data, for signals associated with all or a portion of the plurality of target analytes are extracted from the at least one second image based on three-dimensional coordinates of the locations for the plurality of target analytes identified in the series of first images. In some embodiments, the extraction of feature data, e.g., signal intensity data, from the at least one second image comprises use of the three-dimensional coordinates of the locations for the plurality of barcoded target analytes to deconvolve the at least one second image.

In some embodiments, at least one first image and at least one second image are acquired and processed to: (i) identify locations for a plurality of target analytes, and (ii) extract feature data, e.g., signal intensity data, for signals associated with all or a portion of target analytes identified in the at least one first image, without saving the at least one first image or at least one second image. In some embodiments, at least one first image and at least one second image are acquired and saved, and subsequently processed to (i) identify locations for a plurality of target analytes, and (ii) extract feature data, e.g., signal intensity data, for signals associated with all or a portion of target analytes identified in the at least one first image.

In some embodiments, at least one first image comprises a bright-field image, the at least one second image comprises a fluorescence image, and the signals comprise fluorescence signals. In some embodiments, the first and second images comprise fluorescence images, and the signals comprise fluorescence signals. In some embodiments, the at least one first and at least one second images are acquired using a multichannel fluorescence imaging system.

Also disclosed herein are methods comprising: contacting a biological sample with a plurality of primary probes configured to hybridize to a plurality of target analytes, wherein each primary probe comprises a target analyte-specific barcode sequence and an anchor probe binding sequence; performing in situ rolling circle amplification (RCA) to produce a plurality of rolling circle amplification produces (RCPs) within the biological sample, each RCP comprising multiple copies of a target analyte sequence, a target analyte-specific barcode sequence, and an anchor probe binding sequence; contacting the plurality of RCPs within the biological sample with a first detectably labeled anchor probe configured to hybridize to anchor probe binding sequences present in all RCPs of the plurality of RCPs; acquiring at least one first image of the biological sample at a first optical resolution; identifying locations for the plurality of target analytes based on the locations of the plurality of labeled RCPs in the at least one first image; removing the first detectably labeled anchor probe; for each of a plurality of decoding cycles, performing the steps of: contacting the plurality of RCPs within the biological sample with a plurality of bridge probes, each configured to hybridize to a target analyte-specific barcode sequence present within the plurality of RCPs; contacting the hybridized bridge probes with a plurality of detectably labeled detection probes, each configured to hybridize to one or more bridge probes of the plurality of hybridized bridge probes; acquiring at least one second image of the biological sample at a second optical resolution, wherein the first optical resolution is higher than the second optical resolution; and removing the detectably labeled detection probes and bridge probes; extracting feature data, e.g., signal intensity data, for signals associated with all or a portion of the plurality of target analytes from the at least one second image based on the locations for the plurality of labeled RCPs identified in the at least one first image, wherein the signals associated with all or a portion of the plurality of target analytes may be different for different decoding cycles; and using the feature data, e.g., signal intensity data, extracted from the at least one second image to decode the plurality of target analytes. In some embodiments, the plurality of bridge probes may be different for different decoding cycles. In some embodiments, the plurality of detectably labeled detection probed may be different for different decoding cycles.

Disclosed herein are methods comprising: contacting a biological sample with a plurality of primary probes configured to hybridize to a plurality of target analytes, wherein each primary probe comprises a target analyte-specific barcode sequence; performing in situ rolling circle amplification (RCA) to produce a plurality of rolling circle amplification products (RCPs) within the biological sample, each RCP comprising multiple copies of a target analyte sequence, and a target analyte-specific barcode sequence; in at least one decoding cycle of a plurality of decoding cycles, performing the steps of: contacting the plurality of RCPs within the biological sample with a plurality of detectably labeled detection probes configured to hybridize, directly or indirectly, to all RCPs of the plurality of RCPs; acquiring at least one first image of the biological sample at a first optical resolution; identifying locations for the plurality of target analytes based on the locations of the plurality of labeled RCPs in the at least one first image; removing the first detectably labeled detection probe; for each remaining decoding cycle of the plurality of decoding cycles, performing the steps of: contacting the plurality of RCPs within the biological sample with a plurality of bridge probes, each configured to hybridize to a target analyte-specific barcode sequence present within the plurality of RCPs; contacting hybridized bridge probes with a plurality of detectably labeled detection probes, each configured to hybridize to one or more bridge probes of the plurality of hybridized bridge probes; acquiring at least one second image of the biological sample at a second optical resolution, wherein the first optical resolution is higher than the second optical resolution; removing the detectably labeled detection probes and bridge probes; extracting feature data, e.g., signal intensity data, for signals associated with all or a portion of the plurality of target analytes from the at least one second image based on the locations for the plurality of labeled RCPs identified in the at least one first image, wherein the signals associated with all or a portion of the plurality of target analytes may be different for different decoding cycles; and using the feature data, e.g., signal intensity data, extracted from the at least one second image to decode the plurality of target analytes. In some embodiments, the plurality of bridge probes may be different for different decoding cycles. In some embodiments, the plurality of second detectably labeled detection probes may be different for different decoding cycles. In some embodiments, the at least one second image is generated by processing and downsampling an initial second image acquired at a same optical resolution as the at least one first image.

Disclosed herein are systems comprising: one or more processors; and a memory communicatively coupled to the one or more processors and configured to store instructions that, when executed by the one or more processors, cause the system to: acquire at least one first image of a biological sample at a first optical resolution; identify locations for a plurality of target analytes based on the first image; acquire at least one second image of the biological sample at a second optical resolution in at least one decoding cycle of a plurality of decoding cycles used for in situ decoding of the plurality of target analytes, wherein the first optical resolution is higher than the second optical resolution; and extract feature data, e.g., signal intensity data, for signals associated with all or a portion of the plurality of target analytes from the at least one second image based on the locations for the plurality of target analytes identified in the at least one first image.

Disclosed herein are systems comprising: one or more processors; and a memory communicatively coupled to the one or more processors and configured to store instructions that, when executed by the one or more processors, cause the system to: acquire at least one first image of a biological sample at a first optical resolution; identify locations for a plurality of target analytes based on the first image; acquire at least one second image of the biological sample at a second optical resolution in at least one decoding cycle of a plurality of decoding cycles used for in situ decoding of the plurality of target analytes, wherein the at least one second image is generated by processing and downsampling an initial second image acquired at the first optical resolution; and extract signal intensity data for signals associated with all or a portion of the plurality of target analytes from the at least one second image based on the locations for the plurality of target analytes identified in the at least one first image.

In some embodiments, the instructions further cause the systems disclosed herein to use feature data, e.g., signal intensity data, extracted from the at least one second image to decode the plurality of target analytes. In some embodiments, the system further comprises an imaging module. In some embodiments, the system is configured to acquire the at least one first image using a first objective lens, and to acquire the at least one second image using a second objective lens. In some embodiments, the system is configured to acquire the at least one first image using a first tube lens, and to acquire the at least one second image using a second tube lens. In some embodiments, the system is configured to acquire the at least one first image using a first image sensor, and to acquire the at least one second image by performing on-chip downsampling of the first image sensor.

Also disclosed herein are systems comprising: one or more processors; an imaging module comprising: at least two objective lenses or tube lenses; one or more image sensors; and a memory communicatively coupled to the one or more processors and configured to store instructions that, when executed by the one or more processors, cause the system to: acquire at least one first image of a biological sample at a first optical resolution; identify locations for a plurality of target analytes based on the at least one first image; acquire at least one second image of the biological sample at a second optical resolution in at least one decoding cycle of a plurality of decoding cycles used for in situ decoding of the plurality of target analytes, wherein the first optical resolution is higher than the second optical resolution; and extract feature data, e.g., signal intensity data, for signals associated with all or a portion of the plurality of target analytes from the at least one second image based on the locations for the plurality of target analytes identified in the first image.

Disclosed herein are systems comprising: one or more processors; an imaging module comprising: at least two objective lenses or tube lenses; one or more image sensors; and a memory communicatively coupled to the one or more processors and configured to store instructions that, when executed by the one or more processors, cause the system to: acquire at least one first image of a biological sample at a first optical resolution; identify locations for a plurality of target analytes based on the first image; acquire at least one second image of the biological sample at a second optical resolution in at least one decoding cycle of a plurality of decoding cycles used for in situ decoding of the plurality of target analytes, wherein the at least one second image is generated by processing and downsampling an initial second image acquired at the first optical resolution; and extract signal intensity data for signals associated with all or a portion of the plurality of target analytes from the at least one second image based on the locations for the plurality of target analytes identified in the first image.

In some embodiments, the instructions further cause the systems disclosed herein to use the feature data, e.g., signal intensity data, extracted from the at least one second image to decode the plurality of target analytes.

Disclosed herein are non-transitory computer-readable storage media storing one or more programs, the one or more programs comprising instructions, which when executed by one or more processors of a system, cause the system to: acquire at least one first image of a biological sample at a first optical resolution; identify locations for a plurality of barcoded target analytes based on the first image; acquire at least one second image of the biological sample at a second optical resolution in at least one decoding cycle of a plurality of decoding cycles used for in situ decoding of the plurality of target analytes, wherein the first optical resolution is higher than the second optical resolution; and extract feature data, e.g., signal intensity data, for signals associated with all or a portion of the plurality of barcoded target analytes from the at least one second image based on the locations for the plurality of barcoded target analytes identified in the first image.

Disclosed herein are non-transitory computer-readable media storing one or more programs, the one or more programs comprising instructions, which when executed by one or more processors of a system, cause the system to: acquire at least one first image of a biological sample at a first optical resolution; identify locations for a plurality of barcoded target analytes based on the first image; acquire at least one second image of the biological sample at a second optical resolution in at least one decoding cycle of a plurality of decoding cycles used for in situ decoding of the plurality of target analytes, wherein the at least one second image is generated by processing and downsampling an initial second image acquired at the first optical resolution; and extract signal intensity data for signals associated with all or a portion of the plurality of barcoded target analytes from the at least one second image based on the locations for the plurality of barcoded target analytes identified in the first image.

In some embodiments, the instructions further cause the systems to use the feature data, e.g. signal intensity data, extracted from the at least one second image to decode the plurality of barcoded target analytes.

Disclosed herein are methods comprising: receiving at least one high-resolution image of a sample during at least a first cycle of fluorescent probing of the sample, wherein the at least one high-resolution image comprises a first plurality of light signals representing a plurality of probes bound to a plurality of analytes within the sample; determining first positional information of the first plurality of light signals from the at least one high-resolution image; receiving at least one low-resolution image of the sample during at least a second cycle of fluorescent probing of the sample; and determining a second plurality of light signals within the at least one low-resolution image based on the first positional information, wherein the second plurality of light signals comprises two or more colors.

In some embodiments, the at least a first cycle comprises an anchor cycle. In some embodiments, the at least a first cycle comprises two or more probing cycles, wherein the first plurality of light signals comprises two or more colors. In some embodiments, the at least a second cycle comprises a probing cycle. In some embodiments, the at least one high-resolution image comprises a plurality of high-resolution images. In some embodiments, the plurality of high-resolution images comprises at least one z-stack of images, wherein each z-stack of images represents a volume of the sample. In some embodiments, receiving the at least one low-resolution image comprises: receiving at least one additional high-resolution image during the at least a second cycle of fluorescent probing; and generating the at least one low-resolution image by downsampling the at least one additional high-resolution image. In some embodiments, the at least one low-resolution image comprises a resolution of about 0.50 μm/pixel to about 0.80 μm/pixel. In some embodiments, the at least one low-resolution image comprises a resolution of about 0.60 μm/pixel to about 0.70 μm/pixel. In some embodiments, the at least one low-resolution image comprises a resolution of about 0.64 μm/pixel. In some embodiments, the at least one high-resolution image comprises a resolution of about 0.10 μm/pixel to about 0.30 μm/pixel. In some embodiments, the at least one high-resolution image comprises a resolution of about 0.10 μm/pixel to about 0.20 μm/pixel. In some embodiments, the at least one high-resolution image comprises a resolution of about 0.16 μm/pixel. In some embodiments, the method further comprises determining at least one codeword based on the first plurality of light signals and the second plurality of light signals. In some embodiments, the method further comprises assigning transcript based on the determined codeword. In some embodiments, the sample comprises a biological sample. In some embodiments, the sample comprises a tissue.

Disclosed herein are systems comprising: at least one image database; a computing node comprising at least one computer-readable storage medium having program instructions stored thereon, the program instructions executable by at least one processor of the computing system to cause the at least one processor to perform a method comprising: receiving, from the at least one image database, at least one high-resolution image of a sample during at least a first cycle of fluorescent probing of the sample, wherein the at least one high-resolution image comprises a first plurality of light signals representing a plurality of probes bound to a plurality of analytes within the sample; determining first positional information of the first plurality of light signals from the at least one high-resolution image; receiving, from the at least one image database, at least one low-resolution image of the sample during at least a second cycle of fluorescent probing of the sample; and determining a second plurality of light signals within the at least one low-resolution image based on the first positional information, wherein the second plurality of light signals comprises two or more colors.

In some embodiments, the at least a first cycle comprises an anchor cycle. In some embodiments, the at least a first cycle comprises two or more probing cycles, wherein the first plurality of light signals comprises two or more colors. In some embodiments, the at least a second cycle comprises a probing cycle. In some embodiments, the at least one high-resolution image comprises a plurality of high-resolution images. In some embodiments, the plurality of high-resolution images comprises at least one z-stack of images, wherein each z-stack of images represents a volume of the sample. In some embodiments, receiving the at least one low-resolution image comprises: receiving at least one additional high-resolution image during the at least a second cycle of fluorescent probing; and generating the at least one low-resolution image by downsampling the at least one additional high-resolution image. In some embodiments, the at least one low-resolution image comprises a resolution of about 0.50 μm/pixel to about 0.80 μm/pixel. In some embodiments, the at least one low-resolution image comprises a resolution of about 0.60 μm/pixel to about 0.70 μm/pixel. In some embodiments, the at least one low-resolution image comprises a resolution of about 0.64 μm/pixel. In some embodiments, the at least one high-resolution image comprises a resolution of about 0.10 μm/pixel to about 0.30 μm/pixel. In some embodiments, the at least one high-resolution image comprises a resolution of about 0.10 μm/pixel to about 0.20 μm/pixel. In some embodiments, the at least one high-resolution image comprises a resolution of about 0.16 μm/pixel. In some embodiments, the program instructions further comprising determining at least one codeword based on the first plurality of light signals and the second plurality of light signals. In some embodiments, the program instructions further comprise assigning transcript based on the determined codeword. In some embodiments, the sample comprises a biological sample. In some embodiments, the sample comprises a tissue.

Disclosed herein are computer program products comprising a computer readable storage medium having program instructions embodied therewith, the program instructions executable by a processor to cause the processor to perform a method comprising: receiving at least one high-resolution image of a sample during at least a first cycle of fluorescent probing of the sample, wherein the at least one high-resolution image comprises a first plurality of light signals representing a plurality of probes bound to a plurality of analytes within the sample; determining first positional information of the first plurality of light signals from the at least one high-resolution image; receiving at least one low-resolution image of the sample during at least a second cycle of fluorescent probing of the sample; and determining a second plurality of light signals within the at least one low-resolution image based on the first positional information, wherein the second plurality of light signals comprises two or more colors.

In some embodiments, the at least a first cycle comprises an anchor cycle. In some embodiments, the at least a first cycle comprises two or more probing cycles, wherein the first plurality of light signals comprises two or more colors. In some embodiments, the at least a second cycle comprises a probing cycle. In some embodiments, the at least one high-resolution image comprises a plurality of high-resolution images. In some embodiments, the plurality of high-resolution images comprises at least one z-stack of images, wherein each z-stack of images represents a volume of the sample. In some embodiments, receiving the at least one low-resolution image comprises: receiving at least one additional high-resolution image during the at least a second cycle of fluorescent probing; and generating the at least one low-resolution image by downsampling the at least one additional high-resolution image. In some embodiments, the at least one low-resolution image comprises a resolution of about 0.50 μm/pixel to about 0.80 μm/pixel. In some embodiments, the at least one low-resolution image comprises a resolution of about 0.60 μm/pixel to about 0.70 μm/pixel. In some embodiments, the at least one low-resolution image comprises a resolution of about 0.64 μm/pixel. In some embodiments, the at least one high-resolution image comprises a resolution of about 0.10 μm/pixel to about 0.30 μm/pixel. In some embodiments, the at least one high-resolution image comprises a resolution of about 0.10 μm/pixel to about 0.20 μm/pixel. In some embodiments, the at least one high-resolution image comprises a resolution of about 0.16 μm/pixel. In some embodiments, the computer program product further comprises determining at least one codeword based on the first plurality of light signals and the second plurality of light signals. In some embodiments, the computer program product further comprises assigning transcript based on the determined codeword.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of the disclosed methods, devices, and systems are set forth with particularity in the appended claims. A better understanding of the features and advantages of the disclosed methods, devices, and systems will be obtained by reference to the following detailed description of illustrative embodiments and the accompanying drawings, of which:

DETAILED DESCRIPTION

Figure 1:
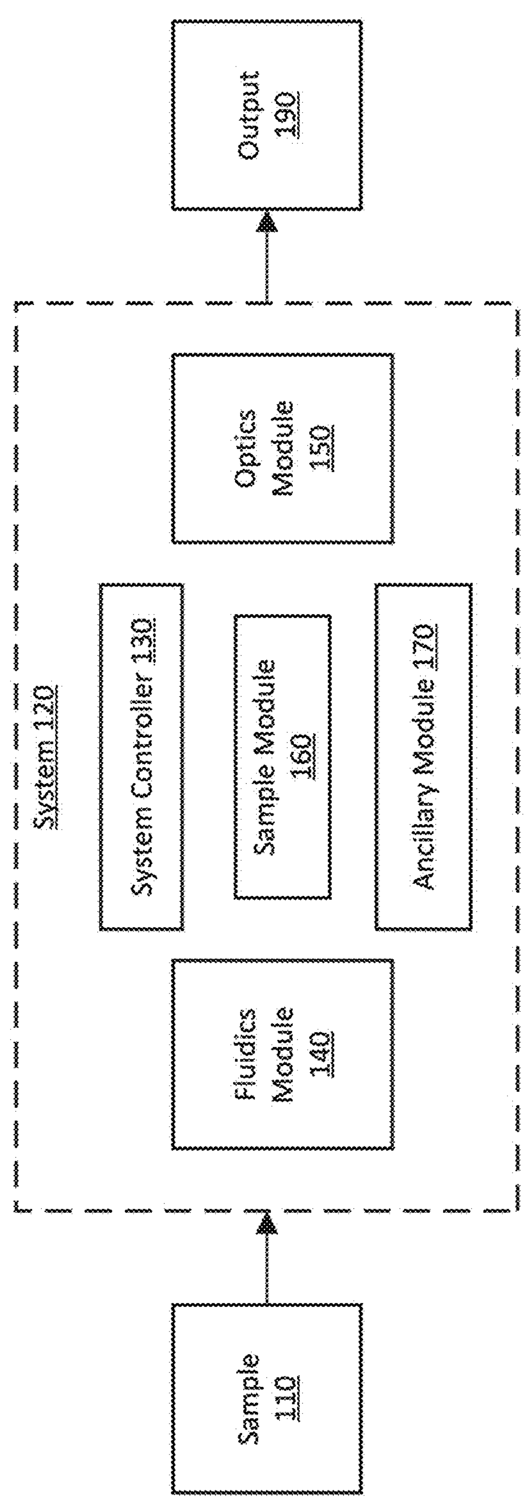
FIG. 1 is an example workflow of analysis of a biological sample (e.g., a cell or tissue sample) using an opto-fluidic instrument, according to various embodiments.

Target molecules (e.g., nucleic acids, proteins, antibodies, etc.) can be detected in biological samples (e.g., one or more cells or a tissue sample) using an instrument having integrated optics and fluidics modules (an "opto-fluidic instrument" or "opto-fluidic system"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, and/or the like.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample from a mammal. A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a check swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids needed for establishing the experimental conditions required for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

FIG. 1 shows an example workflow of analysis of a biological sample 110 (e.g., cell or tissue sample) using an opto-fluidic instrument 120, according to various embodiments. In various embodiments, the sample 110 can be a biological sample (e.g., a tissue) that includes molecules such as DNA, RNA, proteins, antibodies, etc. For example, the sample 110 can be a sectioned tissue that is treated to access the RNA thereof for labeling with circularizable DNA probes. Ligation of the probes may generate a circular DNA probe which can be enzymatically amplified and bound with fluorescent oligonucleotides, which can create bright signal that is convenient to image and has a high signal-to-noise ratio.

In various embodiments, the sample 110 may be placed in the opto-fluidic instrument 120 for analysis and detection of the molecules in the sample 110. In various embodiments, the opto-fluidic instrument 120 can be a system configured to facilitate the experimental conditions conducive for the detection of the target molecules. For example, the opto-fluidic instrument 120 can include a fluidics module 140, an optics module 150, a sample module 160, and an ancillary module 170, and these modules may be operated by a system controller 130 to create the experimental conditions for the probing of the molecules in the sample 110 by selected probes (e.g., circularizable DNA probes), as well as to facilitate the imaging of the probed sample (e.g., by an imaging system of the optics module 150). In various embodiments, the various modules of the opto-fluidic instrument 120 may be separate components in communication with each other, or at least some of them may be integrated together.

In various embodiments, the sample module 160 may be configured to receive the sample 110 into the opto-fluidic instrument 120. For instance, the sample module 160 may include a sample interface module (SIM) that is configured to receive a sample device (e.g., cassette) onto which the sample 110 can be deposited. That is, the sample 110 may be placed in the opto-fluidic instrument 120 by depositing the sample 110 (e.g., the sectioned tissue) on a sample device that is then inserted into the SIM of the sample module 160. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along the two-dimensional (2D) plane of the opto-fluidic instrument 120.

The experimental conditions that are conducive for the detection of the molecules in the sample 110 may depend on the target molecule detection technique that is employed by the opto-fluidic instrument 120. For example, in various embodiments, the opto-fluidic instrument 120 can be a system that is configured to detect molecules in the sample 110 via hybridization of probes. In such cases, the experimental conditions can include molecule hybridization conditions that result in the intensity of hybridization of the target molecule (e.g., nucleic acid) to a probe (e.g., oligonucleotide) being significantly higher when the probe sequence is complementary to the target molecule than when there is a single-base mismatch. The hybridization conditions include the preparation of the sample 110 using reagents such as washing/stripping reagents, hybridizing reagents, etc., and such reagents may be provided by the fluidics module 140.

In various embodiments, the fluidics module 140 may include one or more components that may be used for storing the reagents, as well as for transporting said reagents to and from the sample device containing the sample 110. For example, the fluidics module 140 may include reservoirs configured to store the reagents, as well as a waste container configured for collecting the reagents (e.g., and other waste) after use by the opto-fluidic instrument 120 to analyze and detect the molecules of the sample 110. Further, the fluidics module 140 may also include pumps, tubes, pipettes, etc., that are configured to facilitate the transport of the reagent to the sample device (e.g., and as such the sample 110). For instance, the fluidics module 140 may include pumps ("reagent pumps") that are configured to pump washing/stripping reagents to the sample device for use in washing/stripping the sample 110 (e.g., as well as other washing functions such as washing an objective lens of the imaging system of the optics module 150).

In various embodiments, the ancillary module 170 can be a cooling system of the opto-fluidic instrument 120, and the cooling system may include a network of coolant-carrying tubes that are configured to transport coolants to various modules of the opto-fluidic instrument 120 for regulating the temperatures thereof. In such cases, the fluidics module 140 may include coolant reservoirs for storing the coolants and pumps (e.g., "coolant pumps") for generating a pressure differential, thereby forcing the coolants to flow from the reservoirs to the various modules of the opto-fluidic instrument 120 via the coolant-carrying tubes. In some instances, the fluidics module 140 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the fluidics module 140 may also include cooling fans that are configured to force air (e.g., cool and/or ambient air) into the returning coolant reservoirs to cool the heated coolants stored therein. In some instance, the fluidics module 140 may also include cooling fans that are configured to force air directly into a component of the opto-fluidic instrument 120 so as to cool said component. For example, the fluidics module 140 may include cooling fans that are configured to direct cool or ambient air into the system controller 130 to cool the same.

As discussed above, the opto-fluidic instrument 120 may include an optics module 150 which include the various optical components of the opto-fluidic instrument 120, such as but not limited to a camera, an illumination module (e.g., LEDs), an objective lens, and/or the like. The optics module 150 may include a fluorescence imaging system that is configured to image the fluorescence emitted by the probes (e.g., oligonucleotides) in the sample 110 after the probes are excited by light from the illumination module of the optics module 150.

In some instances, the optics module 150 may also include an optical frame onto which the camera, the illumination module, and/or the X-Y stage of the sample module 160 may be mounted.

In various embodiments, the system controller 130 may be configured to control the operations of the opto-fluidic instrument 120 (e.g., and the operations of one or more modules thereof). In some instances, the system controller 130 may take various forms, including a processor, a single computer (or computer system), or multiple computers in communication with each other. In various embodiments, the system controller 130 may be communicatively coupled with data storage, set of input devices, display system, or a combination thereof. In some cases, some or all of these components may be considered to be part of or otherwise integrated with the system controller 130, may be separate components in communication with each other, or may be integrated together. In other examples, the system controller 130 can be, or may be in communication with, a cloud computing platform.

In various embodiments, the opto-fluidic instrument 120 may analyze the sample 110 and may generate the output 190 that includes indications of the presence of the target molecules in the sample 110. For instance, with respect to the example embodiment discussed above where the opto-fluidic instrument 120 employs a hybridization technique for detecting molecules, the opto-fluidic instrument 120 may cause the sample 110 to undergo successive rounds of fluorescent probe hybridization (using two or more sets of fluorescent probes, where each set of fluorescent probes is excited by a different color channel) and be imaged to detect target molecules in the probed sample 110. In such cases, the output 190 may include optical signatures (e.g., a codeword) specific to each gene, which allow the identification of the target molecules.

Disclosed herein are methods and systems that overcome both the image resolution and decoding speed limitations described above. The method works by extracting feature location information from high resolution image(s), and using the feature location information to extract feature data, e.g., signal intensity data from lower resolution image(s). In some instances, one or more high resolution images are acquired during one or more high resolution imaging cycles (e.g., a high resolution image may be acquired either during a first decoding cycle or as part of a dedicated feature location determination cycle). In some instances, imaging during decoding cycles may then be performed either using a lower NA objective or a larger field of view. In some instances, images from decoding cycles may be processed and downsampled. In some instances, the high resolution imaging is performed prior to the lower resolution imaging. In some instances, the high resolution and lower resolution images are the same resolution when acquired, but the second resolution is computationally downsampled (e.g., during or following image acquisition) to a lower resolution. In some instances, imaging during the subsequent decoding cycles may be performed above the Nyquist sampling limit for the optical instrument (i.e., the images may be under-sampled). The high resolution feature location data is then used during processing of the low resolution images to calculate a given feature's fluorescence intensity in a given decoding cycle with an accuracy beyond what would be possible using the under-sampled image alone. In some aspects, image registration may be performed using one or more high resolution image(s).

The methods provide speed and data storage advantages similar to those obtained by using only low-resolution imaging, while providing feature location accuracy similar to that obtained by high-resolution imaging. The methods can also be applied to volumetric imaging, e.g., by performing z-stack imaging only during high-resolution image acquisition, and taking a single z-plane image with a large depth of focus objective when acquiring under-sampled images. The methods can be further improved by using optical and/or biochemical methods for decreasing feature density during high-resolution image acquisition.

In some instances, the methods may comprise, for example, acquiring a first image of a biological sample at a first optical resolution; identifying locations for a plurality of target analytes based on the first image; acquiring a second image of the biological sample at a second optical resolution in at least one decoding cycle of a plurality of decoding cycles used for in situ decoding of the plurality of barcoded target analytes; and extracting feature data, e.g. signal intensity data, for signals associated with all or a portion of the plurality of target analytes from the at least one second image based on the locations for the plurality of target analytes identified in the first image. In some instances, the first optical resolution is higher than the second optical resolution. In some instances, the first optical resolution is the same as the second optical resolution, and the second image is computationally downsampled during or after acquisition to achieve a lower optical resolution. In some instances, the method further comprises using the feature data, e.g. signal intensity data, extracted from the at least one second image to decode the plurality of target analytes.

In some instances, the first image is acquired using a first objective lens, and the at least one second image is acquired using a second objective lens having a different numerical aperture. In some instances, the first image is acquired using a first tube lens, and the at least one second image is acquired using a second tube lens. In some instances, the first image is acquired using a first image sensor (e.g., at full pixel resolution), and the at least one second image is acquired by performing on-chip downsampling of the first image sensor.

In some instances, the method may further comprise acquiring two or more first images at the first optical resolution to ensure that every target analyte of the plurality is visible in at least one of the two or more first images. For example, in some instances, each image of the two or more first images is acquired after iteratively contacting the biological sample with a different subset of a plurality of detectably labeled anchor probes. In some instances, detectably labeled anchor probes can be added simultaneously in the same round or added in separate rounds. In some instances, the iterative labelling is performed using different subsets of detectably labeled anchor probes that are selected according to a relative gene expression level for a corresponding target gene transcript. In some instances, each image of the two or more first images is acquired after labelling the biological sample with a mixture of detectably labeled anchor probes. In some instances, each image of the two or more first images is acquired after contacting the biological sample with a mixture of detectably labeled probes.

General Terminology

Specific terminology is used throughout this disclosure to explain various aspects of the methods, systems, and compositions that are described. Unless otherwise defined, all of the technical terms used herein have the same meaning as commonly understood by one of ordinary skill in the art in the field to which this disclosure belongs.

As used in this specification and the appended claims, the singular forms “a”, “an”, and “the” include plural references unless the context clearly dictates otherwise. For example, “a” or “an” means “at least one” or “one or more”. Any reference to “or” herein is intended to encompass “and/or” unless otherwise stated.

As used herein, the terms “comprising” (and any form or variant of comprising, such as “comprise” and “comprises”), “having” (and any form or variant of having, such as “have” and “has”), “including” (and any form or variant of including, such as “includes” and “include”), or “containing” (and any form or variant of containing, such as “contains” and “contain”), are inclusive or open-ended and do not exclude additional, un-recited additives, components, integers, elements or method steps.

As used herein, the term “about” a number refers to that number plus or minus 10% of that number. The term ‘about’ when used in the context of a range refers to that range minus 10% of its lowest value and plus 10% of its greatest value.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Similarly, use of a), b), etc., or i), ii), etc. does not by itself connote any priority, precedence, or order of steps in the claims. Similarly, the use of these terms in the specification does not by itself connote any required priority, precedence, or order.

The term “platform” (or “system”) may refer to an ensemble of: (i) instruments (e.g., imaging instruments, fluid controllers, temperature controllers, motion controllers and translation stages, etc.), (ii) devices (e.g., specimen slides, substrates, flow cells, microfluidic devices, etc., which may comprise fixed and/or removable or disposable components of the platform), (iii) reagents and/or reagent kits, and (iv) software, or any combination thereof, which allows a user to perform one or more bioassay methods (e.g., analyte detection, in situ detection or sequencing, and/or nucleic acid detection or sequencing) depending on the particular combination of instruments, devices, reagents, reagent kits, and/or software utilized.

The section headings used herein are for organizational purposes only and are not to be construed as limiting the subject matter described.

Barcoding and Decoding Terminology:

A "barcode" is a label, or identifier, that conveys or is capable of conveying information (e.g., information about an analyte in a sample, a cell, a bead, a location, a sample, and/or a capture probe). The term "barcode" may refer either to a physical barcode molecule (e.g., a nucleic acid barcode molecule) or to its representation in a computer-readable, digital format (e.g., as a string of characters representing the sequence of bases in a nucleic acid barcode molecule).

The phrase "barcode diversity" refers to the total number of unique barcode sequences that may be represented by a given set of barcodes.

A physical barcode molecule (e.g., a nucleic acid barcode molecule) that forms a label or identifier as described above. In some instances, a barcode can be part of an analyte, can be independent of an analyte, can be attached to an analyte, or can be attached to or part of a probe that targets the analyte. In some instances, a particular barcode can be unique relative to other barcodes.

Physical barcodes can have a variety of different formats. For example, barcodes can include polynucleotide barcodes, random nucleic acid and/or amino acid sequences, and synthetic nucleic acid and/or amino acid sequences. A physical barcode can be attached to an analyte, or to another moiety or structure, in a reversible or irreversible manner. A physical barcode can be added to, for example, a fragment of a deoxyribonucleic acid (DNA) or ribonucleic acid (RNA) sample before or during sequencing of the sample. In some instances, barcodes can allow for identification and/or quantification of individual sequencing-reads in sequencing-based methods (e.g., a barcode can be or can include a unique molecular identifier or "UMI"). Barcodes can be used to detect and spatially-resolve molecular components found in biological samples, for example, at single-cell resolution (e.g., a barcode can be, or can include, a molecular barcode, a spatial barcode, a unique molecular identifier (UMI), etc.).

In some instances, barcodes may comprise a series of two or more segments or sub-barcodes (e.g., corresponding to "letters" or "code words" in a decoded barcode), each of which may comprise one or more of the subunits or building blocks used to synthesize the physical (e.g., nucleic acid) barcode molecules. For example, a nucleic acid barcode molecule may comprise two or more barcode segments, each of which comprises one or more nucleotides. In some instances, a barcode may comprise at least 1, 2, 3, 4, 5, 6, 7, 8, 9, 10, or more than 10 segments. In some instances, each segment of a barcode molecule may comprise at least 1, 2, 3, 4, 5, 6, 7, 8, 9, 10, 12, 14, 16, 18, 20, or more than 20 subunits or building blocks. For example, each segment of a nucleic acid barcode molecule may comprise at least 1, 2, 3, 4, 5, 6, 7, 8, 9, 10, 12, 14, 16, 18, 20, or more than 20 nucleotides. In some instances, two or more of the segments of a barcode may be separated by non-barcode segments, i.e., the segments of a barcode molecule need not be contiguous.

A "digital barcode" (or "digital barcode sequence") is a representation of a corresponding physical barcode (or target analyte sequence) in a computer-readable, digital format as described above. A digital barcode may comprise one or more "letters" (e.g., 1, 2, 3, 4, 5, 6, 7, 8, 9, 10, 12, 14, 16, 18, 20, or more than 20 letters) or one or more "code words" (e.g., 1, 2, 3, 4, 5, 6, 7, 8, 9, 10, or more than 10 code words), where a "code word" comprises, e.g., 1, 2, 3, 4, 5, 6, 7, 8, 9, 10, 12, 14, 16, 18, 20, or more than 20 letters. In some instances, the sequence of letters or code words in a digital barcode sequence may correspond directly with the sequence of building blocks (e.g., nucleotides) in a physical barcode. In some instances, the sequence of letters or code words in a digital barcode sequence may not correspond directly with the sequence of building blocks in a physical barcode, but rather may comprise, e.g., arbitrary code words that each correspond to a segment of a physical barcode. For example, in some instances, the disclosed methods for decoding and error correction may be applied directly to detecting target analyte sequences (e.g., mRNA sequences) as opposed to detecting target barcodes, and the barcode probes used to detect the target analyte sequences may correspond to letters or code words that have been assigned to specific target analyte sequences but that do not directly correspond to the target analyte sequences.

A "designed barcode" (or "designed barcode sequence") is a barcode (or its digital equivalent; in some instances a designed barcode may comprise a series of code words that can be assigned to gene transcripts and subsequently decoded into a decoded barcode) that meets a specified set of design criteria as required for a specific application. In some instances, a set of designed barcodes may comprise at least 2, at least 5, at least 10, at least 20, at least 40, at least 60, at least 80, at least 100, at least 200, at least 400, at least 600, at least 800, at least 1,000, at least 2,000, at least 4,000, at least 6,000, at least 8,000, at least 10,000, at least 20,000, at least 40,000, at least 60,000, at least 80,000, at least 100,000, at least 200,000, at least 400,000, at least 600,000, at least 800,000, at least 1,000,000, at least $2\times10^6$, at least $3\times10^6$, at least $4\times10^6$, at least $5\times10^6$, at least $6\times10^6$, at least $7\times10^6$, at least $8\times10^6$, at least $9\times10^6$, at least $10^7$, at least $10^8$, at least $10^9$, or more than $10^9$ unique barcodes. In some instances, a set of designed barcodes may comprise any number of designed barcodes within the range of values in this paragraph, e.g., 1,225 unique barcodes or $2.38\times10^6$ unique barcodes. As noted above for barcodes in general, in some instances designed barcodes may comprise two or more segments (corresponding to two or more code words in a decode barcode). In those cases, the specified set of design criteria may be applied to the designed barcodes as a whole, or to one or more segments (or positions) within the designed barcodes.

A "decoded barcode" (or "decoded barcode sequence") is a digital barcode sequence generated via a decoding process that ideally matches a designed barcode sequence, but that may include errors arising from noise in the synthesis process used to create barcodes and/or noise in the decoding process itself. As noted above, in some instances, the disclosed methods for decoding and error correction may be applied directly to detecting target analytes (e.g., mRNA sequences) as opposed to detecting target barcodes, and the barcode probes used to detect the target analytes may correspond to letters or code words that have been assigned to specific target analytes but that do not directly correspond to the target analytes. In these instances, a decoded barcode (i.e., a series of letters or code words) may serve as a proxy for the target analyte.

A "corrected barcode" (or "corrected barcode sequence") is a digital barcode sequence derived from a decoded barcode sequence by applying one or more error correction methods.

Probe Terminology:

The term "probe" may refer either to a physical probe molecule (e.g., a nucleic acid probe molecule) or to its representation in a computer-readable, digital format (e.g., as a string of characters representing the sequence of bases in a nucleic acid probe molecule). A "probe" may be, for example, a molecule designed to recognize (and bind or hybridize to) another molecule, e.g., a target analyte, another probe molecule, etc.

In some instances, a physical probe molecule may comprise one or more of the following: (i) a target recognition element (e.g., an antibody capable of recognizing and binding to a target peptide, protein, or small molecule; an oligonucleotide sequence that is complementary to a target gene sequence or gene transcript; or a poly-T oligonucleotide sequence that is complementary to the poly-A tails on messenger RNA molecules), (ii) a barcode element (e.g., a molecular barcode, a cell barcode, a spatial barcode, and/or a unique molecular identifier (UMI)), (iii) an amplification and/or sequencing primer binding site, (iv) one or more linker regions, (v) one or more detectable tags (e.g., fluorophores), or any combination thereof. In some instances, each component of a probe molecule may comprise at least 1, 2, 3, 4, 5, 6, 7, 8, 9, 10, 12, 14, 16, 18, 20, or more than 20 subunits or building blocks. For example, in some instances, each component of a nucleic acid probe molecule may comprise at least 1, 2, 3, 4, 5, 6, 7, 8, 9, 10, 12, 14, 16, 18, 20, or more than 20 nucleotides.

In some instances, physical probes may bind or hybridize directly to their target. In some instances, physical probes may bind or hybridize indirectly to their target. For example, in some instances, a secondary probe may bind or hybridize to a primary probe, where the primary probe binds or hybridizes directly to the target analyte. In some instances, a tertiary probe may bind or hybridize to a secondary probe, where the secondary probe binds or hybridizes to a primary probe, and where the primary probe binds or hybridizes directly to the target analyte.

Examples of "probes" and their applications include, but are not limited to, primary probes (e.g., molecules designed to recognize and bind or hybridize to target analyte), intermediate probes (e.g., molecules designed to recognize and bind or hybridize to another molecule and provide a hybridization or binding site for another probe (e.g., a detection probe), detection probes (e.g., molecules designed to recognize and bind or hybridize to another molecule, detection probes may be labeled with a fluorophore or other detectable tag). In some instances, a probe may be designed to recognize and bind (or hybridize) to a physical barcode sequence (or segments thereof). In some instances, a probe may be used to detect and decode a barcode, e.g., a nucleic acid barcode. In some instances, a probe may bind or hybridize directly to a target barcode. In some instances, a probe may bind or hybridize indirectly to a target barcode (e.g., by binding or hybridizing to other probe molecules which itself is bound or hybridized to the target barcode).

Nucleic Acid Molecule and Nucleotide Terminology:

The terms "nucleic acid" (or "nucleic acid molecule") and "nucleotide" are intended to be consistent with their use in the art and to include naturally-occurring species or functional analogs thereof. Particularly useful functional analogs of nucleic acids are capable of hybridizing to a nucleic acid in a sequence-specific fashion (e.g., capable of hybridizing to two nucleic acids such that ligation can occur between the two hybridized nucleic acids) or are capable of being used as a template for replication of a particular nucleotide sequence. Naturally-occurring nucleic acids generally have a backbone containing phosphodiester bonds. An analog structure can have an alternate backbone linkage including any of a variety of those known in the art. Naturally-occurring nucleic acids generally have a deoxyribose sugar (e.g., found in deoxyribonucleic acid (DNA)) or a ribose sugar (e.g. found in ribonucleic acid (RNA)).

A nucleic acid can contain nucleotides having any of a variety of analogs of these sugar moieties that are known in the art. A nucleic acid can include natural or non-natural nucleotides. In this regard, a naturally-occurring deoxyribonucleic acid can have one or more bases selected from the group consisting of adenine (A), thymine (T), cytosine (C), or guanine (G), and a ribonucleic acid can have one or more bases selected from the group consisting of uracil (U), adenine (A), cytosine (C), or guanine (G). Useful non-natural bases that can be included in a nucleic acid or nucleotide are known in the art. See, for example, Appella (2009), "Non-Natural Nucleic Acids for Synthetic Biology", *Curr Opin Chem Biol.* 13(5-6): 687-696; and Duffy, et al. (2020), "Modified Nucleic Acids: Replication, Evolution, and Next-Generation Therapeutics", *BMC Biology* 18:112.

Samples:

A sample disclosed herein can be or derived from any biological sample. Methods and compositions disclosed herein may be used for analyzing a biological sample, which may be obtained from a subject using any of a variety of techniques including, but not limited to, biopsy, surgery, and laser capture microscopy (LCM), and generally includes cells and/or other biological material from the subject. In addition to the subjects described above, a biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample, a patient derived organoid (PDO) or patient derived xenograft (PDX). A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic individuals, individuals that have or are suspected of having a disease (e.g., a patient with a disease such as cancer) or a pre-disposition to a disease, and/or individuals in need of therapy or suspected of needing therapy.

The biological sample can include any number of macromolecules, for example, cellular macromolecules and organelles (e.g., mitochondria and nuclei). The biological sample can be a nucleic acid sample and/or protein sample. The biological sample can be a carbohydrate sample or a lipid sample. The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions. In some instances, the biological sample may comprise cells which are deposited on a surface.

Cell-free biological samples can include extracellular macromolecules, e.g., polynucleotides. Extracellular polynucleotides can be isolated from a bodily sample, e.g., blood, plasma, serum, urine, saliva, mucosal excretions, sputum, stool, and tears.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells. Biological samples can also include fetal cells and immune cells.

In some instances, a substrate herein can be any support that is insoluble in aqueous liquid and which allows for positioning of biological samples, analytes, features, and/or reagents (e.g., probes) on the support. In some instances, a biological sample can be attached to a substrate. Attachment of the biological sample can be irreversible or reversible, depending upon the nature of the sample and subsequent steps in the analytical method. In certain instances, the sample can be attached to the substrate reversibly by applying a suitable polymer coating to the substrate, and contacting the sample to the polymer coating. The sample can then be detached from the substrate, e.g., using an organic solvent that at least partially dissolves the polymer coating. In some instances, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

A variety of steps can be performed to prepare or process a biological sample for and/or during an assay. Except where indicated otherwise, the preparative or processing steps described below can generally be combined in any manner and in any order to appropriately prepare or process a particular sample for and/or analysis.

Tissue Sectioning:

A biological sample can be harvested from a subject (e.g., via surgical biopsy, whole subject sectioning) or grown in vitro on a growth substrate or culture dish as a population of cells, and prepared for analysis as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some instances, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., 10-20 μm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 μm. Thicker sections can also be used if desired or convenient, e.g., at least 70, 80, 90, or 100 μm or more. Typically, the thickness of a tissue section is between 1-100 μm, 1-50 μm, 1-30 μm, 1-25 μm, 1-20 μm, 1-15 μm, 1-10 μm, 2-8 μm, 3-7 μm, or 4-6 μm, but as mentioned above, sections with thicknesses larger or smaller than these ranges can also be analysed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analysed successively to obtain three-dimensional information about the biological sample.

Freezing:

In some instances, the biological sample (e.g., a tissue section as described above) can be prepared by deep freezing at a temperature suitable to maintain or preserve the integrity (e.g., the physical characteristics) of the tissue structure. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C. In some instances, the biological sample can be from fresh frozen samples.

Fixation and Post-Fixation:

In some instances, the biological sample can be prepared using formalin-fixation and paraffin-embedding (FFPE), which are established methods. In some instances, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some instances, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some instances, the methods provided herein comprises one or more post-fixing (also referred to as post-fixation) steps. In some instances, one or more post-fixing step is performed after contacting a sample with a polynucleotide disclosed herein, e.g., one or more probes such as a circular or circularizable probe. In some instances, one or more post-fixing step is performed after a hybridization complex comprising a probe and a target is formed in a sample. In some instances, one or more post-fixing step is performed prior to a ligation reaction disclosed herein, such as the ligation to circularize a probe.

In some instances, one or more post-fixing step is performed after contacting a sample with a binding or labelling agent (e.g., an antibody or antigen binding fragment thereof) for a non-nucleic acid analyte such as a protein analyte. The labelling agent can comprise a nucleic acid molecule (e.g., reporter oligonucleotide) comprising a sequence corresponding to the labelling agent and therefore corresponds to (e.g., uniquely identifies) the analyte. In some instances, the labelling agent can comprise a reporter oligonucleotide comprising one or more barcode sequences.

A post-fixing step may be performed using any suitable fixation reagent disclosed herein, for example, 3% (w/v) paraformaldehyde in DEPC-PBS.

Embedding and Crosslinking:

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some instances, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some instances, the hydrogel is formed such that the hydrogel is internalized within the biological sample.

In some instances, the biological sample is immobilized in the hydrogel via cross-linking of the polymer material that forms the hydrogel. Cross-linking can be performed chemically and/or photochemically, or alternatively by any other hydrogel-formation method known in the art. In some instances, analytes (e.g., protein, RNA, and/or DNA), polynucleotides added to the sample (e.g., probes) and/or products thereof, in the biological sample can be embedded in a 3D matrix. In some instances, one or more of the analytes, polynucleotides and/or products thereof can be modified to contain functional groups that can be used as an anchoring site to attach to the polymer matrix. In some aspects, the 3D polymer matrix can be a hydrogel. In some instances, hydrogel formation within a biological sample is reversible.

In some instances, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm. Additional methods and aspects of hydrogel embedding of biological samples are described for example in Chen et al., *Science* 347(6221): 543-548, 2015, the entire contents of which are incorporated herein by reference.

Hydrogels embedded within biological samples can be cleared using any suitable method. For example, electrophoretic tissue clearing methods can be used to remove biological macromolecules from the hydrogel-embedded sample. In some instances, a hydrogel-embedded sample is stored before or after clearing of hydrogel, in a medium (e.g., a mounting medium, methylcellulose, or other semi-solid mediums).

In some instances, a method disclosed herein comprises de-crosslinking the reversibly cross-linked biological sample. The de-crosslinking does not need to be complete. In some instances, only a portion of crosslinked molecules in the reversibly cross-linked biological sample are de-crosslinked and allowed to migrate.

Staining and Immunohistochemistry (IHC):

To facilitate visualization, biological samples can be stained using a wide variety of stains and staining techniques. In some instances, for example, a sample can be stained using any number of stains and/or immunohistochemical reagents. One or more staining steps may be performed to prepare or process a biological sample for an assay described herein or may be performed during and/or after an assay. In some instances, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some instances, cells in the sample can be segmented using one or more images taken of the stained sample.

In some instances, the stain is performed using a lipophilic dye. In some examples, the staining is performed with a lipophilic carbocyanine or aminostyryl dye, or analogs thereof (e.g, DiI, DiO, DIR, DiD). Other cell membrane stains may include FM and RH dyes or immunohistochemical reagents specific for cell membrane proteins. In some examples, the stain may include but is not limited to, acridine orange, acid fuchsin, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine, or derivatives thereof. In some instances, the sample may be stained with haematoxylin and eosin (H&E).

The sample can be stained using hematoxylin and eosin (H&E) staining techniques, using Papanicolaou staining techniques, Masson's trichrome staining techniques, silver staining techniques, Sudan staining techniques, and/or using Periodic Acid Schiff (PAS) staining techniques. PAS staining is typically performed after formalin or acetone fixation. In some instances, the sample can be stained using Romanowsky stain, including Wright's stain, Jenner's stain, Can-Grunwald stain, Leishman stain, and Giemsa stain.

In some instances, biological samples can be destained. Methods of destaining or discoloring a biological sample are known in the art, and generally depend on the nature of the stain(s) applied to the sample. For example, in some instances, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

Isometric Expansion:

In some instances, a biological sample embedded in a matrix (e.g., a hydrogel) can be isometrically expanded. Isometric expansion methods that can be used include hydration, a preparative step in expansion microscopy, as described in Chen, et al., *Science* 347(6221): 543-548, 2015.

Isometric expansion can be performed by tethering (e . . g, anchoring) one or more components of a biological sample to a gel, followed by gel formation, proteolysis, and swelling. In some instances, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some instances, the isometrically expanded biological sample can be removed from the substrate prior to contacting the substrate with probes disclosed herein.

In general, the steps used to perform isometric expansion of the biological sample can depend on the characteristics of the sample (e.g., thickness of tissue section, fixation, cross-linking), and/or the analyte of interest (e.g., different conditions to anchor RNA, DNA, and protein to a gel).

In some instances, proteins in the biological sample are anchored to a swellable gel such as a polyelectrolyte gel. An antibody can be directed to the protein before, after, or in conjunction with being anchored to the swellable gel. DNA and/or RNA in a biological sample can also be anchored to the swellable gel via a suitable linker. Examples of such linkers include, but are not limited to, 6-((Acryloyl)amino) hexanoic acid (Acryloyl-X SE) (available from ThermoFisher, Waltham, MA), Label-IT Amine (available from MirusBio, Madison, WI) and Label X (described for example in Chen, et al., Nat. Methods 13:679-684, 2016, the entire contents of which are incorporated herein by reference).

Isometric expansion of the sample can increase the spatial resolution of the subsequent analysis of the sample. The increased resolution in spatial profiling can be determined by comparison of an isometrically expanded sample with a sample that has not been isometrically expanded.

In some instances, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some instances, the sample is isometrically expanded to at least 2× and less than 20× of its non-expanded size.

Tissue Permeabilization and Treatment:

In some instances, a biological sample can be permeabilized to facilitate transfer of analytes out of the sample, and/or to facilitate transfer of species (such as probes) into the sample. If a sample is not permeabilized sufficiently, the amount of analyte captured from the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X-100™ or Tween-20™), and enzymes (e.g., trypsin, proteases). In some instances, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some instances, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some instances, the biological sample can be permeabilized by non-chemical permeabilization methods. Non-chemical permeabilization methods are known in the art. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some instances, DNase and RNase inactivating agents or inhibitors such as proteinase K, and/or chelating agents such as EDTA, can be added to the sample. For example, a method disclosed herein may comprise a step for increasing accessibility of a nucleic acid for binding, e.g., a denaturation step to open up DNA in a cell for hybridization by a probe. For example, proteinase K treatment may be used to free up DNA with proteins bound thereto.

Selective Enrichment of RNA Species:

In some instances, where RNA is the analyte, one or more RNA analyte species of interest can be selectively enriched. For example, one or more species of RNA of interest can be selected by addition of one or more oligonucleotides to the sample. In some instances, the additional oligonucleotide is a sequence used for priming a reaction by an enzyme (e.g., a polymerase). For example, one or more primer sequences with sequence complementarity to one or more RNAs of interest can be used to amplify the one or more RNAs of interest, thereby selectively enriching these RNAs.

In some aspects, when two or more analytes are analyzed, a first and second probe that is specific for (e.g., specifically hybridizes to) each RNA or cDNA analyte are used. For example, in some instances of the methods provided herein, templated ligation is used to detect gene expression in a biological sample. An analyte of interest (such as a protein), bound by a labelling agent or binding agent (e.g., an antibody or epitope binding fragment thereof), wherein the binding agent is conjugated or otherwise associated with a reporter oligonucleotide comprising a reporter sequence that identifies the binding agent, can be targeted for analysis. Probes may be hybridized to the reporter oligonucleotide and ligated in a templated ligation reaction to generate a product for analysis. In some instances, gaps between the probe oligonucleotides may first be filled prior to ligation, using, for example, Mu polymerase, DNA polymerase, RNA polymerase, reverse transcriptase, VENT polymerase, Taq polymerase, and/or any combinations, derivatives, and variants (e.g., engineered mutants) thereof. In some instances, the assay can further include amplification of templated ligation products (e.g., by multiplex PCR).

In some instances, an oligonucleotide with sequence complementarity to the complementary strand of captured RNA (e.g., cDNA) can bind to the cDNA. For example, biotinylated oligonucleotides with sequence complementary to one or more cDNA of interest binds to the cDNA and can be selected using biotinylation-strepavidin affinity using any of a variety of methods known to the field (e.g., streptavidin beads).

Alternatively, one or more species of RNA can be down-selected (e.g., removed) using any of a variety of methods. For example, probes can be administered to a sample that selectively hybridize to ribosomal RNA (rRNA), thereby reducing the pool and concentration of rRNA in the sample. Additionally and alternatively, duplex-specific nuclease (DSN) treatment can remove rRNA (see, e.g., Archer, et al, Selective and flexible depletion of problematic sequences from RNA-seq libraries at the cDNA stage, *BMC Genomics,* 15 401, (2014), the entire contents of which are incorporated herein by reference). Furthermore, hydroxyapatite chromatography can remove abundant species (e.g., rRNA) (see, e.g., Vandernoot, V. A., cDNA normalization by hydroxyapatite chromatography to enrich transcriptome diversity in RNA-seq applications, *Biotechniques,* 53(6) 373-80, (2012), the entire contents of which are incorporated herein by reference).

A biological sample may comprise one or a plurality of analytes of interest. Methods for performing multiplexed assays to analyze two or more different analytes in a single biological sample are provided.

Analytes:

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g. an affinity binding partner) can be developed. Such a specific binding partner may be a nucleic acid probe (for a nucleic acid analyte).

Analytes of particular interest may include nucleic acid molecules, such as DNA (e.g. genomic DNA, mitochondrial DNA, plastid DNA, viral DNA, etc.) and RNA (e.g. mRNA, microRNA, rRNA, snRNA, viral RNA, etc.), and synthetic and/or modified nucleic acid molecules, (e.g. including nucleic acid domains comprising or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which comprise a lipid or carbohydrate component. The analyte may be a single molecule or a complex that contains two or more molecular subunits, e.g. including but not limited to protein-DNA complexes, which may or may not be covalently bound to one another, and which may be the same or different. Thus in addition to cells or microorganisms, such a complex analyte may also be a protein complex or protein interaction. Such a complex or interaction may thus be a homo- or hetero-multimer. Aggregates of molecules, e.g. proteins may also be target analytes, for example aggregates of the same protein or different proteins. The analyte may also be a complex between proteins or peptides and nucleic acid molecules such as DNA or RNA, e.g. interactions between proteins and nucleic acids, e.g. regulatory factors, such as transcription factors, and DNA or RNA.

Endogenous Analytes:

In some instances, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that comprises a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some instances, the analyte is inside a cell or on a cell surface, such as a transmembrane analyte or one that is attached to the cell membrane. In some instances, the analyte can be an organelle (e.g., nuclei or mitochondria). In some instances, the analyte is an extracellular analyte, such as a secreted analyte. Exemplary analytes include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR. The RNA can be small (e.g., less than 200 nucleic acid bases in length) or large (e.g., RNA greater than 200 nucleic acid bases in length). Examples of small RNAs include 5.8S ribosomal RNA (rRNA), 5S rRNA, tRNA, miRNA, siRNA, snoRNAs, piRNA, tRNA-derived small RNA (tsRNA), and small rDNA-derived RNA (srRNA). The RNA can be double-stranded RNA or single-stranded RNA. The RNA can be circular RNA. The RNA can be a bacterial rRNA (e.g., 16s rRNA or 23s rRNA).

In some instances described herein, an analyte may be a denatured nucleic acid, wherein the resulting denatured nucleic acid is single-stranded. The nucleic acid may be denatured, for example, optionally using formamide, heat, or both formamide and heat. In some instances, the nucleic acid is not denatured for use in a method disclosed herein.

In certain instances, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any implementation described herein, the analyte comprises a target sequence. In some instances, the target sequence may be endogenous to the sample, generated in the sample, added to the sample, or associated with an analyte in the sample. In some instances, the target sequence is a single-stranded target sequence (e.g., a sequence in a rolling circle amplification product). In some instances, the analytes comprise one or more single-stranded target sequences. In one aspect, a first single-stranded target sequence is not identical to a second single-stranded target sequence. In another aspect, a first single-stranded target sequence is identical to one or more second single-stranded target sequence. In some instances, the one or more second single-stranded target sequence is comprised in the same analyte (e.g., nucleic acid) as the first single-stranded target sequence. Alternatively, the one or more second single-stranded target sequence is comprised in a different analyte (e.g., nucleic acid) from the first single-stranded target sequence.

Labelling Agents:

In some instances, provided herein are methods and compositions for analyzing endogenous analytes (e.g., RNA, ssDNA, and cell surface or intracellular proteins and/or metabolites) in a sample using one or more labelling agents. In some instances, an analyte labelling agent may include an agent that interacts with an analyte (e.g., an endogenous analyte in a sample). In some instances, the labelling agents can comprise a reporter oligonucleotide that is indicative of the analyte or portion thereof interacting with the labelling agent. For example, the reporter oligonucleotide may comprise a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some instances, the analyte labelling agent comprises an analyte binding moiety and a labelling agent barcode domain comprising one or more barcode sequences, e.g., a barcode sequence that corresponds to the analyte binding moiety and/or the analyte. An analyte binding moiety barcode includes to a barcode that is associated with or otherwise identifies the analyte binding moiety. In some instances, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some instances, the method comprises one or more post-fixing (also referred to as post-fixation) steps after contacting the sample with one or more labelling agents.

In the methods and systems described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some instances, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may comprise a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub. 20190177800; and U.S. Pat. Pub. 20190367969, which are each incorporated by reference herein in their entirety.

In some instances, an analyte binding moiety includes one or more antibodies or antigen binding fragments thereof. The antibodies or antigen binding fragments including the analyte binding moiety can specifically bind to a target analyte. In some instances, the analyte is a protein (e.g., a protein on a surface of the biological sample (e.g., a cell) or an intracellular protein). In some instances, a plurality of analyte labelling agents comprising a plurality of analyte binding moieties bind a plurality of analytes present in a biological sample. In some instances, the plurality of analytes includes a single species of analyte (e.g., a single species of polypeptide). In some instances in which the plurality of analytes includes a single species of analyte, the analyte binding moieties of the plurality of analyte labelling agents are the same. In some instances in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some instances, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may comprise nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. Sec, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2): 708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide comprising a barcode sequence that identifies the label agent. For instance, the labelling agent may be directly coupled (e.g., covalently bound) to a hybridization oligonucleotide that comprises a sequence that hybridizes with a sequence of the reporter oligonucleotide. Hybridization of the hybridization oligonucleotide to the reporter oligonucleotide couples the labelling agent to the reporter oligonucleotide. In some instances, the reporter oligonucleotides are releasable from the labelling agent, such as upon application of a stimulus. For example, the reporter oligonucleotide may be attached to the labelling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing.

In some cases, the labelling agent can comprise a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some instances, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent comprising an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

Assays for In Situ Detection and Analysis:

Objectives for in situ detection and analysis methods include detecting, quantifying, and/or mapping analytes (e.g., gene activity) to specific regions in a biological sample (e.g., a tissue sample or cells deposited on a surface) at cellular or sub-cellular resolution. Methods for performing in situ studies include a variety of techniques, e.g., in situ hybridization and in situ sequencing techniques. These techniques allow one to study the subcellular distribution of target analytes (e.g., gene activity as evidenced, e.g., by expressed gene transcripts), and have the potential to provide crucial insights in the fields of developmental biology, oncology, immunology, histology, etc.

Various methods can be used for in situ detection and analysis of target analytes, e.g., sequencing by synthesis (SBS), sequencing by ligation (SBL), sequencing by hybridization (SBH). Non-limiting examples of in situ hybridization techniques include single molecule fluorescence in situ hybridization (smFISH) and multiplexed error-robust fluorescence in situ hybridization (MERFISH). smFISH enables in situ detection and quantification of gene transcripts in tissue samples at the locations where they reside by making use of libraries of multiple short oligonucleotide probes (e.g., approximately 20 base pairs (bp) in length), each labeled with a fluorophore. The probes are sequentially hybridized to gene sequences (e.g., DNA) or gene transcript sequences (e.g., mRNA) sequences, and visualized as diffraction-limited spots by fluorescence microscopy (Levsky, et al. (2003) "Fluorescence In situ Hybridization: Past, Present and Future", Journal of Cell Science 116(14): 2833-2838; Raj, et al. (2008) "Imaging Individual mRNA Molecules Using Multiple Singly Labeled Probes", Nat Methods 5(10): 877-879; Moor, et al. (2016), ibid.). Variations on the smFISH method include, for example, the use of combinatorial labelling schemes to improve multiplexing capability (Levsky, et al. (2003), ibid.), the use of smFISH in combination with super-resolution microscopy (Lubeck, et al. (2014) "Single-Cell In situ RNA Profiling by Sequential Hybridization", Nature Methods 11(4): 360-361).

MERFISH addresses two of the limitations of earlier in situ hybridization approaches, namely the limited number of target sequences that could be simultaneously identified and the robustness of the approach to readout errors caused by the stochastic nature of the hybridization process (Moor, et al. (2016), ibid.). MERFISH utilizes a binary barcoding scheme in which the probed target mRNA sequences are either fluorescence positive or fluorescence negative for any given imaging cycle (Ke, et al. (2016), ibid.; Moffitt, et al. (2016) "RNA Imaging with Multiplexed Error Robust Fluorescence in situ Hybridization", *Methods Enzymol.* 572:1-49). The encoding probes that contain a combination of target-specific hybridization sequence regions and barcoded readout sequence regions are first hybridized to the target mRNA sequences. In each imaging cycle, a subset of fluorophore-conjugated readout probes is hybridized to a subset of encoding probes. Target mRNA sequences that fluoresce in a given cycle are assigned a value of "1" and the remaining target mRNA sequences are assigned a value of "0". Between imaging cycles, the fluorescent probes from the previous cycle are photobleached. After, e.g., 14 or 16 rounds of readout probe hybridization and imaging, unique combinations of the detected fluorescence signals generate a 14-bit or 16-bit code that identifies the different gene transcripts. To address the increased error rate for correctly calling the readout codes increases as the number of hybridization and imaging cycles increases, the method may also entail the use of Hamming distances for barcode design and correction of decoding errors (see., e.g., Buschmann, et al. (2013) "Levenshtein Error-Correcting Barcodes for Multiplexed DNA Sequencing", *Bioinformatics* 14:272), thereby resulting in an error-robust barcoding scheme.

Some in situ sequencing techniques generally comprise both in situ target capture (e.g., of mRNA sequences) and in situ sequencing. Non-limiting examples of in situ sequencing techniques include in situ sequencing with padlock probes (ISS-PLP), fluorescent in situ sequencing (FISSEQ), barcode in situ targeted sequencing (Barista-Seq), and spatially-resolved transcript amplicon readout mapping (STARmap) (see, e.g., Ke, et al. (2016), ibid., Asp, et al. (2020), ibid.).

Some methods for in situ detection and analysis of analytes utilize a probe (e.g., padlock or circular probe) that detects specific target analytes. The in situ sequencing using padlock probes (ISS-PLP) method, for example, combines padlock probing to target specific gene transcripts, rolling-circle amplification (RCA), and sequencing by ligation (SBL) chemistry. Within intact tissue sections, reverse transcription primers are hybridized to target sequence (e.g., mRNA sequences) and reverse transcription is performed to create cDNA to which a padlock probe (a single-stranded DNA molecule comprising regions that are complementary to the target cDNA) can bind (see, e.g., Asp, et al. (2020), ibid.). In one variation of the method, the padlock probe binds to the cDNA target with a gap remaining between the ends which is then filled in using a DNA polymerization reaction. In another variation of the method, the ends of the bound padlock probe are adjacent to each other. The ends are then ligated to create a circular DNA molecule. Target amplification using rolling-circle amplification (RCA) results in micrometer-sized RCA products (RCPs), containing a plurality of concatenated repeats of the probe sequence. In some examples, RCPs are then subjected to, e.g., sequencing-by-ligation (SBL) or sequencing-by-hybridization (SBH). In some cases, the method allows for a barcode located within the probe to be decoded.

Products of Endogenous Analytes and/or Labelling Agents:

In some instances, provided herein are methods and compositions for analyzing one or more products of an endogenous analyte and/or a labelling agent in a biological sample. In some instances, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product such as a rolling circle amplification (RCA) product) thereof is analyzed. In some instances, a labelling agent that directly or indirectly binds to an analyte in the biological sample is analyzed. In some instances, a product (e.g., a hybridization product, a ligation product, an extension product (e.g., by a DNA or RNA polymerase), a replication product, a transcription/reverse transcription product, and/or an amplification product such as a rolling circle amplification (RCA) product) of a labelling agent that directly or indirectly binds to an analyte in the biological sample is analyzed.

In some instances, the analyzing comprises using primary probes which comprise a target binding region (e.g., a region that binds to a target such as RNA transcripts) and the primary probes may contain one or more barcodes (e.g., primary barcode). In some instances, the barcodes are bound by detection primary probes, which do not need to be fluorescent, but that include a target-binding portion (e.g., for hybridizing to one or more primary probes) and one or more barcodes (e.g., secondary barcodes). In some instances, the detection primary probe comprises an overhang that does not hybridize to the target nucleic acid but hybridizes to another probe. In some examples, the overhang comprises the barcode(s). In some instances, the barcodes of the detection primary probes are targeted by detectably labeled detection oligonucleotides, such as fluorescently labeled oligos. In some instances, one or more decoding schemes are used to decode the signals, such as fluorescence, for sequence determination. Various probes and probe sets can be used to hybridize to and detect an endogenous analyte and/or a sequence associated with a labelling agent. In some instances, these assays may enable multiplexed detection, signal amplification, combinatorial decoding, and error correction schemes. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set. The specific probe or probe set design can vary.

Hybridization and Ligation:

Various probes and probe sets can be hybridized to an endogenous analyte and/or a labelling agent and each probe may comprise one or more barcode sequences. The specific probe or probe set design can vary. In some instances, the hybridization of a primary probe or probe set (e.g., a circularizable probe or probe set) to a target nucleic acid analyte and may lead to the generation of a rolling circle amplification (RCA) template. In some instances, the assay uses or generates a circular nucleic acid molecule which can be the RCA template.

In some instances, a product of an endogenous analyte and/or a labelling agent is a ligation product. In some instances, the ligation product is formed from circularization of a circularizable probe or probe set upon hybridization to a target sequence. In some instances, the ligation product is formed between two or more endogenous analytes. In some instances, the ligation product is formed between an endogenous analyte and a labelling agent. In some instances, the ligation product is formed between two or more labelling agent. In some instances, the ligation product is an intramolecular ligation of an endogenous analyte. In some instances, the ligation product is an intramolecular ligation of a labelling agent, for example, the circularization of a circularizable probe or probe set upon hybridization to a target sequence. The target sequence can be comprised in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some instances, provided herein is a probe or probe set capable of DNA-templated ligation, such as from a cDNA molecule. Sec, e.g., U.S. Pat. No. 8,551,710, which is hereby incorporated by reference in its entirety. In some instances, provided herein is a probe or probe set capable of RNA-templated ligation. Sec, e.g., U.S. Pat. Pub. 2020/0224244 which is hereby incorporated by reference in its entirety. In some instances, the probe set is a SNAIL probe set. Sec, e.g., U.S. Pat. Pub. 20190055594, which is hereby incorporated by reference in its entirety. In some instances, provided herein is a multiplexed proximity ligation assay. Sec, e.g., U.S. Pat. Pub. 20140194311 which is hereby incorporated by reference in its entirety. In some instances, provided herein is a probe or probe set capable of proximity ligation, for instance a proximity ligation assay for RNA (e.g., PLAYR) probe set. See, e.g., U.S. Pat. Pub. 20160108458, which is hereby incorporated by reference in its entirety. In some instances, a circular probe can be indirectly hybridized to the target nucleic acid. In some instances, the circular construct is formed from a probe set capable of proximity ligation, for instance a proximity ligation in situ hybridization (PLISH) probe set. Sec, e.g., U.S. Pat. Pub. 2020/0224243 which is hereby incorporated by reference in its entirety.

In some instances, the ligation involves chemical ligation. In some instances, the ligation involves template dependent ligation. In some instances, the ligation involves template independent ligation. In some instances, the ligation involves enzymatic ligation.

In some instances, the enzymatic ligation involves use of a ligase. In some aspects, the ligase used herein comprises an enzyme that is commonly used to join polynucleotides together or to join the ends of a single polynucleotide. An RNA ligase, a DNA ligase, or another variety of ligase can be used to ligate two nucleotide sequences together. Ligases comprise ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases comprise bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some instances, the ligase is a T4 RNA ligase. In some instances, the ligase is a splintR ligase. In some instances, the ligase is a single stranded DNA ligase. In some instances, the ligase is a T4 DNA ligase. In some instances, the ligase is a ligase that has an DNA-splinted DNA ligase activity. In some instances, the ligase is a ligase that has an RNA-splinted DNA ligase activity.

In some instances, the ligation herein is a direct ligation. In some instances, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, i.e., separated by one or more intervening nucleotides or "gaps". In some instances, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo) nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific implementations, the gap may be a gap of about 1, 2, 3, 4, 5, 6, 7, 8, 9 or 10 or more nucleotides, of any integer (or range of integers) of nucleotides in between the indicated values. In some instances, the gap between said terminal regions may be filled by a gap oligonucleotide or by extending the 3' end of a polynucleotide. In some cases, ligation involves ligating the ends of the probe to at least one gap (oligo) nucleotide, such that the gap (oligo) nucleotide becomes incorporated into the resulting polynucleotide. In some instances, the ligation herein is preceded by gap filling. In other implementations, the ligation herein does not require gap filling.

In some instances, ligation of the polynucleotides produces polynucleotides with melting temperature higher than that of un-ligated polynucleotides. Thus, in some aspects, ligation stabilizes the hybridization complex containing the ligated polynucleotides prior to subsequent steps, comprising amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature (Tm) of the DNA strands. This selectively reduces the concentration of annealed mismatched substrates (expected to have a slightly lower Tm around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some instances, the ligation herein is a proximity ligation of ligating two (or more) nucleic acid sequences that are in proximity with each other, e.g., through enzymatic means (e.g., a ligase). In some instances, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

Primer Extension and Amplification:

In some instances, the hybridization of a primary probe or probe set (e.g. a circularizable probe or probe set) to a target analyte and may lead to the generation of an extension or amplification product. In some instances, a product is a primer extension product of an analyte, a labelling agent, a probe or probe set bound to the analyte (e.g., a circularizable probe bound to genomic DNA, RNA, or cDNA), or a probe or probe set bound to the labelling agent (e.g., a circularizable probe bound to one or more reporter oligonucleotides from the same or different labelling agents.

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (i.e., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some instances, a product of an endogenous analyte and/or a labelling agent is an amplification product of one or more polynucleotides, for instance, a circular probe or circularizable probe or probe set. In some instances, the disclosed methods may comprise the use of a rolling circle amplification (RCA) technique to amplify signal. Rolling circle amplification is an isothermal, DNA polymerase-mediated process in which long single-stranded DNA molecules are synthesized on a short circular single-stranded DNA template using a single DNA primer (Zhao, et al. (2008), "Rolling Circle Amplification: Applications in Nanotechnology and Biodetection with Functional Nucleic Acids", *Angew Chem Int Ed Engl.* 47(34): 6330-6337; Ali, et al. (2014), "Rolling Circle Amplification: A Versatile Tool for Chemical Biology, Materials Science and Medicine", *Chem Soc Rev.* 43(10): 3324-3341). The RCA product is a concatemer containing tens to hundreds of tandem repeats that are complementary to the circular template, and may be used to develop sensitive techniques for the detection of a variety of targets, including nucleic acids (DNA, RNA), small molecules, proteins, and cells (Ali, et al. (2014), ibid.). In some implementations, a primer that hybridizes to the circular probe or circularized probe is added and used as such for amplification. In some instances, the RCA comprises a linear RCA, a branched RCA, a dendritic RCA, or any combination thereof.

In some instances, the amplification is performed at a temperature between or between about 20° C. and about 60° C. In some instances, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some instances, upon addition of a DNA polymerase in the presence of appropriate dNTP precursors and other cofactors, a primer is elongated to produce multiple copies of the circular template. This amplification step can utilize isothermal amplification or non-isothermal amplification. In some instances, after the formation of the hybridization complex and association of the amplification probe, the hybridization complex is rolling-circle amplified to generate a cDNA nanoball (i.e., amplicon) containing multiple copies of the cDNA. Techniques for rolling circle amplification (RCA) are known in the art such as linear RCA, a branched RCA, a dendritic RCA, or any combination thereof. (See, e.g., Baner et al, Nucleic Acids Research, 26:5073-5078, 1998; Lizardi et al, Nature Genetics 19:226, 1998; Mohsen et al., Acc Chem Res. 2016 Nov. 15; 49(11): 2540-2550; Schweitzer et al. Proc. Natl Acad. Sci. USA 97:101 13-1 19, 2000; Faruqi et al, BMC Genomics 2:4, 2000; Nallur et al, Nucl. Acids Res. 29: el 18, 2001; Dean et al. Genome Res. 1 1:1095-1099, 2001; Schweitzer et al, Nature Biotech. 20:359-365, 2002; U.S. Pat. Nos. 6,054,274, 6,291,187, 6,323,009, 6,344,329 and 6,368,801). Exemplary polymerases for use in RCA comprise DNA polymerase such phi29 (φ29) polymerase, Klenow fragment, *Bacillus stearothermophilus* DNA polymerase (BST), T4 DNA polymerase, T7 DNA polymerase, or DNA polymerase I. In some aspects, DNA polymerases that have been engineered or mutated to have desirable characteristics can be employed. In some instances, the polymerase is phi29 DNA polymerase.

In some aspects, during the amplification step, modified nucleotides can be added to the reaction to incorporate the modified nucleotides in the amplification product (e.g., nanoball). Exemplary of the modified nucleotides comprise amine-modified nucleotides. In some aspects of the methods, for example, for anchoring or cross-linking of the generated amplification product (e.g., nanoball) to a scaffold, to cellular structures and/or to other amplification products (e.g., other nanoballs). In some aspects, the amplification products comprises a modified nucleotide, such as an amine-modified nucleotide. In some instances, the amine-modified nucleotide comprises an acrylic acid N-hydroxysuccinimide moiety modification. Examples of other amine-modified nucleotides comprise, but are not limited to, a 5-Aminoallyl-dUTP moiety modification, a 5-Propargylamino-dCTP moiety modification, a N6-6-Aminohexyl-dATP moiety modification, or a 7-Deaza-7-Propargylamino-dATP moiety modification.

In some instances, the RCA template may comprise the target analyte, or a part thereof, where the target analyte is a nucleic acid, or it may be provided or generated as a proxy, or a marker, for the analyte. In some instances, the RCA template may comprise a sequence of the probes and probe sets hybridized to an endogenous analyte and/or a labelling agent. In some instances, the amplification product can be generated as a proxy, or a marker, for the analyte. As noted above, many assays are known for the detection of numerous different analytes, which use a RCA-based detection system, e.g., where the signal is provided by generating a RCP from a circular RCA template which is provided or generated in the assay, and the RCP is detected to detect the analyte. The RCP may thus be regarded as a reporter which is detected to detect the target analyte. However, the RCA template may also be regarded as a reporter for the target analyte; the RCP is generated based on the RCA template, and comprises complementary copies of the RCA template. The RCA template determines the signal which is detected, and is thus indicative of the target analyte. As will be described in more detail below, the RCA template may be a probe, or a part or component of a probe, or may be generated from a probe, or it may be a component of a detection assay (i.e. a reagent in a detection assay), which is used as a reporter for the assay, or a part of a reporter, or signal-generation system. The RCA template used to generate the RCP may thus be a circular (e.g. circularized) reporter nucleic acid molecule, namely from any RCA-based detection assay which uses or generates a circular nucleic acid molecule as a reporter for the assay. Since the RCA template generates the RCP reporter, it may be viewed as part of the reporter system for the assay.

In some instances, an assay may detect a product herein that includes a molecule or a complex generated in a series of reactions, e.g., hybridization, ligation, extension, replication, transcription/reverse transcription, and/or amplification (e.g., rolling circle amplification), in any suitable combination. For example, a product comprising a target sequence for a probe disclosed herein (e.g., a bridge probe) may be a hybridization complex formed of a cellular nucleic acid in a sample and an exogenously added nucleic acid probe. The exogenously added nucleic acid probe may comprise an overhang that does not hybridize to the cellular nucleic acid but hybridizes to another probe (e.g., a detection probe). The exogenously added nucleic acid probe may be optionally ligated to a cellular nucleic acid molecule or another exogenous nucleic acid molecule. In other examples, a product comprising a target sequence for a probe disclosed herein (e.g., an anchor probe) may be an RCP of a circularizable probe or probe set which hybridizes to a cellular nucleic acid molecule (e.g., genomic DNA or mRNA) or product thereof (e.g., a transcript such as cDNA, a DNA-templated ligation product of two probes, or an RNA-templated ligation product of two probes). In other examples, a product comprising a target sequence for a probe disclosed herein (e.g., a bridge probe) may be a probe hybridizing to an RCP. The probe may comprise an overhang that does not hybridize to the RCP but hybridizes to another probe (e.g., a detection probe).

Signal Amplification Methods:

In some instances, a method disclosed herein may also comprise one or more signal amplification components and detecting such signals. In some instances, the present disclosure relates to the detection of nucleic acid sequences in situ using probe hybridization and generation of amplified signals associated with the probes. In some instances, the target nucleic acid of a nucleic acid probe comprises multiple target sequences for nucleic acid probe hybridization, such that the signal corresponding to a barcode sequence of the nucleic acid probe is amplified by the presence of multiple nucleic acid probes hybridized to the target nucleic acid. For example, multiple sequences can be selected from a target nucleic acid such as an mRNA, such that a group of nucleic acid probes (e.g., 20-50 nucleic acid probes) hybridize to the mRNA in a tiled fashion. In another example, the target nucleic acid can be an amplification product (e.g., an RCA product) comprising multiple copies of a target sequence (e.g., a barcode sequence of the RCA product).

Alternatively or additionally, amplification of a signal associated with a barcode sequence of a nucleic acid probe can be amplified using one or more signal amplification strategies off of an oligonucleotide probe that hybridizes to the barcode sequence. In some aspects, amplification of the signal associated with the oligonucleotide probe can reduce the number of nucleic acid probes needed to hybridize to the target nucleic acid to obtain a sufficient signal-to-noise ratio. For example, the number of nucleic acid probes to tile a target nucleic acid such as an mRNA can be reduced. In some aspects, reducing the number of nucleic acid probes tiling a target nucleic acid enables detection of shorter target nucleic acids, such as shorter mRNAs. In some instances, no more than one, two, three, 4, 5, 6, 7, 8, 9, 10, 11, 12, 13, 14, 15, 16, 17, 18. 19, or 20 nucleic acid probes may be hybridized to the target nucleic acid. In instances wherein the target nucleic acid is an amplification product, signal amplification off of the oligonucleotide probes may reduce the number of target sequences required for detection (e.g., the length of the RCA product can be reduced).

Exemplary signal amplification methods include targeted deposition of detectable reactive molecules around the site of probe hybridization, targeted assembly of branched structures (e.g., bDNA or branched assay using locked nucleic acid (LNA)), programmed in situ growth of concatemers by enzymatic rolling circle amplification (RCA) (e.g., as described in US 2019/0055594 incorporated herein by reference), hybridization chain reaction, assembly of topologically catenated DNA structures using serial rounds of chemical ligation (clampFISH), signal amplification via hairpin-mediated concatemerization (e.g., as described in US 2020/0362398 incorporated herein by reference), e.g., primer exchange reactions such as signal amplification by exchange reaction (SABER) or SABER with DNA-Exchange (Exchange-SABER). In some instances, a non-enzymatic signal amplification method may be used.

The detectable reactive molecules may comprise tyramide, such as used in tyramide signal amplification (TSA) or multiplexed catalyzed reporter deposition (CARD)-FISH. In some instances, the detectable reactive molecule may be releasable and/or cleavable from a detectable label such as a fluorophore. In some instances, a method disclosed herein comprises multiplexed analysis of a biological sample comprising consecutive cycles of probe hybridization, fluorescence imaging, and signal removal, where the signal removal comprises removing the fluorophore from a fluorophore-labeled reactive molecule (e.g., tyramide). Exemplary detectable reactive reagents and methods are described in U.S. Pat. No. 6,828,109, US 2019/0376956, WO 2019/236841, WO 2020/102094, WO 2020/163397, and WO 2021/067475, all of which are incorporated herein by reference in their entireties.

In some instances, hybridization chain reaction (HCR) can be used for signal amplification. HCR is an enzyme-free nucleic acid amplification based on a triggered chain of hybridization of nucleic acid molecules starting from HCR monomers, which hybridize to one another to form a nicked nucleic acid polymer. This polymer is the product of the HCR reaction which is ultimately detected in order to indicate the presence of the target analyte. HCR is described in detail in Dirks and Pierce, 2004, PNAS, 101(43), 15275-15278 and in U.S. Pat. Nos. 7,632,641 and 7,721,721 (see also US 2006/00234261; Chemeris et al, 2008 Doklady Biochemistry and Biophysics, 419, 53-55; Niu et al, 2010, 46, 3089-3091; Choi et al, 2010, Nat. Biotechnol. 28(11), 1208-1212; and Song et al, 2012, Analyst, 137, 1396-1401). HCR monomers typically comprise a hairpin, or other metastable nucleic acid structure. In the simplest form of HCR, two different types of stable hairpin monomer, referred to here as first and second HCR monomers, undergo a chain reaction of hybridization events to form a long nicked double-stranded DNA molecule when an "initiator" nucleic acid molecule is introduced. The HCR monomers have a hairpin structure comprising a double stranded stem region, a loop region connecting the two strands of the stem region, and a single stranded region at one end of the double stranded stem region. The single stranded region which is exposed (and which is thus available for hybridization to another molecule, e.g. initiator or other HCR monomer) when the monomers are in the hairpin structure may be known as the "toehold region" (or "input domain"). The first HCR monomers each further comprise a sequence which is complementary to a sequence in the exposed toehold region of the second HCR monomers. This sequence of complementarity in the first HCR monomers may be known as the "interacting region" (or "output domain"). Similarly, the second HCR monomers each comprise an interacting region (output domain), e.g. a sequence which is complementary to the exposed toehold region (input domain) of the first HCR monomers. In the absence of the HCR initiator, these interacting regions are protected by the secondary structure (e.g. they are not exposed), and thus the hairpin monomers are stable or kinetically trapped (also referred to as "metastable"), and remain as monomers (e.g. preventing the system from rapidly equilibrating), because the first and second sets of HCR monomers cannot hybridize to each other. However, once the initiator is introduced, it is able to hybridize to the exposed toehold region of a first HCR monomer, and invade it, causing it to open up. This exposes the interacting region of the first HCR monomer (e.g. the sequence of complementarity to the toehold region of the second HCR monomers), allowing it to hybridize to and invade a second HCR monomer at the toehold region. This hybridization and invasion in turn opens up the second HCR monomer, exposing its interacting region (which is complementary to the toehold region of the first HCR monomers), and allowing it to hybridize to and invade another first HCR monomer. The reaction continues in this manner until all of the HCR monomers are exhausted (e.g. all of the HCR monomers are incorporated into a polymeric chain). Ultimately, this chain reaction leads to the formation of a nicked chain of alternating units of the first and second monomer species. The presence of the HCR initiator is thus required in order to trigger the HCR reaction by hybridization to and invasion of a first HCR monomer. The first and second HCR monomers are designed to hybridize to one another are thus may be defined as cognate to one another. They are also cognate to a given HCR initiator sequence. HCR monomers which interact with one another (hybridize) may be described as a set of HCR monomers or an HCR monomer, or hairpin, system.

An HCR reaction could be carried out with more than two species or types of HCR monomers. For example, a system involving three HCR monomers could be used. In such a system, each first HCR monomer may comprise an interacting region which binds to the toehold region of a second HCR monomer; each second HCR may comprise an interacting region which binds to the toehold region of a third HCR monomer; and each third HCR monomer may comprise an interacting region which binds to the toehold region of a first HCR monomer. The HCR polymerization reaction would then proceed as described above, except that the resulting product would be a polymer having a repeating unit of first, second and third monomers consecutively. Corresponding systems with larger numbers of sets of HCR monomers could readily be conceived. Branching HCR systems have also been devised and described (see, e.g., WO 2020/123742 incorporated herein by reference), and may be used in the methods herein.

In some instances, similar to HCR reactions that use hairpin monomers, linear oligo hybridization chain reaction (LO-HCR) can also be used for signal amplification. In some instances, provided herein is a method of detecting an analyte in a sample comprising: (i) performing a linear oligo hybridization chain reaction (LO-HCR), wherein an initiator is contacted with a plurality of LO-HCR monomers of at least a first and a second species to generate a polymeric LO-HCR product hybridized to a target nucleic acid molecule, wherein the first species comprises a first hybridization region complementary to the initiator and a second hybridization region complementary to the second species, wherein the first species and the second species are linear, single-stranded nucleic acid molecules; wherein the initiator is provided in one or more parts, and hybridizes directly or indirectly to or is comprised in the target nucleic acid molecule; and (ii) detecting the polymeric product, thereby detecting the analyte. In some instances, the first species and/or the second species may not comprise a hairpin structure. In some instances, the plurality of LO-HCR monomers may not comprise a metastable secondary structure. In some instances, the LO-HCR polymer may not comprise a branched structure. In some instances, performing the linear oligo hybridization chain reaction comprises contacting the target nucleic acid molecule with the initiator to provide the initiator hybridized to the target nucleic acid molecule. In any of the instances herein, the target nucleic acid molecule and/or the analyte can be an RCA product.

In some instances, detection of nucleic acids sequences in situ includes combination of the sequential decoding methods described herein with an assembly for branched signal amplification. In some instances, the assembly complex comprises an amplifier hybridized directly or indirectly (via one or more oligonucleotides) to a sequence of an oligonucleotide probe described herein. In some instances, the assembly includes one or more amplifiers each including an amplifier repeating sequence. In some aspects, the one or more amplifiers is labeled. Described herein is a method of using the aforementioned assembly, including for example, using the assembly in multiplexed error-robust fluorescent in situ hybridization (MERFISH) applications, with branched DNA amplification for signal readout. In some instances, the amplifier repeating sequence is about 5-30 nucleotides, and is repeated N times in the amplifier. In some instances, the amplifier repeating sequence is about 20 nucleotides, and is repeated at least two times in the amplifier. In some aspects, the one or more amplifier repeating sequence is labeled. For exemplary branched signal amplification, see e.g., U.S. Pat. Pub. No. US20200399689A1 and Xia et al., Multiplexed Detection of RNA using MERFISH and branched DNA amplification. Scientific Reports (2019), each of which is fully incorporated by reference herein.

In some instances, an oligonucleotide probe described herein can be associated with an amplified signal by a method that comprises signal amplification by performing a primer exchange reaction (PER). In various instances, a primer with domain on its 3' end binds to a catalytic hairpin, and is extended with a new domain by a strand displacing polymerase. For example, a primer with domain 1 on its 3' ends binds to a catalytic hairpin, and is extended with a new domain 1 by a strand displacing polymerase, with repeated cycles generating a concatemer of repeated domain 1 sequences. In various instances, the strand displacing polymerase is Bst. In various instances, the catalytic hairpin includes a stopper which releases the strand displacing polymerase. In various instances, branch migration displaces the extended primer, which can then dissociate. In various instances, the primer undergoes repeated cycles to form a concatemer primer (see e.g., U.S. Pat. Pub. No. US20190106733, which is incorporated herein by reference, for exemplary molecules and PER reaction components).

Barcoded Analytes and Detection:

A target sequence for a probe disclosed herein may be comprised in any analyte disclose herein, including an endogenous analyte (e.g., a viral or cellular nucleic acid), a labelling agent, or a product generated in the biological sample using an endogenous analyte and/or a labelling agent.

In some aspects, one or more of the target sequences includes or is associated with one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode comprises about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some instances, a barcode includes two or more sub-barcodes that together function as a single barcode. For example, a polynucleotide barcode can include two or more polynucleotide sequences (e.g., sub-barcodes) that are separated by one or more non-barcode sequences. In some instances, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In any of the preceding implementations, barcodes (e.g., primary and/or secondary barcode sequences) can be analyzed (e.g., detected or sequenced) using any suitable method or technique, including those described herein, such as sequencing by synthesis (SBS), sequencing by ligation (SBL), or sequencing by hybridization (SBH). In some instances, barcoding schemes and/or barcode detection schemes as described in RNA sequential probing of targets (RNA SPOTs), single-molecule fluorescent in situ hybridization (smFISH), multiplexed error-robust fluorescence in situ hybridization (MERFISH) or sequential fluorescence in situ hybridization (seqFISH+) can be used. In any of the preceding implementations, the methods provided herein can include analyzing the barcodes by sequential hybridization and detection with a plurality of labelled probes (e.g., detection probes (e.g., detection oligos) or barcode probes). In some instances, the barcode detection steps can be performed as described in hybridization-based in situ sequencing (HybISS). In some instances, probes can be detected and analyzed (e.g., detected or sequenced) as performed in fluorescent in situ sequencing (FISSEQ), or as performed in the detection steps of the spatially-resolved transcript amplicon readout mapping (STARmap) method. In some instances, signals associated with an analyte can be detected as performed in sequential fluorescent in situ hybridization (seqFISH).

In some instances, in a barcode-based detection method, barcode sequences are detected for identification of other molecules including nucleic acid molecules (DNA or RNA) longer than the barcode sequences themselves, as opposed to direct sequencing of the longer nucleic acid molecules. In some instances, a N-mer barcode sequence comprises 4N complexity given a sequencing read of N bases, and a much shorter sequencing read may be required for molecular identification compared to non-barcode sequencing methods such as direct sequencing. For example, 1024 molecular species may be identified using a 5-nucleotide barcode sequence ($4^5$=1024), whereas 8 nucleotide barcodes can be used to identify up to 65,536 molecular species, a number greater than the total number of distinct genes in the human genome. In some instances, the barcode sequences contained in the probes or RCPs are detected, rather than endogenous sequences, which can be an efficient read-out in terms of information per cycle of sequencing. Because the barcode sequences are pre-determined, they can also be designed to feature error detection and correction mechanisms, see, e.g., U.S. Pat. Pub. 20190055594 and WO2019199579A1, which are hereby incorporated by reference in their entirety.

Sequential Hybridization:

In some instances, the present disclosure relates to methods and compositions for encoding and detecting analytes in a temporally sequential manner for in situ analysis of an analyte in a biological sample, e.g., a target nucleic acid in a cell in an intact tissue. In some aspects, provided herein is a method for detecting the detectably-labeled probes, thereby generating a signal signature. In some instances, the signal signature corresponds to an analyte of the plurality of analytes. In some instances, the methods described herein are based, in part, on the development of a multiplexed biological assay and readout, in which a sample is first contacted with a plurality of nucleic acid probes comprising one or more probe types (e.g., labelling agent, circularizable probe, circular probe, etc.), allowing the probes to directly or indirectly bind target analytes, which may then be optically detected (e.g., by detectably-labeled probes) in a temporally-sequential manner. In some instances, the probes or probe sets comprising various probe types may be applied to a sample simultaneously. In some instances, the probes or probe sets comprising various probe types may be applied to a sample sequentially. In some aspects, the method comprises sequential hybridization of labelled probes to create a spatiotemporal signal signature or code that identifies the analyte.

In some aspects, provided herein is a method involving a multiplexed biological assay and readout, in which a sample is first contacted with a plurality of nucleic acid probes, allowing the probes to directly or indirectly bind target analytes, which may then be optically detected (e.g., by detectably-labeled probes) in a temporally sequential manner. The plurality of nucleic acid probes themselves may be detectably-labeled and detected; in other words, the nucleic acid probes themselves serve as the detection probes. In other implementations, a nucleic acid probe itself is not directly detectably-labeled (e.g., the probe itself is not conjugated to a detectable label); rather, in addition to a target binding sequence (e.g., a sequence binding to a barcode sequence in an RCA product), the nucleic acid probe further comprises a sequence for detection which can be recognized by one or more detectably-labeled detection probes. In some instances, the probes or probe sets comprising various probe types may be applied to a sample simultaneously. In some instances, the probes or probe sets comprising various probe types may be applied to a sample sequentially. In some instances, the method comprises detecting a plurality of analytes in a sample.

In some instances, the method presented herein comprises contacting the sample with a plurality of probes comprising one or more probes having distinct labels and detecting signals from the plurality of probes in a temporally sequential manner, wherein said detection generates signal signatures each comprising a temporal order of signal or absence thereof, and the signal signatures correspond to said plurality of probes that identify the corresponding analytes. In some instances, the temporal order of the signals or absence thereof corresponding to the analytes can be unique for each different analyte of interest in the sample. In some instances, the plurality of probes hybridize to an endogenous molecule in the sample, such as a cellular nucleic acid molecule, e.g., genomic DNA, RNA (e.g., mRNA), or cDNA. In some instances, the plurality of probes hybridize to a product of an endogenous molecule in the sample (e.g., directly or indirectly via an intermediate probe). In some instances, the plurality of probes hybridize to labelling agent that binds directly or indirectly to an endogenous molecule in the sample or a product thereof. In some instances, the plurality of probes hybridize to a product (e.g., an RCA product) of a labelling agent that binds directly or indirectly to an endogenous molecule in the sample or a product thereof.

In any of the implementations disclosed herein, the detection of signals can be performed sequentially in cycles, one for each distinct label. In any of the implementations disclosed herein, signals or absence thereof from detectably-labeled probes targeting an analyte in a particular location in the sample can be recorded in a first cycle for detecting a first label, and signals or absence thereof from detectably-labeled probes targeting the analyte in the particular location can be recorded in a second cycle for detecting a second label distinct from the first label. In any of the implementations disclosed herein, a unique signal signature can be generated for each analyte of the plurality of analytes. In any of the implementations disclosed herein, one or more molecules comprising the same analyte or a portion thereof can be associated with the same signal signature.

In some instances, the in situ assays employ strategies for optically encoding the spatial location of target analytes (e.g., mRNAs) in a sample using sequential rounds of fluorescent hybridization. Microcopy may be used to analyze 4 or 5 fluorescent colors indicative of the spatial localization of a target, followed by various rounds of hybridization and stripping, in order to generate a large set of unique optical signal assigned to different analytes. These methods often require a large number of hybridization rounds, and a large number of microscope lasers (e.g., detection channels) to detect a large number of fluorophores, resulting in a one to one mapping of the lasers to the fluorophores. Specifically, each detectably-labeled probe comprises one detectable moiety, e.g., a fluorophore.

In some aspects, provided herein is a method for analyzing a sample using a detectably-labeled set of probes. In some instances, the method comprises contacting the sample with a first plurality of detectably-labeled probes for targeting a plurality of analytes; performing a first detection round comprising detecting signals from the first plurality of detectably-labeled probes; contacting the sample with a second plurality of detectably-labeled probes for targeting the plurality of analytes; performing a second detection round of detecting signals from the second plurality of detectably-labeled probes, thereby generating a signal signature comprising a plurality of signals detected from the first detection round and second detection round, wherein the signal signature corresponds to an analyte of the plurality of analytes.

In some instances, detection of an optical signal comprises several rounds of detectably-labeled probe hybridization (e.g., contacting a sample with detectably-labeled probes), detectably-labeled probe detection, and detectably-labeled probe removal. In some instances, a sample is contacted with plurality first detectably-labeled probes, and said probes are hybridized to a plurality of nucleic acid analytes within the sample in decoding hybridization round 1. In some instances, a first detection round is performed following detectably-labeled probe hybridization. After hybridization and detection of a first plurality of detectably-labeled probes, probes are removed, and a sample may be contacted with a second plurality round of detectably-labeled probes targeting the analytes targeted in decoding hybridization round 1. The second plurality of detectably-labeled probes may hybridize to the same nucleic acid(s) as the first plurality of detectably-labeled probes (e.g., hybridize to an identical or hybridize to new nucleic acid sequence within the same nucleic acid), or the second plurality of detectably-labeled probes may hybridize to different nucleic acid(s) compared to the first plurality of detectably-labeled probes. Following m rounds of contacting a sample with a plurality of detectably-labeled probes, probe detection, and probe removal, ultimately a unique signal signature to each nucleic acid is produced that may be used to identify and quantify said nucleic acids and the corresponding analytes (e.g., if the nucleic acids themselves are not the analytes of interest and each is used as part of a labelling agent for one or more other analytes such as protein analytes and/or other nucleic acid analytes).

In some instances, after hybridization of a detectably-labeled probes (e.g., fluorescently labeled oligonucleotide) that detects a sequence (e.g., barcode sequence on a secondary probe or a primary probe), and optionally washing away the unbound molecules of the detectably-labeled probe, the sample is imaged and the detection oligonucleotide or detectable label is inactivated and/or removed. In some instances, removal of the signal associated with the hybridization between rounds can be performed by washing, heating, stripping, enzymatic digestion, photo-bleaching, displacement (e.g., displacement of detectably-labeled probes with another reagent or nucleic acid sequence), cleavage, quenching, chemical degradation, bleaching, oxidation, or any combinations thereof.

In some examples, removal of a probe (e.g., unhybridizing the entire probe), signal modifications (e.g., quenching, masking, photo-bleaching, signal enhancement (e.g., via FRET), signal amplification, etc.), signal removal (e.g., cleaving off or permanently inactivating a detectable label) can be performed. Inactivation may be caused by removal of the detectable label (e.g., from the sample, or from the probe, etc.), and/or by chemically altering the detectable label in some fashion, e.g., by photobleaching the detectable label, bleaching or chemically altering the structure of the detectable label, e.g., by reduction, etc.). In some instances, the fluorescently labeled oligonucleotide and/or the intermediate probe hybridized to the fluorescently labeled oligonucleotide (e.g., bridge probe) can be removed. In some instances, a fluorescent detectable label may be inactivated by chemical or optical techniques such as oxidation, photobleaching, chemically bleaching, stringent washing or enzymatic digestion or reaction by exposure to an enzyme, dissociating the detectable label from other components (e.g., a probe), chemical reaction of the detectable label (e.g., to a reactant able to alter the structure of the detectable label) or the like. For instance, bleaching may occur by exposure to oxygen, reducing agents, or the detectable label could be chemically cleaved from the nucleic acid probe and washed away via fluid flow.

In some instances, removal of a signal comprises displacement of probes with another reagent (e.g., probe) or nucleic acid sequence. For example, a given probe (e.g., detectably-labeled probes and/or the intermediate probe hybridized to the fluorescently labeled oligonucleotide (e.g., bridge probe)) may be displaced by a subsequent probe that hybridizes to an overlapping region shared between the binding sites of the probes. In some cases, a displacement reaction can be very efficient, and thus allows for probes to be switched quickly between cycles, without the need for chemical stripping (or any of the damage to the sample that is associated therewith). In some instances, a sequence for hybridizing the subsequent or displacer probe (i.e. a toehold sequence) may be common across a plurality of probes capable of hybridizing to a given binding site. In some aspects, a single displacement probe can be used to simultaneously displace detection probes bound to an equivalent barcode position from all of the RCPs within a given sample simultaneously (with the displacement mediated by the subsequent detection probes). This may further increase efficiency and reduce the cost of the method, as fewer different probes are required.

After a signal is inactivated and/or removed, then the sample is re-hybridized in a subsequent round with a subsequent fluorescently labeled oligonucleotide, and the oligonucleotide can be labeled with the same color or a different color as the fluorescently labeled oligonucleotide of the previous cycle. In some instances, as the positions of the analytes, probes, and/or products thereof can be fixed (e.g., via fixing and/or crosslinking) in a sample, the fluorescent spot corresponding to an analyte, probe, or product thereof remains in place during multiple rounds of hybridization and can be aligned to read out a string of signals associated with each target analyte.

Decoding:

A "decoding process" is a process comprising a plurality of decoding cycles in which different sets of barcode probes are contacted with target analytes (e.g., mRNA sequences) or target barcodes (e.g., barcodes associated with target analytes) present in a sample, and used to detect the target sequences or associated target barcodes, or segments thereof. In some instances, the decoding process comprises acquiring one or more images (e.g., fluorescence images) for each decoding cycle. Decoded barcode sequences are then inferred based on a set of physical signals (e.g., fluorescence signals) detected in each decoding cycle of a decoding process. In some instances, the set of physical signals (e.g., fluorescence signals) detected in a series of decoding cycles for a given target barcode (or target analyte sequence) may be considered a "signal signature" for the target barcode (or target analyte sequence). In some instances, a decoding process may comprise, e.g., 1, 2, 3, 4, 5, 6, 7, 8, 9, 10, or more than 10 decoding cycles. In some instances, each decoding cycle may comprise contacting a plurality of target sequences or target barcodes with 1, 2, 3, 4, 5, 6, 7, 8, 9, 10, or more than 10 barcode probes (e.g., fluorescently-labeled barcode probes) that are configured to hybridize or bind to specific target sequences or target barcodes, or segments thereof. In some instances, a decoding process may comprise performing a series of in situ barcode probe hybridization steps and acquiring images (e.g., fluorescence images) at each step. Systems and methods for performing multiplexed fluorescence in situ hybridization and imaging are described in, for example, WO 2021/127019 A1; U.S. Pat. No. 11,021,737; and PCT/EP2020/065090 (WO2020240025A1), each of which is incorporated herein by reference in its entirety.

Anchor Probes:

In some instances, the present methods may further involve contacting the target analyte, e.g., a nucleic acid molecule, or proxy thereof with an anchor probe. In some instances, the anchor probe comprises a sequence complementary to an anchor probe binding region, which is present in all target nucleic acid molecules (e.g., in primary or secondary probes), and a detectable label. The detection of the anchor probe via the detectable label confirms the presence of the target nucleic acid molecule. The target nucleic acid molecule may be contacted with the anchor probe prior to, concurrently with, or after being contacted with the first set of detection probes. In some instances, the target nucleic acid molecule may be contacted with the anchor probe during multiple decoding cycles. In some instances, multiple different anchor probes comprising different sequences and/or different reporters may be used to confirm the presence of multiple different target nucleic acid molecules. The use of multiple anchor probes is particularly useful when detection of a large number of target nucleic acid molecules is required, as it allows for optical crowding to be reduced and thus for detected target nucleic acid molecules to be more clearly resolved.

Methods for Multi-Resolution In Situ Decoding:

The disclosed methods for multi-resolution in situ decoding may be used with a variety of in situ detection and in situ analysis techniques that rely on optical imaging (e.g., fluorescence imaging) to detect the presence and locations of one or more fluorescently-labeled probes (e.g., fluorescently-labeled anchor probes, intermediate probes (e.g., bridge probes), and/or detection probes) to infer the identity or sequence of a target analyte (e.g., an mRNA molecule), or a nucleic acid barcode associated with a target analyte. In some instances, the multi-resolution in situ decoding methods disclosed herein can be used with any of the assays for in situ detection and analysis provided herein.

Various methods and reagents for hybridizing probes to the target analytes directly or indirectly in situ as described herein can be used for detection and analysis. In a general exemplary workflow for performing in situ detection and analysis, the method comprises contacting the sample with a plurality of probes. In various embodiments, each probe has at least one target analyte recognition element (e.g., a target recognition sequence) for hybridizing to the plurality of target analytes in situ. In some instances, the probes further comprise a unique target analyte-specific sequence for detection (e.g., a barcode sequence associated with the target analyte). In some instances, the probes further comprise an anchor probe binding sequence. The workflow may optionally include generating a product (e.g., a hybridization product, a ligation product, an extension product (e.g., by a DNA or RNA polymerase), a replication product, a transcription/reverse transcription product, and/or an amplification product such as a rolling circle amplification (RCA) product) for detecting in situ. In some instances, the bound probes can be directly detected, e.g., by hybridizing a labeled-detection probe. In some instances, the method includes acquiring one or more high resolution image(s) of the biological sample and obtaining one or more lower resolution image(s) of the biological sample. In some instances, one or more high resolution images can be acquired during one or more anchor cycles. In various embodiments, an anchor cycle is configured to cause all probes bound to target analytes (e.g., amplification products) to emit a fluorescent light signal. In some instances, acquiring of the high resolution and lower resolution images can be performed in any suitable order, e.g., the high resolution image may be acquired before or after performing at least one decoding cycle. In some instances, the high resolution image(s) are processed to identify locations of each of the target analytes in the biological sample (e.g., x, y, z coordinates). The exemplary method may further include one or more detection cycles which comprises hybridizing a plurality of detectably labeled detection probes to the bound probes or products thereof.

In some instances, the method includes illuminating the sample with a plurality of color channels (e.g., red, yellow, green, blue, near ultraviolet). In various embodiments, the sample is illuminated with a plurality of colors sequentially. In various embodiments, the sample is illuminated with a first color and a z-stack of images (the z-stack of images defining a first field of view (FOV)) is obtained while illuminating the sample with the first color, the sample is illuminated with a second color and another z-stack of images from the same field of view is obtained while illuminating the sample with the second color, the sample is illuminated with a third color and another z-stack of images from the same field of view is obtained while illuminating the sample with the third color, the sample is illuminated with a fourth color and another z-stack of images from the same field of view is obtained while illuminating the sample with the fourth color. In various embodiments, the sample is illuminated with a fifth color and another z-stack of images from the same field of view is obtained while illuminating the sample with the fifth color.

In various embodiments, the sample is illuminated with a first color and a first plurality of z-stacks (the plurality of z-stacks defining a plurality of FOVs) is obtained, the sample is illuminated with a second color and a second plurality of z-stacks is obtained of the plurality of FOVs, the sample is illuminated with a third color and a third plurality of z-stacks is obtained of the plurality of FOVs, and the sample is illuminated with a fourth color and a fourth plurality of z-stacks is obtained of the plurality of FOVs. In various embodiments, the sample is illuminated with a fifth color and a fifth plurality of z-stacks is obtained of the plurality of FOVs.

In various embodiments, feature data is obtained for each light signal (associated with the plurality of target analytes) in each image. In various embodiments, the feature data includes signal intensity (e.g., an analog intensity value between 0 and 12,000). In various embodiments, the signal intensity is a normalized signal intensity. For example, each channel (e.g., red, yellow, green, blue, near ultraviolet, etc.) of each cycle can be scaled so that the 99th percentile of the channel intensity becomes the median of the 99th percentiles of channel intensity across all channels. In various embodiments, the feature data includes a shape identifier. In various embodiments, the feature data includes a shape similarity metric. In various embodiments, the feature data includes a signal-to-noise ratio. In various embodiments, the feature data includes. In various embodiments, the feature data includes a binary representation of detected light, such as a 1 or 0, for each color channel in each cycle. In various embodiments, a 1 is associated with a particular light signal when the signal intensity is equal to or greater than a predetermined threshold. In various embodiments, the feature data includes a representation of the color channel that is observed, such as an A (a first observed color state), B (a second observed color state), C (a third observed color state), D (a fourth observed color state), or E (no light signal observed). In various embodiments, the feature data includes statistical parameters such as mean, median, standard deviation of one or more variables (e.g., noise, signal intensity, etc.). In various embodiments, determining the feature data includes blob detection. In various embodiments, blob detection includes fitting a Gaussian blob to each light signal. In various embodiments, blob detection includes a Laplacian of a Gaussian approach. In various embodiments, blob detection includes a difference of Gaussians approach. In various embodiments, blob detection includes a determinant of Hessian approach. In various embodiments, blob detection includes a hybrid Hessian-Laplace approach. In various embodiments, the feature data includes three-dimensional positional information for each light signal. In various embodiments, the feature data includes three-dimensional positional information for each blob. In various embodiments, the three-dimensional positional information is at sub-pixel resolution.

In various embodiments, blobs are detected in each image of a z-stack based on the light signals emitted from the fluorescent probes bound to target analytes. In various embodiments, blobs detected in z-stack images from a first probing cycle (across all color channels) are registered to blobs detected in corresponding z-stack images from other probing cycles (e.g., probing cycles 2 through 15). In various embodiments, once blobs are registered to one another to provide spatial correspondence between detected blobs, blobs representing the same target analyte are decoded and a most likely codeword is determined based on a codebook. In various embodiments, the codebook includes known codewords that represent expected light signals for each target analyte (e.g., transcript). In various embodiments, known codewords may be represented as a string of expected illumination states during each cycle (e.g., state A, state B, state C, state, D, state E). In various embodiments, a most-likely codeword is determined from the observed states at each blob across all probing cycles. In various embodiments, an associated target analyte (e.g., transcript) is assigned to each blob based on the most-likely codeword for that blob.

In various embodiments, feature data is obtained from one or more high-resolution images of the sample (e.g., from a plurality of FOVs) for a plurality of light signals associated with a plurality of target analytes. In various embodiments, the high-resolution image includes an anchor cycle where all target analytes are illuminated to thereby emit light signals. In various embodiments, at least one low-resolution images are obtained representing additional cycles of probing of the sample. In various embodiments, feature data extracted from the at least one lower resolution image based on the two-dimensional and/or three-dimensional locations for the target analytes as identified in the one or more high resolution image(s). In various embodiments, each image (e.g., high-resolution image and/or low-resolution image) is monochromatic and has metadata relating to particular color channel being observed.

In various embodiments, a high-resolution image has a resolution of about 0.10 μm/pixel to about 0.50 μm/pixel. In various embodiments, a high-resolution image has a resolution of about 0.10 μm/pixel to about 0.45 μm/pixel. In various embodiments, a high-resolution image has a resolution of about 0.10 μm/pixel to about 0.40 μm/pixel. In various embodiments, a high-resolution image has a resolution of about 0.10 μm/pixel to about 0.35 μm/pixel. In various embodiments, a high-resolution image has a resolution of about 0.10 μm/pixel to about 0.30 μm/pixel. In various embodiments, a high-resolution image has a resolution of about 0.10 μm/pixel to about 0.25 μm/pixel. In various embodiments, a high-resolution image has a resolution of about 0.10 μm/pixel to about 0.20 μm/pixel. In various embodiments, a high-resolution image has a resolution of about 0.05 μm/pixel to about 0.20 μm/pixel. In various embodiments, a high-resolution image has a resolution of about 0.16 μm/pixel. In various embodiments, a high-resolution image has a resolution of less than about 0.50 μm/pixel. In various embodiments, a high-resolution image has a resolution of less than about 0.40 μm/pixel. In various embodiments, a high-resolution image has a resolution of less than about 0.30 μm/pixel. In various embodiments, a high-resolution image has a resolution of less than about 0.20 μm/pixel. In various embodiments, a high-resolution image has a resolution of less than about 0.10 μm/pixel.

In various embodiments, a low-resolution image has a resolution of about 0.50 μm/pixel to about 0.90 μm/pixel. In various embodiments, a low-resolution image has a resolution of about 0.50 μm/pixel to about 0.80 μm/pixel. In various embodiments, a low-resolution image has a resolution of about 0.50 μm/pixel to about 0.70 μm/pixel. In various embodiments, a low-resolution image has a resolution of about 0.50 μm/pixel to about 0.60 μm/pixel. In various embodiments, a low-resolution image has a resolution of about 0.60 μm/pixel to about 0.90 μm/pixel. In various embodiments, a low-resolution image has a resolution of about 0.60 μm/pixel to about 0.80 μm/pixel. In various embodiments, a low-resolution image has a resolution of about 0.60 μm/pixel to about 0.70 μm/pixel. In various embodiments, a low-resolution image has a resolution of greater than about 0.50 μm/pixel. In various embodiments, a low-resolution image has a resolution of greater than about 0.60 μm/pixel. In various embodiments, a low-resolution image has a resolution of greater than about 0.70 μm/pixel. In various embodiments, a low-resolution image has a resolution of greater than about 0.80 μm/pixel. In various embodiments, a low-resolution image has a resolution of greater than about 0.90 μm/pixel.

In various embodiments, after one or more high resolution images is obtained such that positional information is known for each target analyte, downsampling is performed on the high-resolution images obtained thereafter, thus converting these high-resolution images into low-resolution images. In various embodiments, processing the low-resolution image(s) to determine the presence of light signals is computationally faster than processing the corresponding high-resolution image(s) when static locations of the target analytes (and thus the probes bound to the analytes) are already known from one or more prior cycles (e.g., an anchor cycle or multiple probing cycles). In various embodiments, downsampling includes interpolation of pixels in the high-resolution image. In various embodiments, downsampling includes linear interpolation and/or cubic interpolation. In various embodiments, downsampling includes decimation of pixels (e.g., skipping every other pixel). In various embodiments, downsampling includes averaging a predetermined window of pixels into a single pixel value (e.g., averaging a 2×2 window of pixels, averaging a 3×3 window of pixels). In various embodiments, the low resolution has a reduction in resolution of 2× to about 16× (e.g., reduction of 4×, reduction of 9×, etc.) compared to the high-resolution image. In various embodiments, downsampling includes a weighted average of a predetermined window of pixels into a single pixel value. For example, a 3×3 window may be weighted more on the center pixel and weighted less on the edges.

In various embodiments, a mask is generated of the locations of the target analytes based on at least one high-resolution image. In various embodiments, the mask includes centroids of the light signals corresponding to each target analyte. In various embodiments, the mask includes a predetermined shape (e.g., a circle) fitted to the locations of light signals corresponding to each target analyte. In various embodiments, determining a location (e.g., a center) of a light signal includes fitting a Gaussian to the light signal. In various embodiments, the mask is resized and/or downsampled to the same resolution as the low-resolution image. In various embodiments, feature data (e.g., pixel color value, light signal intensity for each color channel, color/signal presence as a binary or alphanumeric value, etc.) from regions of the low-resolution image corresponding to the locations of known target analytes are extracted. In various embodiments, where the mask includes centroid locations, a predetermined radius is sampled around each centroid location in the low-resolution image. In various embodiments, a predetermined number of pixels is sampled around each known location (e.g., centroid). In various embodiments, feature data is extracted from each known location within the low-resolution image (e.g., a predetermined radius around each centroid corresponding to a known location of a target analyte). In various embodiments, the presence of a target analyte in the low-resolution image is determined based on the extracted feature data. In various embodiments, signal intensity from pixels surrounding the centroid may be used to determine presence of a target analyte. For example, average signal intensity can be determined for a predetermined radius around a known centroid. In various embodiments, a probability of the presence of a target analyte is determined. In various embodiments, the probability is determined based on a predetermined probabilistic model (e.g., a sigmoid logistic function). In various embodiments, input to the probabilistic model is the extracted feature data (e.g., signal intensity, color, etc.). In various embodiments, if the probability is above a predetermined threshold, a target analyte is determined to be at that location.

In various embodiments, feature data of the high-resolution image is compared to feature data of the low-resolution image. In various embodiments, shapes (e.g., Gaussians) are fitted to light signals in the high-resolution image and centroids are determined for these shapes to thereby generate a feature surface. In various embodiments, shapes (e.g., Gaussians) are fitted to light signals in the low-resolution image and centroids are determined for these shapes to thereby generate a feature surface. In various embodiments, the feature surface (e.g., centroid, Gaussian parameters, etc.) from the high-resolution image is compared to the feature surface (e.g., centroid, Gaussian parameters, etc.) from the low-resolution image and an overlap score is generated based on the overlapping features (e.g., centroids, Gaussian parameters, etc.). In various embodiments, the best overlap (e.g., the highest-scoring overlap) is the registration between the high-resolution feature surface and the low-resolution feature surface. In various embodiments, the high-resolution image feature data can be used to determine missed light signals in the low-resolution image feature data. In various embodiments, the feature data from the high-resolution image is compared to the feature data from the low-resolution image to determine features that exist in the high-resolution image but not the low-resolution image (or vice versa). In various embodiments, a predetermined area around any missed feature (e.g., centroid) is integrated for intensity to determine if a light signal was missed (e.g., if the integrated intensity is above a predetermined threshold, a light signal was missed).

Figure 2:
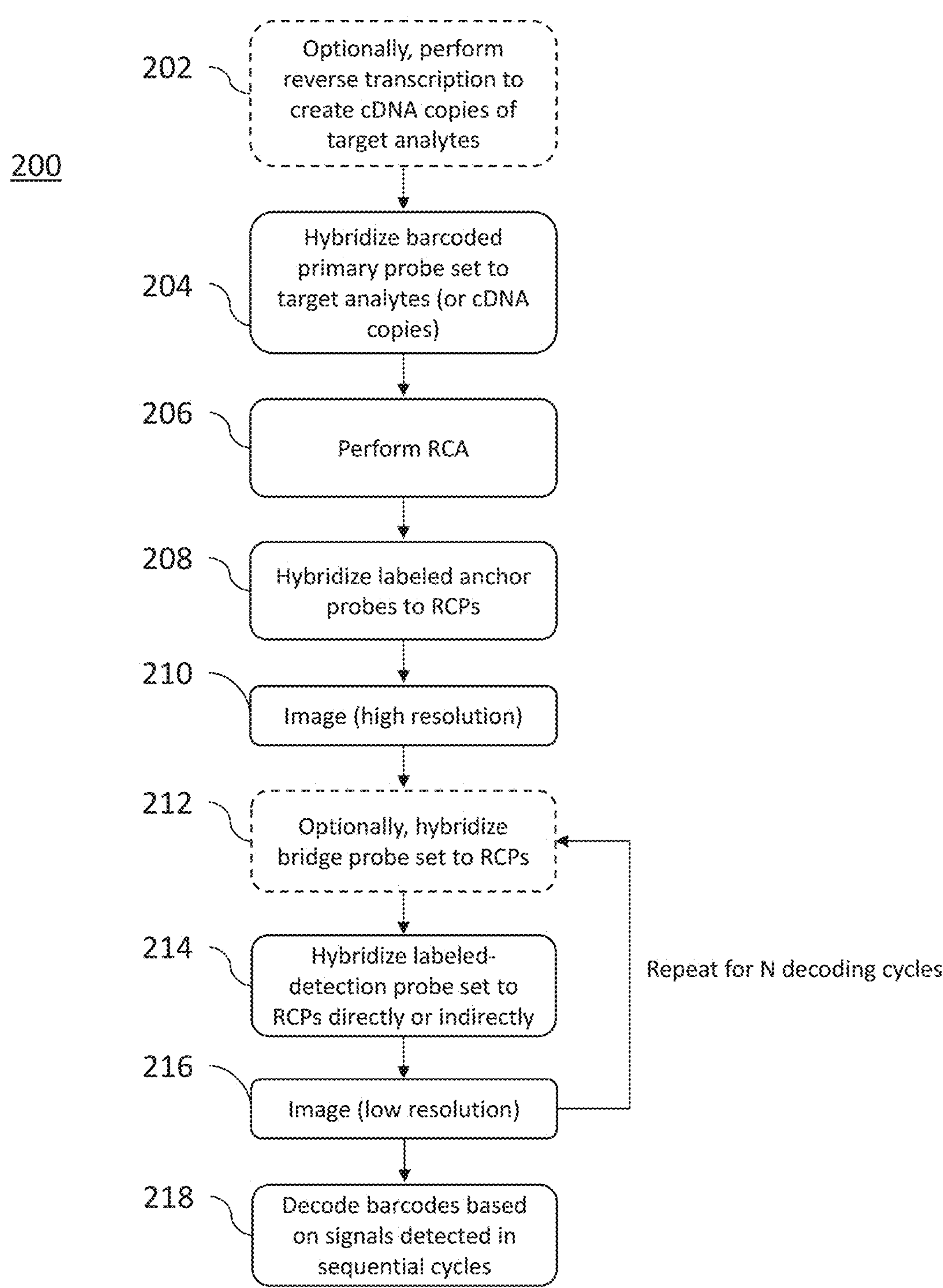
FIG. 2 provides an exemplary process flowchart for performing in situ detection and analysis according to one implementation of the methods described herein.

FIG. 2 provides an exemplary flowchart for a process 200 for performing in situ detection and analysis. In step 202 of the process illustrated in FIG. 2, one may optionally perform an in situ reverse transcription reaction in a biological sample (e.g., a tissue specimen or a layer of cells deposited on a substrate) as described elsewhere herein to create cDNA copies of a plurality of target analytes (e.g., mRNA transcripts).

At step 204 of the process illustrated in FIG. 2, a plurality of primary probes (each comprising a target analyte recognition element (e.g., a target recognition sequence) is hybridized to the plurality of target analytes (or cDNA copies thereof) in situ. In some instances, the primary probes comprise a unique target analyte-specific sequence for detection (e.g., a barcode sequence associated with the target analyte). In some instances, the primary probes comprise an anchor probe binding sequence. The target analyte recognition sequence may comprise, for example, an oligonucleotide sequence ranging from about 4, 6, 8, 10, 12, 14, 16, 18, or 20 nucleotides in length that is complementary to a target gene sequence or gene transcript. The target analyte-specific barcode sequence may comprise, for example, an oligonucleotide sequence consisting of a series of two or more individual bases ("letters"), or two or more short combinations of bases (barcode "segments" or "code words"), as described elsewhere herein. The anchor probe binding sequence may comprise, for example, an oligonucleotide sequence ranging from about 4, 6, 8, 10, 12, 14, 16, 18, or 20 nucleotides in length that is complementary to an anchor probe. In some instances, the anchor probe binding sequence may be the same for all primary probes of the plurality of primary probes. In some instances, different subsets of the plurality of primary probes may comprise different anchor probe binding sequences. Examples of primary probes that may be utilized include, but are not limited to, circular probes, padlock probes, gapped padlock probes, proximity ligation in situ hybridization (PLISH) probes, specific nucleic acid detection via intramolecular ligation (SNAIL) probes, probes for single molecule fluorescence in situ hybridization (smFISH), and multiplexed error-robust fluorescence in situ hybridization (MERFISH). In some instances, a gap-filling reaction (e.g., to attach one or more single nucleotides to an end of the bound primary probe) and/or a ligation reaction (e.g., to join adjacent ends of the bound primary probe) is performed following hybridization of the primary probes to the plurality of target analytes (or cDNA copies thereof).

At step 206 of the process illustrated in FIG. 2, a rolling circle amplification (RCA) reaction is performed in situ, as described elsewhere herein, using the bound primary probes as a template for the reaction. The RCA reaction results in the generation of a plurality of rolling circle amplification products (RCPs), each comprising a concatemer consisting of multiple (e.g., hundreds to thousands) of copies of a target analyte sequence (or a portion or proxy thereof recognized by the primary probe), a target analyte-specific barcode sequence, and/or an anchor probe sequence.

At step 208 of the process illustrated in FIG. 2, an in situ hybridization reaction is performed to hybridize a plurality of detectably labeled anchor probes are hybridized to the plurality of RCPs generated in step 206. In some instances, the plurality of detectably labeled anchor probes may be configured to hybridize (or bind) to all of the RCPs generated in step 206 (e.g., all of the RCPs may comprise the same anchor probe binding sequence). In some instances, the plurality of detectably labeled anchor probes may comprise two or more subsets of detectably labeled anchor probes, each subset configured to hybridize (or bind) to a subset of the RCPs generated in step 206 (e.g., where different subsets of RCPs comprise different anchor probe binding sequences).

In some instances, the use a plurality of detectably labeled anchor probes that comprises two or more subsets of detectably labeled anchor probes may be used to alleviate optical crowding, as described in more detail below. In some instances, for example, different subsets of detectably labeled anchor probes (and their corresponding anchor probe binding sequences) may be assigned to target analytes based on relative expression levels for the target analytes (e.g., so that fewer detectably labeled anchor probes are used to acquire images of RCPs corresponding to highly expressed target analytes).

At step 210 of the process illustrated in FIG. 2, an image of the biological sample is acquired using an objective lens, a tube lens, an image senor resolution, or any combination thereof, that yields a high-resolution image (e.g., a diffraction-limited or near diffraction-limited image). In some instances, the one or more high resolution images may be acquired independently of a plurality of decoding cycles performed to analyze the target analytes or proxies thereof (e.g., barcode sequences associated with specific target analytes). In some instances, the one or more high resolution images may be acquired as part of performing a decoding cycle. In some instances, the one or more high resolution images may be acquired after performing at least one decoding cycle. In some instances, two or more high resolution images of the biological sample may be acquired. In some instances, 1, 2, 3, 4, 5, 6, 7, 8, 9, 10, or more than 10 high resolution images may be acquired.

In some instances, two or more high resolution images of the biological sample may be acquired to ensure that all labeled target analytes (e.g., RCPs each representing a target analyte of interest) are resolved in at least one of the high-resolution images. In some instances, two or more high resolution images of the biological sample may be acquired to ensure that all labeled target analytes (e.g., RCPs each representing a target analyte of interest) are distinguishable in at least one of the high-resolution images. In some instances, two or more high resolution images of the biological sample may be acquired to ensure that all labeled target analytes (e.g., RCPs each representing a target analyte of interest) are not overlapping with other analytes in at least one of the high-resolution images. For example, a first subset of detectably labeled anchor probes (e.g., anchor probed assigned to a first subset of RCPs based on relative expression levels for the corresponding target analytes) may by hybridized to a first subset of RCPs, non-bound probes may be washed out, a first high resolution image may be acquired, and the bound probes may then be removed from the biological sample (e.g., by denaturation and washing). The cycle of hybridization, washing out of unbound probes, and acquisition of another high-resolution image may then be repeated using another subset of detectably labeled anchor probes that are configured to hybridize to a different subset of RCPs (representing a different subset of target analytes). Following the acquisition of each of one or more high resolution images, the bound probes may be removed from the biological sample (e.g., by denaturation and washing).

The one or more high resolution image(s) acquired at step 210, may be processed (e.g., in real time following acquisition, or in a post-image acquisition and storage processing step) to determine the two-dimensional and/or three-dimensional locations of all or a portion of the plurality of target analytes (as represented by labeled RCPs). In some instances, the high-resolution image(s) are processed to identify target analyte locations and the imaging data associated with the high-resolution image(s) can be discarded prior to processing and/or acquiring of the lower resolution images. In some instances, the high-resolution image(s) and the lower resolution image(s) are kept and processed after acquisition is performed for all images.

Various methods for hybridizing detectably labeled detection probes to the RCPs directly or indirectly can be used. For example, at step 212 of the process illustrated in FIG. 2, optionally, a plurality of intermediate bridge probes are hybridized in situ to the plurality of RCPs generated in step 206, where each bridge probe is configured to hybridize to a target analyte-specific barcode sequence present in the plurality of RCPs. In some instances, the plurality of bridge probes may be configured to hybridize to all target analyte-specific barcode sequences present in the plurality of RCPs. In some instances, the method may comprise using two or more subsets of the plurality of bridge probes, wherein each subset of bridge probes is configured to hybridize to a subset of the target analyte-specific barcode sequences present in the plurality of RCPs. The latter approach may help to alleviate optical crowding. In some instances, for example, different subsets of the target analyte-specific barcode sequences may be assigned to target analytes based on relative expression levels for the target analytes (e.g., so that fewer bridge probes (and corresponding detectably labeled detection probes) are used in a given decoding cycle to acquire images of RCPs corresponding to highly expressed target analytes).

At step 214 of the process illustrated in FIG. 2, an in situ hybridization reaction is performed as part of a first decoding cycle of a plurality of decoding cycles to hybridize a plurality of detectably labeled detection probes to the bound bridge probes, where each detection probe is configured to hybridize to one of a plurality of detection probe binding sequences incorporated into the bridge probe. In some instances, the plurality of detectably labeled detection probes used in each cycle of the plurality of decoding cycles may be the same. In some instances, the plurality of detectably labeled detection probes used in different cycles of the plurality of decoding cycles may be different.

At step 216 of the process illustrated in FIG. 2, at least one lower resolution image of the biological sample is acquired in each decoding cycle of the plurality of decoding cycles. Feature data, e.g., signal intensity data for signals associated with the plurality of target analytes (as represented by the labeled RCPs) is extracted from the at least one lower resolution image based on the two-dimensional and/or three-dimensional locations for the target analytes as identified in the one or more high resolution image(s). In some instances, 1, 2, 3, 4, 5, 6, 7, 8, 9, 10, or more than 10 lower resolution images may be acquired and/or generated by processing and downsampling a higher resolution image in each decoding cycle.

In some instances, each lower resolution image is acquired after contacting the biological sample with a different mixture of detectably labeled detection probes in step 214 such that all target analytes (as represented by RCPs) are resolved in at least one of a plurality of lower resolution images acquired in the plurality of decoding cycles.

In some instances, each lower resolution image is acquired after contacting the biological sample with a different subset of detectably labeled detection probes in step 214 that are selected according to a relative gene expression level for a corresponding barcoded target gene transcript (e.g., the detectably labeled detection probes are configured to hybridize to target analyte-specific barcodes that are, in turn, assigned to target analytes based on the relative expression levels for a plurality of target analytes).

In some instances, the ratio of the optical resolution of the high-resolution image to that of the lower resolution image is at least 2×, 5×, 10×, or 20×.

In some instances, one or more high resolution images are acquired using a first objective lens, and one or more lower resolution images are acquired using a second objective lens. In some instances, one or more higher resolution images are acquired using a first tube lens, and one or more lower resolution images are acquired using a second tube lens. In some instances, one or more high resolution images are acquired using the full resolution (or near full resolution) of an image sensor, and one or more lower resolution images are acquired by performing on-chip downsampling of the image sensor. In some instances, the first objective (e.g., the objective used for acquiring the one or more high resolution images) has a smaller field of view compared to that for the second objective (e.g., the objective used for acquiring the one or more lower resolution images). In some instances, the first objective (e.g., the objective used for acquiring the one or more high resolution images) has a larger field of view compared to that for the second objective (e.g., the objective used for acquiring the one or more lower resolution images).

Steps 212 to 216 of the process illustrated in FIG. 2 may be repeated for a plurality of decoding cycles, where the total number of decoding cycles required is determined by the length of the target analyte sequences or proxies thereof (e.g., associated barcode sequences) to be decoded.

At step 218 of the process illustrated in FIG. 2, the signals detected in the sequential cycles of decoding (e.g., the sequential cycles of in situ hybridization of bridge probes, in situ hybridization of detectably labeled detection probes, and low resolution image acquisition, along with the intervening steps of washing out unbound probes and denaturing and removing bound probes) are used to decode the plurality of target analytes or proxies thereof (e.g., barcode sequences associated with specific target analytes). In some instances, the decoding process may be used to infer the identity and/or sequence of a target analyte (e.g., the sequence of an mRNA molecule or portion thereof). In some instances, the decoding process may be used to infer the sequence of a target analyte proxy (e.g., a nucleic acid barcode sequence associated with a specific target analyte).

Figure 3:
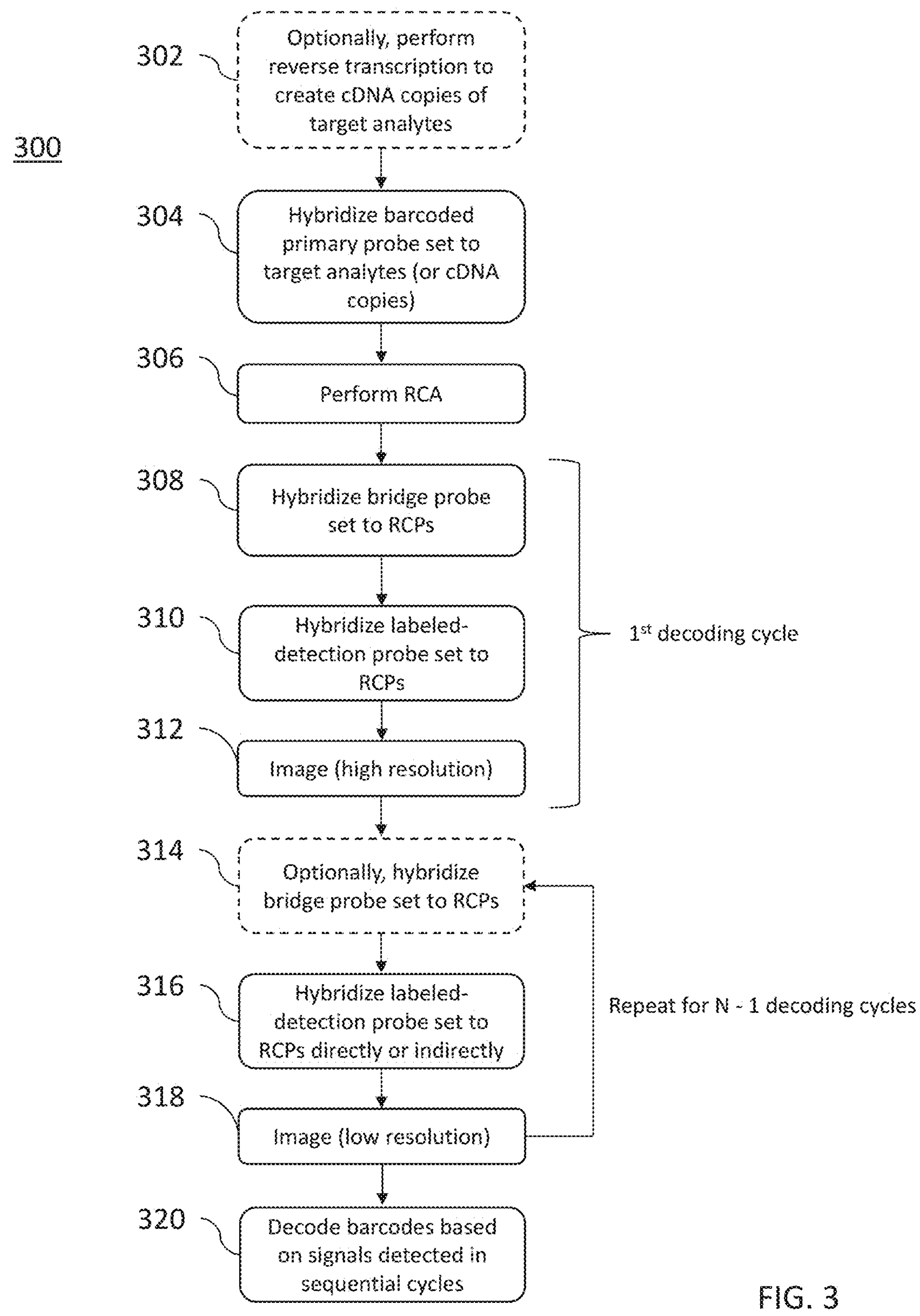
FIG. 3 provides an exemplary process flowchart for performing in situ detection and analysis according to another implementation of the methods described herein.

FIG. 3 provides another exemplary flowchart for a process 300 for performing in situ detection and analysis. In step 302 of the process illustrated in FIG. 3, one may again optionally perform an in situ reverse transcription reaction in a biological sample to create cDNA copies of a plurality of target analytes (e.g., mRNA transcripts).

At step 204 of the process illustrated in FIG. 3, a plurality of primary probes (each comprising a target analyte recognition element (e.g., a target recognition sequence) and a unique target analyte-specific barcode sequence) is hybridized to the plurality of target analytes (or cDNA copies thereof) in situ. Again, examples of primary probes that may be utilized include, but are not limited to, circular or circularizable probes, padlock probes, gapped padlock probes, proximity ligation in situ hybridization (PLISH) probes, and specific nucleic acid detection via intramolecular ligation (SNAIL) probes. In some instances, a gap-filling reaction and/or a ligation reaction may be performed following hybridization of the primary probes to the plurality of target analytes (or cDNA copies thereof).

At step 306 of the process illustrated in FIG. 3, a rolling circle amplification (RCA) reaction is performed in situ, as described elsewhere herein, using the bound primary probes to prime the reaction. The RCA reaction results in the generation of a plurality of rolling circle amplification products (RCPs), each comprising a concatemer consisting of multiple (e.g., hundreds to thousands) of copies of a target analyte sequence (or a portion or proxy thereof recognized by the primary probe) and a target analyte-specific barcode sequence.

At step 308 of the process illustrated in FIG. 3, an in situ hybridization reaction is performed as part of, e.g., a first decoding cycle of a plurality of decoding cycles, to hybridize a plurality of bridge probes to the plurality of RCPs, where the plurality of bridge probes is configured to collectively hybridize (or bind) to all of the RCPs generated in step 306.

At step 310 of the process illustrated in FIG. 3, an in situ hybridization reaction is performed as part of, e.g., a first decoding cycle of a plurality of decoding cycles, to hybridize a plurality of detectably labeled detection probes to the bound bridge probes, where each detection probe is configured to hybridize to one of a plurality of detection probe binding sequences incorporated into the bridge probe, and where the plurality of detectably labeled detection probes is selected to ensure that at least one detectably labeled detection probe is bound to every bound bridge probe for every target analyte of the plurality of target analytes (as represented by their corresponding RCPs).

At step 312 of the process illustrated in FIG. 3, an image of the biological sample is acquired using an objective lens, a tube lens, an image senor resolution, or any combination thereof, that yields a high-resolution image (e.g., a diffraction-limited or near diffraction-limited image). In some instances, the high-resolution image may be acquired after as part of performing a first decoding cycle. In some instances, the high-resolution image may be acquired as part of performing any other decoding cycle in a plurality of decoding cycles. In some instances, two or more high resolution images of the biological sample may be acquired.

In some instances, the use a plurality of detectably labeled detection probes that comprises two or more subsets of detectably labeled detection probes may be used to alleviate optical crowding. In some instances, for example, different subsets of detectably labeled detection probes (and the corresponding detection probe binding sequences on the corresponding bridge probes) may be assigned to target analytes based on relative expression levels for the target analytes to help alleviate optical crowding (e.g., so that fewer detectably labeled detection probes are used in a given decoding cycle to acquire images of RCPs corresponding to highly expressed target analytes).

In some instances, two or more high resolution images of the biological sample may be acquired to ensure that all labeled RCPs (each representing a target analyte of interest) are resolved in at least one of the high-resolution images. For example, a first subset of detectably labeled detection probes (e.g., detection probed assigned to a first subset of RCPs based on relative expression levels for the corresponding target analytes) may by hybridized to the bound bridge probes on a first subset of RCPs, non-bound detection probes may be washed out, a first high resolution image may be acquired, and the bound detection probes (and bridge probes) may then be removed from the biological sample (e.g., by denaturation and washing). The cycle of probe hybridization (e.g., bridge probe hybridization and detection probe hybridization), washing out of unbound probes, and acquisition of another high-resolution image may then be repeated using another subset of detectably labeled detection probes that are configured to hybridize to the bound bridge probes on a different subset of RCPs (representing a different subset of target analytes). Following the acquisition of each of one or more high resolution images, the bound probes (e.g., detection probed and/or bridge probes) may be removed from the biological sample (e.g., by denaturation and washing).

In some instances, the method may further comprise acquiring 2, 3, 4, 5, 6, 7, 8, 9, 10, 11, 12, 13, 14, 15, 16, 17, 18, 19, or 20 or more first images to ensure that every target analyte of the plurality is visible in at least one of the two or more first images. In some instances, the first images are obtained across various cycles wherein each cycles comprises a subset of signals from all analytes. In some instances, each image of the two or more first images acquired comprises at least some different signals compared to other first images. For example, in some instances, each image of the two or more first images is acquired after iteratively contacting the biological sample with a different subset of a plurality of detectably labeled anchor probes.

The high-resolution image(s) acquired at step 312, may be processed (e.g., in real time following acquisition, or in a post-image acquisition and storage processing step) to determine the two-dimensional and/or three-dimensional locations of all or a portion of the plurality of target analytes (as represented by labeled RCPs).

Various methods for hybridizing detectably labeled detection probes to the RCPs directly or indirectly can be used. For example, at step 314 of the process illustrated in FIG. 3, optionally, a plurality of bridge probes are hybridized in situ to the plurality of RCPs generated in step 306 as part of the current decoding cycle, where again each bridge probe is configured to hybridize to a target analyte-specific barcode sequence present in the plurality of RCPs. In some instances, the plurality of bridge probes may be configured to hybridize to all target analyte-specific barcode sequences present in the plurality of RCPs. In some instances, the method may comprise using two or more subsets of the plurality of bridge probes, wherein each subset of bridge probes is configured to hybridize to a subset of the target analyte-specific barcode sequences present in the plurality of RCPs. The latter approach may help to alleviate optical crowding. In some instances, for example, different subsets of the target analyte-specific barcode sequences may be assigned to target analytes based on relative expression levels for the target analytes (e.g., so that fewer bridge probes (and corresponding detectably labeled detection probes) are used to acquire images of RCPs corresponding to highly expressed target analytes in a given decoding cycle).

At step 316 of the process illustrated in FIG. 3, an in situ hybridization reaction is performed as part of the current decoding cycle to hybridize a plurality of detectably labeled detection probes to the bound bridge probes, where each detection probe is configured to hybridize to one of a plurality of detection probe binding sequences incorporated into the bridge probe. In some instances, the plurality of detectably labeled detection probes used in each cycle of the plurality of decoding cycles may be the same. In some instances, the plurality of detectably labeled detection probes used in different cycles of the plurality of decoding cycles may be different.

At step 318 of the process illustrated in FIG. 3, at least one lower resolution image of the biological sample is acquired in each decoding cycle of the plurality of decoding cycles. Feature data, e.g., signal intensity data for signals associated with the plurality of target analytes (as represented by the labeled RCPs) is extracted from the at least one lower resolution image based on the two-dimensional and/or three-dimensional locations for the target analytes as identified in the one or more high resolution image(s).

In some instances, each lower resolution image is acquired after contacting the biological sample with a different mixture of detectably labeled detection probes in step 316 such that all target analytes (as represented by RCPs) are resolved in at least one of a plurality of lower resolution images acquired in the plurality of decoding cycles.

In some instances, each lower resolution image is acquired after contacting the biological sample with a different subset of detectably labeled detection probes in step 316 that are selected according to a relative gene expression level for a corresponding barcoded target gene transcript (e.g., the detectably labeled detection probes are configured to hybridize to target analyte-specific barcodes that are, in turn, assigned to target analytes based on the relative expression levels for a plurality of target analytes).

In some instances, any suitable pair of objectives with a desired difference in magnification and/or numerical aperture (NA) can be used for the first and second objective. In some instances, the ratio of the optical resolution of the high-resolution image to that of the lower resolution image is at least 2×, 5×, 10×, or 20×. In some instances, the ratio of the image magnification of the high-resolution image to that of the lower resolution image is at least 2×, 5×, 10×, or 20×.

In some instances, one or more high resolution images are acquired using a first objective lens, and one or more lower resolution images are acquired using a second objective lens. In some instances, one or more higher resolution images are acquired using a first tube lens, and one or more lower resolution images are acquired using a second tube lens. In some instances, one or more high resolution images are acquired using the full resolution (or near full resolution) of an image sensor, and one or more lower resolution images are acquired by performing on-chip downsampling of the image sensor.

Steps 314 to 318 of the process illustrated in FIG. 3 may be repeated for a plurality of decoding cycles, where the total number of decoding cycles required is determined by the length of the target analyte sequences or proxies thereof (e.g., associated barcode sequences) to be decoded.

At step 320 of the process illustrated in FIG. 3, the signals detected in the sequential cycles of decoding (e.g., the sequential cycles of in situ hybridization of bridge probes, in situ hybridization of detectably labeled detection probes, and low resolution image acquisition, along with the intervening steps of washing out unbound probes and denaturing and removing bound probes) are used to decode the plurality of target analytes or proxies thereof (e.g., barcode sequences associated with specific target analytes). In some instances, the decoding process may be used to infer the identity and/or sequence of a target analyte (e.g., the sequence of an mRNA molecule or portion thereof). In some instances, the decoding process may be used to infer the sequence of a target analyte proxy (e.g., a nucleic acid barcode sequence associated with a specific target analyte).

In some instances of the disclosed methods, the high-resolution image(s) may be processed either in real time following image acquisition, or in a post-image acquisition and storage processing step, to identify locations for the plurality of target analytes (as represented by the plurality of RCPs), or proxies thereof.

In some instances of the disclosed methods, the low-resolution image(s) may be processed either in real time following image acquisition, or in a post-image acquisition and storage processing step, to extract the signals used for decoding the plurality of target analytes (as represented by the plurality of RCPs), or proxies thereof. In some instances, one or more high resolution images and one or more lower resolution images are acquired at the same resolution or at the same magnification, and the lower resolution images are obtained by computationally downsampling the full resolution/magnification images to create a magnification difference between the higher resolution images and the lower resolution images. In some aspects, downsampling of the images to generate lower resolution images can provide speed and data storage advantages. In some instances, the at least one first image comprises at least one processed and downsampled image as described herein.

In some instances of the disclosed methods, the extraction of feature data, e.g., signal intensity data, from one or more lower resolution images may comprise identifying a region of interest (ROI) in the lower resolution image for each location of a target analyte identified in a high resolution image. In some instances, the extraction of feature data, e.g., signal intensity data, from one or more lower resolution images further comprises determining a signal intensity for each region of interest (ROI) identified in the lower resolution image.

In some instance, the methods disclosed herein may further comprise acquiring two or more high resolution images at two or more time points. In some instances, the method comprises using the two or more high resolution images (or the locations of labeled RCPs resolved therein) to correct for deformation of the tissue specimen over time.

In some instances, the methods disclosed herein may further comprise acquiring a series of high-resolution images. In some instances, the series of high-resolution images may comprise a series of images acquired in different detection channels. In some instances, the series of high-resolution images may comprise a series of images acquired of different fields of view. In some instances, the series of high-resolution images comprises a series of images acquired of different fields of view that can be tiled to form a larger image representative of the biological sample.

In some instances of the disclosed methods (e.g., for methods comprising the use of volumetric imaging), a focal plane of each image in the series of high-resolution images may be offset relative to focal planes for other images in the series in a direction parallel to an optical axis of the imaging system used to acquire the images. In some instances, series of images comprises a z-stack of images. In some instances, at least one lower resolution image may comprise a two-dimensional image. In these instances, at least one lower resolution image may comprise a single two-dimensional image having a larger depth of field than that for the series of high-resolution images, and the feature data, e.g. signal intensity data, for signals associated with all or a portion of the plurality of target analytes (as represented by labeled RCPs) may be extracted from the at least one lower resolution image based on two-dimensional coordinates of the locations for the plurality of target analytes identified in the series of high-resolution images. In other instances, at least one second image may comprise a larger depth of field than that for the series of high-resolution images, and the feature data, e.g. signal intensity data, for signals associated with all or a portion of the plurality of target analytes may be extracted from the at least one lower resolution image based on three-dimensional coordinates of the locations for the plurality of target analytes identified in the series of high resolution images. In some instances, in addition to location, other information can be obtained from the series of high-resolution images (e.g., approximate size, dimensions, shape, and/or volume of each target analyte identified). In some aspects, the approximate size, dimensions, shape, and/or volume can be used to specify a model of the feature. In some instances, each target analyte is separable and individually localizable in the high-resolution image(s). In some instances, the extraction of feature data, e.g. signal intensity data, from the at least one lower resolution image may comprise use of the three-dimensional coordinates of the locations for the plurality of barcoded target analytes to deconvolve the at least one lower resolution image. In some instances, a region of interest can be located in the at least one lower resolution image by using the identified location and optionally other information (e.g., approximate size, dimensions, shape and/or volume) of the target analyte in the high-resolution image(s), and interpolating the signal intensities.

In some instances, the feature locations in three dimensions obtained from the at least one first image can be applied to the at least one second image (e.g., low resolution or under-sampled images). In some instances, fiducial markers (e.g., alignment beads) can be used to localize one or more feature locations and serve as common reference points, for registration of features. For example, a at least one first image is obtained of a plurality of beads and the location of the plurality of beads can be correlated to one or more second images (e.g., obtained in various cycles or imaging rounds). In some instances, a plurality of beads on a support is imaged. In some instances, the methods comprise providing a plurality of beads on a support and a biological sample is provided on the support. In some instances, the method comprises detecting locations of the plurality of beads in the at least one first image and performing a registration of at least one second images based on the detected locations. In some instances, the features for the beads is extracted from the at least one first images and for areas of the sample surrounding the beads. In some instances, a bead can be detected in a plurality of images (e.g., first images and second images) and the data is used to register the images comprising the same bead.

In some instances, the plurality of fiducial markers comprises beads, microspheres, microparticles, or any combination thereof. In some instances, the bead comprises a bead core. In some instances, the bead is functionalized. In some instances, the bead core comprises non-porous silica or an organic polymer. A bead may be spherical or an irregularly shaped. A bead or support may be porous. A bead's size may range from nanometers, e.g., 10 nm, to millimeters, e.g., 1 mm. For example, the diameter of the beads is about 0.05 micrometers to about 1 micrometers. In some instances, the beads can be equal to, or larger than, the pixel size of the image. In some embodiments, the diameter of the beads is about the same as the diameter of the feature (e.g., a fluorescent spot corresponding to an analyte, probe, or product thereof). In some instances, the bead may be, but is not limited to, a polystyrene bead, a polymer bead, a polyacrylate bead, a methylstyrene bead, an agarose bead, a cellulose bead, a dextran bead, an acrylamide bead, a solid core bead, a porous bead, a paramagnetic bead, glass bead, a controlled pore bead, a silica-based bead, or any combinations thereof. In some instances, the beads are labeled (e.g., fluorescently labeled). In some instances, a plurality of different sets of beads can be use (e.g., each set of beads can be labeled with a different fluorophore).

In some instances of the disclosed methods, at least one first image (e.g., high resolution image) may comprise a bright-field image, the at least one lower resolution image may comprise a fluorescence image, and the signals comprise fluorescence signals. In some instances, the high-resolution images and lower resolution images may comprise fluorescence images, and the signals comprise fluorescence signals. In some instances, both the high-resolution images and low resolution images may be acquired using a multichannel fluorescence imaging system.

In some instances the disclosed methods may comprise the use of detectably labeled detection probes (e.g., fluorescently-labeled oligonucleotide probes) that are distinct from the detection probes used for decoding and/or used in addition to detection probes used for decoding. Such probes may be used, for example, to separate signals for different target analytes into different color channels and/or to visualize and resolve all of the target analytes of interest (as represented by their corresponding RCPs) in at least one high resolution image. In some instances, detectably labeled detection probes with additional labels (e.g., fluorophores) and/or additional color channels not used for decoding can be used to acquire the at least one high resolution image (e.g., for image registration). In some cases, the signals for the high-resolution image(s) may be overlapping but still useful for identifying locations of the target analytes. In some instances, the use of detectably labeled detection probes with additional labels (e.g., fluorophores) and/or additional color channels not used for decoding to acquire the at least one high resolution image may allow a greater number of analytes (e.g., spots) to be detected in the at least one high resolution image compared to a method that does not use the additional labels or color channels.

In some instances, the disclosed methods may comprise contacting the biological sample with detectably labeled detection probes or detectably labeled anchor probes progressively without removing (e.g., stripping) bound probes between images. The in situ hybridization reaction can be very fast, so additional probes can be added, hybridized, and another image acquired in a few seconds without removing (e.g., stripping) the bound probes between images. In some instances, the one or more high resolution images comprise an initial image with a subset of all of the target analytes of interest resolved, and subsequent high resolution images comprise signals associated with additional target analytes progressively. In some aspects, the subsequent images (comprising a greater number of target analytes compared to previous images) can be processed to remove signals associated with target analytes in the previous images. In some cases, the initial or previous images are not optically crowded and with the progressive addition of detectably labeled detection probes, the subsequent images may comprise signals that are optically crowded or the signals can be overlapping. In some cases using the progressive addition of probes imaged in subsequent images, crowded images can be informative and useful. In some instances, the biological sample is initially contacted with detectably labeled detection probes or detectably labeled anchor probes for detecting specific target analytes (e.g., low abundance gene transcripts) where increased feature detection sensitivity is required.

In some instances, the disclosed methods may comprise the use of detection probes (e.g., detectably labeled detection probes or detectably labeled anchor probes) that are labeled with more than one fluorophore. In some instances, each of the detection probe may be labeled with 1, 2, 3, 4, 5, or more than 5 fluorophores. In some instances, the detection probe may comprise two fluorophores—on conjugated to the 3' end of the detection probe, and one conjugated to the 5' end of the detection probe so that the detection probe generates a positive signal in two detection channels.

Figure 4:
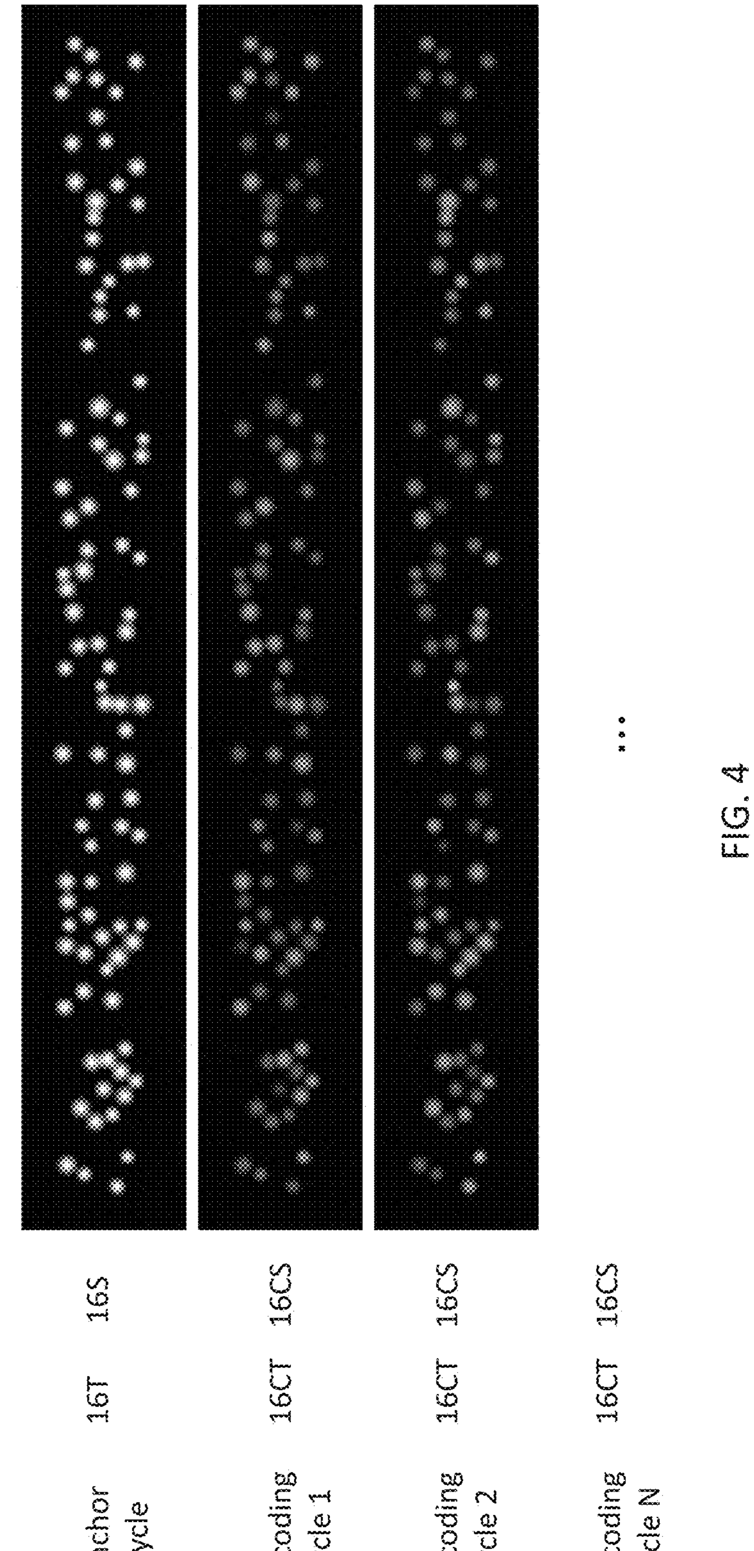
FIG. 4 provides an exemplary illustration of high resolution in situ decoding, according to various embodiments.

FIG. 4 provides an exemplary illustration of high resolution in situ decoding. The three images shown in the figure correspond to images taken in an anchor cycle of the decoding process (upper image; using a detectably labeled anchor probe set that recognizes and binds to all target analytes of interest (as represented by corresponding RCPs)), and in the first (middle image) and second (lower image) cycles of the decoding process (using detectably labeled detection probes that collectively target all analytes of interest in each decoding cycle). The size of the individual features (RCPs) in these images was 1.0±0.1 μm. The images were acquired in 4 color channels using a 40×, 0.95 NA objective at an overall image magnification corresponding to 0.16 μm/pixel at the image sensor. Under this decoding scenario and set of image acquisition settings, the total time required to acquire images over N decoding cycles in C color channels is given by:

$$\text{Total time} = (N * C + 1) * M * F * T$$

where M is the magnification scale factor relative to a lower resolution image (e.g., M=16 for imaging using a 40× objective as compared to a 10× objective), F is the number of field-of-view (FOV) images in the high-resolution image, and T is the acquisition time per FOV (i.e., the sum of the exposure time and average stage translation time, in seconds). The total data storage requirement is given by:

$$\text{Total data storage requirement} = (N * C + 1) * M * F * S$$

where S is the size of a single image (gigabytes).

The high-resolution decoding scheme illustrated in FIG. 4 results in high accuracy in densely labeled regions, but at the cost of longer image times and/or large data sets. Thus, only relatively small sample areas (e.g., small tissue sample areas) may be imaged in a given time.

Figure 5:
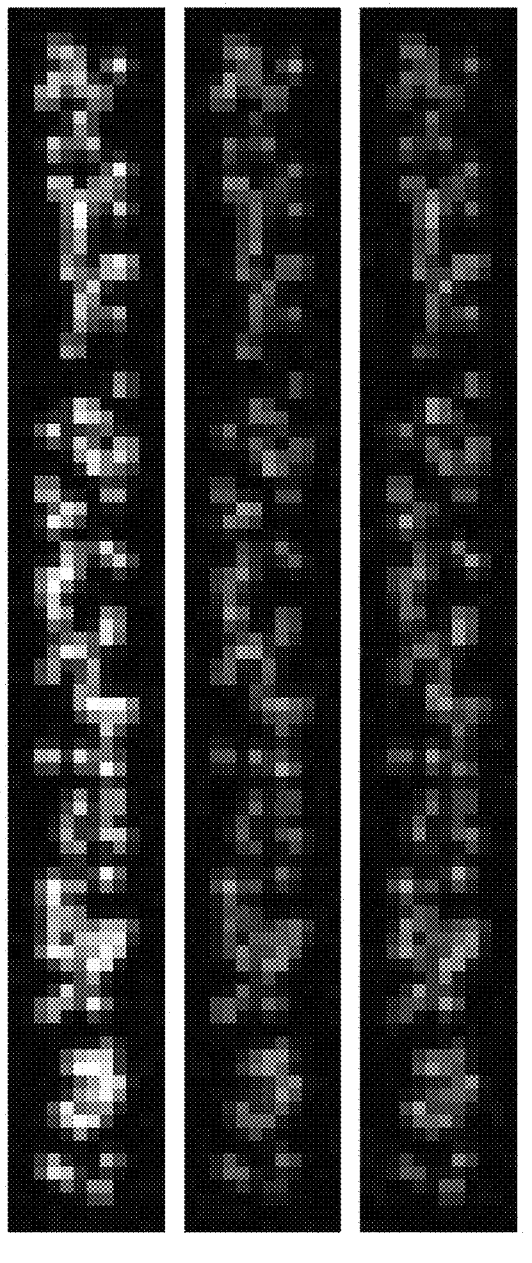
FIG. 5 provides an exemplary illustration of low resolution in situ decoding, according to various embodiments.

FIG. 5 provides an exemplary illustration of low resolution in situ decoding. The three images shown in the figure correspond to images taken in an anchor cycle of the decoding process (upper image; using a detectably labeled anchor probe set that recognizes and binds to all target analytes of interest (as represented by corresponding RCPs)), and in the first (middle image) and second (lower image) cycles of the decoding process (using detectably labeled detection probes that collectively target all analytes of interest in each decoding cycle). Again, the size of the individual features (RCPs) in these images was 1.0±0.1 μm. The images were acquired in 4 color channels using a 10×, 0.45 NA objective at an overall image magnification corresponding to 0.64 μm/pixel at the image sensor. Under this decoding scenario and set of image acquisition settings, the total time required to acquire images over N decoding cycles in C color channels is given by:

$$\text{Total time} = (N*C+1)*F*T$$

where F is the number of field-of-view (FOV) images in the high-resolution image, and T is the acquisition time per FOV, and the total data storage requirement is given by:

$$\text{Total data storage requirement} = (N*C+1)*F*S$$

where S is the size of a single image (gigabytes).

The low-resolution decoding scheme illustrated in FIG. 5 results in low accuracy in densely labeled regions, but with the relative advantages of short imaging times and small data sets. Thus, larger sample areas (e.g., tissue sample areas) may be imaged in a given time, but at the cost of lower accuracy in locating and extracting signals from features (e.g., single RCPs).

Figure 6:
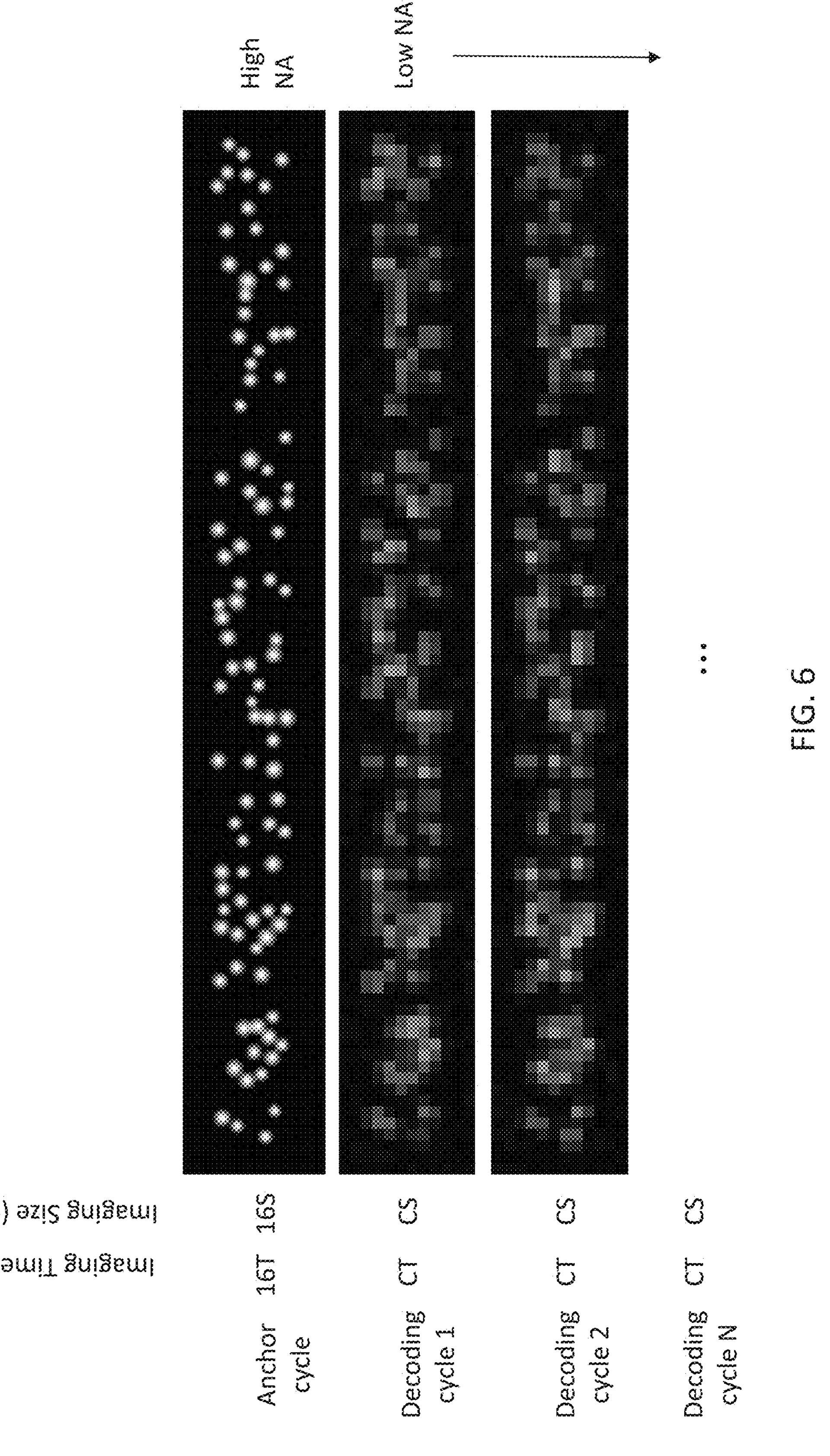
FIG. 6 provides an exemplary illustration of a first approach to performing multi-resolution in situ decoding, according to various embodiments.

FIG. 6 provides an exemplary illustration of a first approach to performing multi-resolution in situ decoding. The three images shown in the figure again correspond to a high-resolution image taken in an anchor cycle of the decoding process (upper image; using a detectably labeled anchor probe set that recognizes and binds to all target analytes of interest (as represented by corresponding RCPs)), and to lower resolution images acquired in the first (middle image) and second (lower image) cycles of the decoding process. Again, the size of the individual features (RCPs) in these images was 1.0±0.1 μm.

The high-resolution image for the anchor cycle was acquired using a 10×, 0.45 NA objective at an overall image magnification corresponding to 0.64 μm/pixel at the image sensor. The lower resolution images acquired in the first, second, . . . , through $N^{th}$ decoding cycle were acquired using a 10×, 0.45 NA objective at an overall image magnification corresponding to 0.64 μm/pixel at the image sensor. Under this decoding scenario and set of image acquisition settings, the total time required to acquire images over N decoding cycles in C color channels is given by:

$$\text{Total time} = (N*C+M)*F*T$$

where M is the magnification scale factor, F is the number of field-of-view (FOV) images in the high-resolution image, and T is the acquisition time per FOV. The total data storage requirement is given by:

$$\text{Total data storage requirement} = (N*C+M)*F*S$$

where S is the size of a single image (gigabytes).

The multi-resolution decoding scheme illustrated in FIG. 6 results in high accuracy in densely labeled regions, but with much shorter total imaging times (e.g., 10.0× faster than high resolution decoding for N=6 decoding cycles; 11.7× faster for N=10 decoding cycles; and 13.5× faster for N=20 decoding cycles), and smaller data storage requirements (e.g., 10% of high resolution storage requirements for N=6 decoding cycles; 8.5% for N=10 decoding cycles; and 7.4% for N=20 decoding cycles), such that larger sample areas (e.g., larger tissue sample areas) may be imaged in a given time with the relative increase in image acquisition speed increases (and the total time requirement decreases) for decoding processes comprising a larger number of cycles.

Figure 7A:
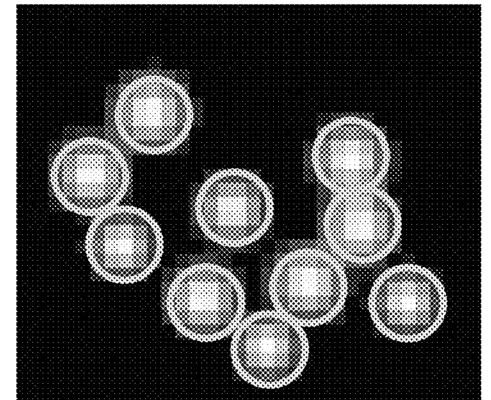
FIGS. 7A-7B provide exemplary illustrations of determining fluorescence intensities for features (e.g., fluorescently-labeled barcode probes attached to target analytes) using the multi-resolution in situ decoding method illustrated in FIG. 6, according to various embodiments.
Figure 7B:
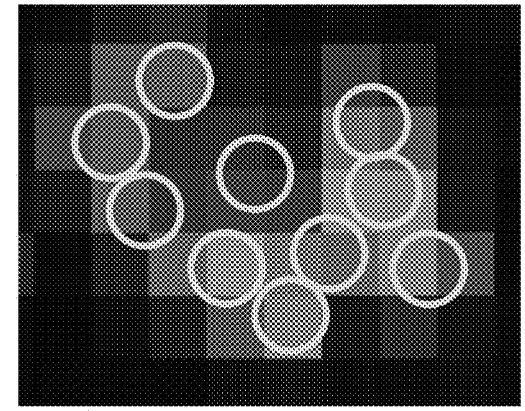

FIGS. 7A-7B provide exemplary illustrations of determining fluorescence intensities for features (e.g., fluorescently-labeled detection probes attached directly or indirectly to target analytes (or their corresponding RCPs)) using the multi-resolution in situ decoding method illustrated in FIG. 6. Feature detection and segmentation was performed using the high-resolution image acquired during an anchor cycle (FIG. 7A). The prior knowledge of feature (e.g., blob) location thus obtained was then used to interpolate and extract intensities from the lower resolution (e.g., downsampled) images acquired in the decoding cycles (FIG. 7B).

Figure 8:
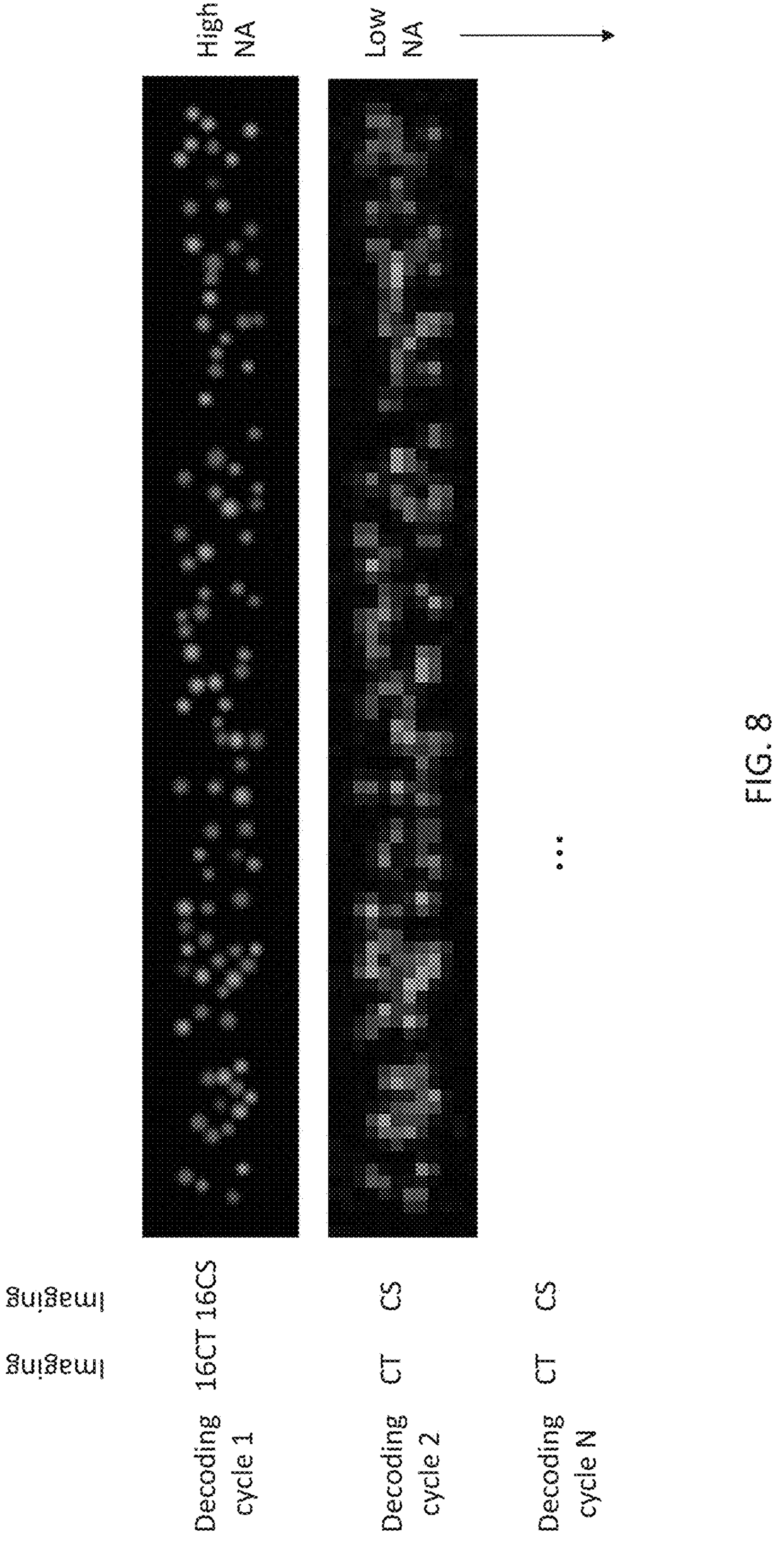
FIG. 8 provides an exemplary illustration of a second approach to performing multi-resolution in situ decoding, according to various embodiments.

FIG. 8 provides an exemplary illustration of a second approach to performing multi-resolution in situ decoding. The upper image is a high-resolution image acquired in a first decoding cycle using a 40×, 0.95 NA objective at a total image magnification corresponding to 0.16 μm/pixel at the image sensor. The lower image is a lower resolution image acquired in the second decoding cycle of the decoding process using a 10×, 0.45 NA objective at a total image magnification corresponding to 0.64 μm/pixel at the image sensor. Under this decoding scenario and set of image acquisition settings, the total time required to acquire images over N decoding cycles in C color channels is given by:

$$\text{Total time} = (M+N-1)*C*F*T$$

where M is the magnification scale factor, F is the number of field-of-view (FOV) images in the high resolution image, and T is the acquisition time per FOV, and the total data storage requirement is given by:

$$\text{Total data storage requirement} = (M+N-1)*C*F*S$$

where S is the size of a single image (gigabytes).

The multi-resolution decoding scheme illustrated in FIG. 8 again results in high accuracy in densely labeled regions, but with much shorter total imaging times (e.g., 4.8× faster than high resolution decoding for N=6 decoding cycles; 6.6× faster for N=10 decoding cycles; and 9.3× faster for N=20 decoding cycles), and smaller data storage requirements (e.g., 21% of high resolution storage requirements for N=6 decoding cycles; 15% for N=10 decoding cycles; and 11% for N=20 decoding cycles), such that larger sample areas (e.g., larger tissue sample areas) may be imaged in a given time with the relative increase in image acquisition speed increases (and the total time requirement decreases) for decoding processes comprising a larger number of cycles.

Figure 9A:
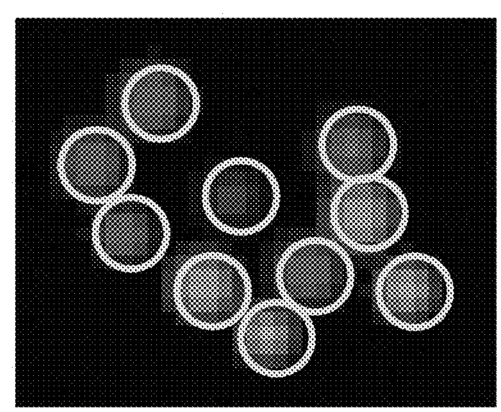
FIGS. 9A-9B provide exemplary illustrations of determining fluorescence intensities for features (e.g., fluorescently-labeled barcode probes attached to target analytes) using the multi-resolution in situ decoding method illustrated in FIG. 8, according to various embodiments.
Figure 9B:
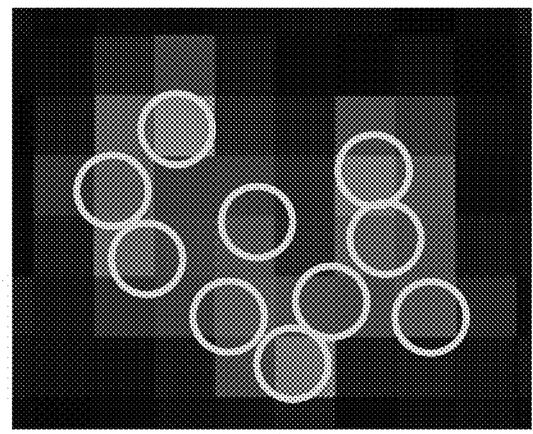

FIGS. 9A-9B provide exemplary illustrations of determining fluorescence intensities for features (e.g., fluorescently-labeled detection probes attached directly or indirectly to target analytes (or their corresponding RCPs)) using the multi-resolution in situ decoding method illustrated in FIG. 8. Feature detection and segmentation was performed using the high-resolution image acquired during the first decoding cycle (FIG. 9A), where localization of features could be spread out of multiple detection (color)

channels. The prior knowledge of feature location thus obtained was then used to interpolate and extract intensities from the lower resolution (under-sampled) images acquired in the subsequent decoding cycles (FIG. 9B).

Figure 10:
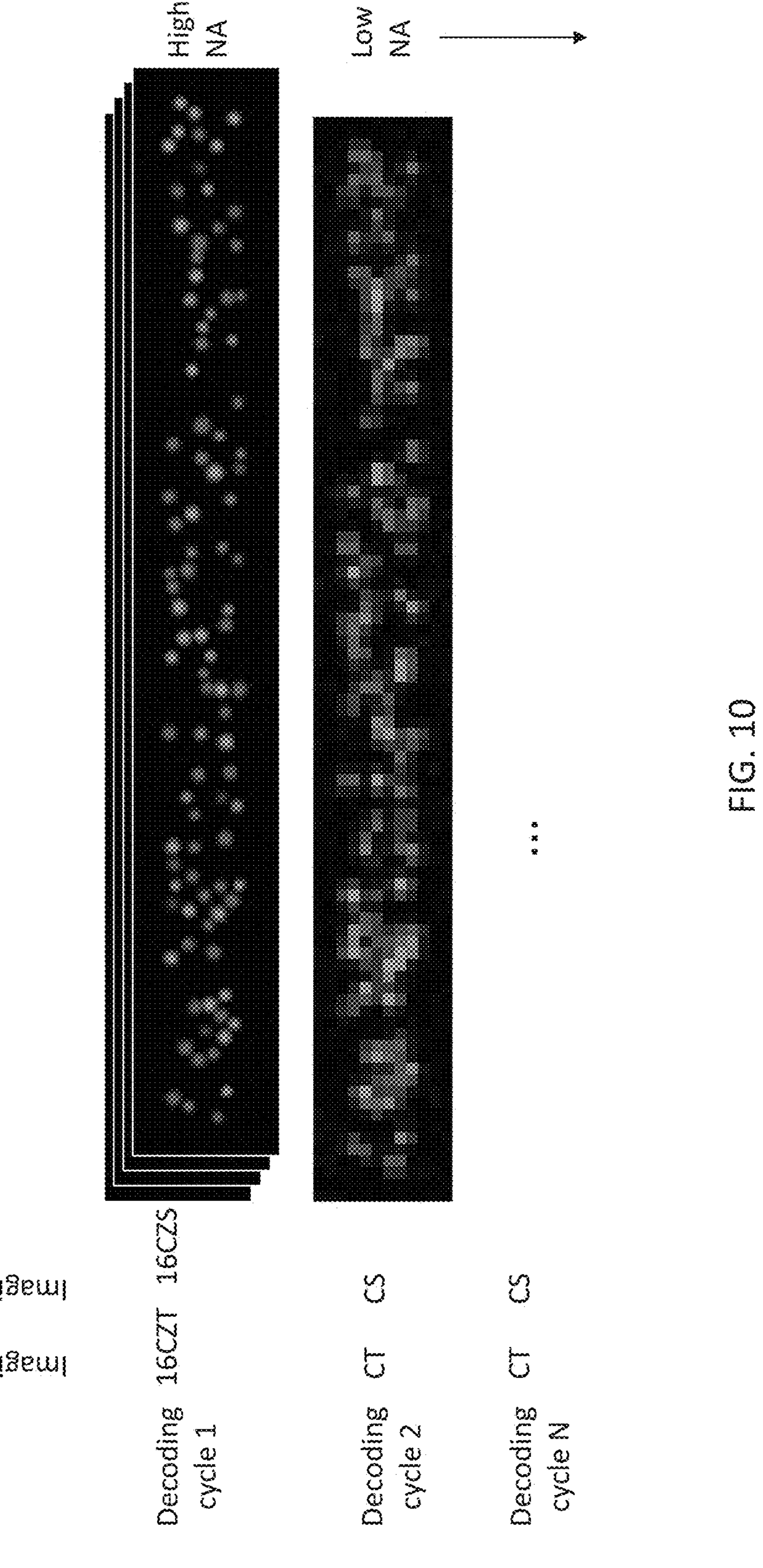
FIG. 10 provides an exemplary illustration of a third approach to performing multi-resolution in situ decoding, according to various embodiments.

FIG. 10 provides an exemplary illustration of a third approach to performing multi-resolution in situ decoding. The upper image represents a z-stack of high-resolution images acquired in a first decoding cycle using a 40×, 0.95 NA objective (and a depth-of-field of 1.5 μm) at a total image magnification corresponding to 0.16 μm/pixel at the image sensor. The lower image is a lower resolution image acquired in the second decoding cycle of the decoding process using a 10×, 0.40 NA objective (and a depth-of-field of 10 μm) at a total image magnification corresponding to 0.64 μm/pixel at the image sensor. Under this decoding scenario and set of image acquisition settings, the total time required to acquire images over N decoding cycles in C color channels is given by:

$$\text{Total time} = M*C*F*(T_E*Z+T_S)+(N-1)*C*F*(T_E+T_S)$$

where T is the acquisition time per FOV, M is the magnification scale factor, F is the number of field-of-view (FOV) images in the high-resolution image, Z is the number of z slices, $T_E$ is the image exposure time, and $T_S$ is the translation stage move time (in the z direction), and the total data storage requirement is given be:

$$\text{Total data storage requirement} = (M*Z+N-1)*C*F*S$$

where F is the number of field-of-view (FOV) images in the high-resolution image and S is the size of a single image (gigabytes).

The multi-resolution decoding scheme illustrated in FIG. 10 comprising the use of volumetric imaging again results in high accuracy in densely labeled regions, but with much shorter total imaging times (e.g., 5.5× faster than high resolution decoding for N=6 decoding cycles; 8.2× faster for N=10 decoding cycles; and 13.3× faster for N=20 decoding cycles), and smaller data storage requirements (e.g., 16% of high resolution storage requirements for N=6 decoding cycles; 10% for N=10 decoding cycles; and 10.5% for N=20 decoding cycles), such that larger sample areas (e.g., larger tissue sample areas) may be imaged in a given time with the relative increase in image acquisition speed increases (and the total time requirement decreases) for decoding processes comprising a larger number of cycles.

Figure 11A:
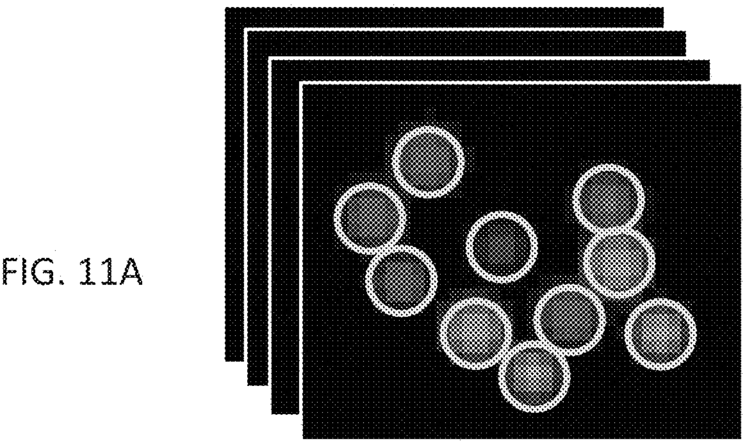
FIGS. 11A-11B provide exemplary illustrations of determining fluorescence intensities for features (e.g., fluorescently-labeled barcode probes attached to target analytes) using the multi-resolution in situ decoding method illustrated in FIG. 10, according to various embodiments.
Figure 11B:
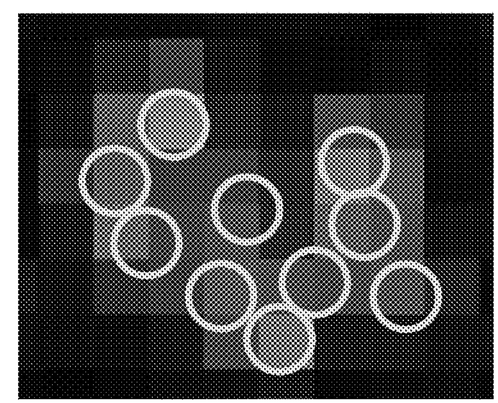

FIGS. 11A-11B provide exemplary illustrations of determining fluorescence intensities for features (e.g., fluorescently-labeled detection probes attached directly or indirectly to target analytes (or their corresponding RCPs)) using the multi-resolution in situ decoding method illustrated in FIG. 10. Feature detection and segmentation was performed in three dimensions using the high-resolution volumetric images acquired during the first decoding cycle (FIG. 11A). The prior knowledge of feature locations in three dimensions thus obtained was then used to deconvolve the high depth-of-field, low resolution (under-sampled) images obtained in subsequent decoding cycles and extract features intensities.

The reduction in total imaging time requirements and concomitant decrease in data storage requirements by the disclosed methods can be generalize for any given magnification M. For example, the reduction in imaging time and concomitant decrease in data storage requirement varies as (1/M+1/N) for the multi-resolution decoding method illustrated in FIG. 6, and as (1/M+1/N*(M−1)/M) for the multi-resolution decoding method illustrated in FIG. 8. The magnification used in the examples provided in FIG. 6 and FIG. 8 was M=16.

Multi-resolution decoding methods comprising high resolution imaging in a single detection channel give the most improvement in imaging speed, but may make it harder to resolve dense features. For more decoding processes comprising more decoding cycles (e.g., N=20), this advantage decreases. All features need to be detectable in at least one high resolution imaging cycle, thus multiple high-resolution imaging cycles may be required if using a sparse decoding scheme. In some instances, the one or more high resolution images can be acquired during one or more anchor cycles and/or one or more decoding cycles.

For optimal performance, the disclosed methods require that features within the biological sample remain immobile (or nearly immobile) with respect to each other between decoding and imaging cycles. For decoding processes requiring a large number of cycles, it may be advantageous to collect additional high-resolution images at different time points to account for any instability of the biological sample (e.g., tissue deformation) due to cycling and/or spot diffusion.

Systems for Performing Multi-Resolution In Situ Decoding:

Also disclosed herein are systems configured for performing any of the described multi-resolution decoding methods. For example, a system may comprise: one or more processors; and a memory communicatively coupled to the one or more processors and configured to store instructions that, when executed by the one or more processors, cause the system to: acquire a first image of a biological sample at a first optical resolution identify locations for a plurality of target analytes based on the first image; acquire a second image of the biological sample at a second optical resolution in at least one decoding cycle of a plurality of decoding cycles used for in situ decoding of the plurality of target analytes, wherein the first optical resolution is higher than the second optical resolution; and extract feature data, e.g. signal intensity data, for signals associated with all or a portion of the plurality of target analytes from the at least one second image based on the locations for the plurality of target analytes identified in the first image.

In some instances, the instructions may further cause the system to use the feature data, e.g., signal intensity data, extracted from the at least one second image to decode the plurality of target analytes. In some instances, the system may further comprise an imaging module. In some instances, the system may be configured to acquire the first image using a first objective lens, and to acquire the at least one second image using a second objective lens. In some instances, the system may be configured to acquire the first image using a first tube lens, and to acquire the at least one second image using a second tube lens. In some instances, the system may be configured to acquire the first image using a first image sensor, and to acquire the at least one second image by performing on-chip downsampling of the first image sensor.

Figure 12:
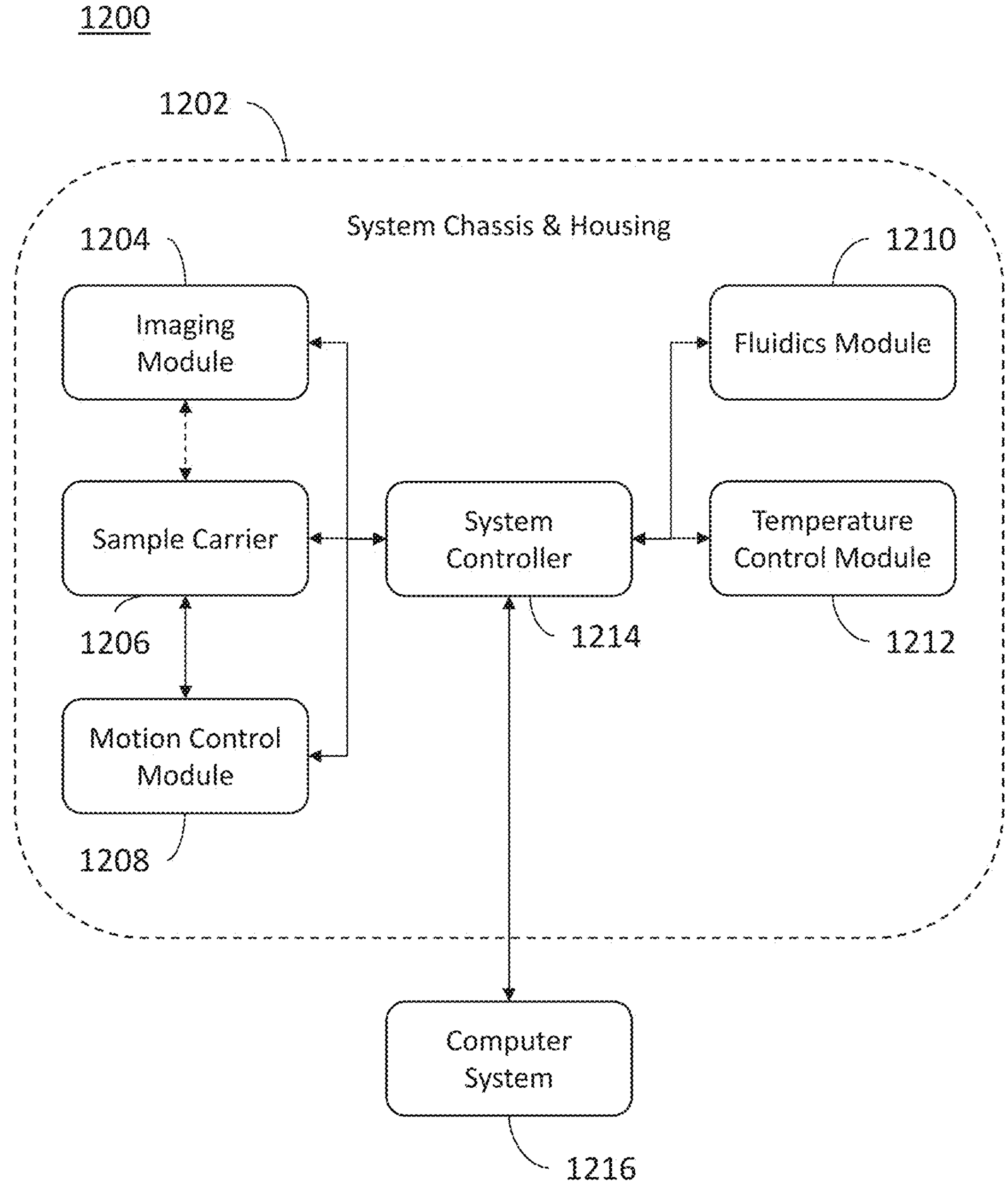
FIG. 12 provides a schematic illustration of a system configured to perform multi-resolution in situ decoding, according to various embodiments.

As illustrated schematically in FIG. 12, a system 1200 configured to implement the methods disclosed herein may comprise one or more imaging modules 1204 (e.g., one or more commercial imaging instruments and/or one or more custom imaging modules), one or more additional processors or system controllers 1214 (e.g., computers or computer systems), one or more sample carriers 1206, one or more fluidics modules 1210, one or more temperature control modules 1212, one or more motion control modules 1208 (which may comprise one or more translation and/or rotation stages), one or more system control software packages, one or more data analysis (e.g., image processing) software packages, or any combination thereof. In some instances, the system may comprise an integrated system, e.g., where the different functional subsystems are mounted on a single framework or chassis, and packaged within a single housing 1202. In some instances, the system may comprise a modular system, e.g., where the different functional subsystems are mounted on separate frameworks or chassis, and packaged in separate housings. In some instances, the one or more system controllers 1214 may interface with an external computer system 1216.

Commercial optical imaging instruments: In some instances, the disclosed methods may utilize a commercial optical imaging instrument for detection and readout, e.g., a commercial fluorescence microscope or a fluorescence imaging microplate reader. Examples of suitable fluorescence microscopes include, but are not limited to, the Zeiss Axioscope 5 multichannel fluorescence microscope (Carl Zeiss Microscopy, LLC, White Plains, N), the Olympus BX63 automated fluorescence microscope (Olympus Scientific Solutions Americas Corp., Waltham, MA), and the Nikon Eclipse Ti2 fluorescence microscope (Nikon Instruments, Inc., Melville, NY). Examples of fluorescence imaging microplate readers include, but are not limited to, the Tecan Spark® Cyto multimode microplate reader (Tecan SP, Inc., Baldwin Park, CA) and the Molecular Devices SpectraMax i3x multimode microplate reader (Molecular Devices, San Jose, CA).

Custom optical imaging modules: In some instances, the disclosed methods may utilize a custom optical imaging instrument for detection and readout, e.g., a custom fluorescence imaging module (or fluorescence imaging unit), which may comprises one or more light sources, one or more objective lenses, one or more sample carriers (e.g., sample holders, sample stages, and/or translation stages), one or more tube lenses, one or more image sensors or cameras, one or more processors or controllers, one or more additional optical components (e.g., lenses, mirrors, prisms, beam-splitters, optical filters, colored glass filters, narrowband interference filters, broadband interference filters, dichroic reflectors, diffraction gratings, apertures, shutters, optical fibers, optical waveguides, acousto-optic modulators, and the like), or any combination thereof. In some instances, the custom imaging module may comprise a focus mechanism, e.g., an autofocus mechanism. In some instances, the custom imaging module may be configured to perform multichannel imaging, e.g., multichannel fluorescence imaging comprising the use of excitation light at one or more excitation wavelengths, and imaging the emitted fluorescence at two or more different emission wavelengths.

Objective lenses: The custom imaging modules disclosed herein, e.g., fluorescence imaging modules, may comprise one or more objective lenses of the same type or of different types. Examples of suitable objective lenses include, but are not limited to, low magnification objectives (e.g., 5× and 10× objectives), intermediate magnification objectives (e.g., 20× and 50× objectives), high magnification objectives (e.g., 100× objectives), designed to work with any suitable immersion media, including but not limited to dry objectives, water immersion objectives, oil immersion objectives, cover slip-corrected objectives, infinity-corrected objectives, achromatic objectives, plan achromatic objectives, fluorite (or semi-apochromatic) objectives, plan fluorite objectives, and plan apochromatic objectives. In some instances, the one or more objective lenses may comprise objectives of a custom design that exhibit a specified magnification, numerical aperture, working distance, focal distance, etc., or any combination thereof.

In some instances, the one or more objective lenses may be fixed components of the imaging module. In some instances, the one or more objective lenses may be moveable (or replaceable) components of the imaging module, e.g., by mounting them on a rotatable turret, mounting them on a translatable slide or stage, etc. In some instances, the one or more objective lenses may comprise both fixed and moveable (or replaceable) components of the imaging module.

Objective lens magnification: In some instances, the magnification of the one or more objective lenses may be the same or may be different, and may range from about 2× to about 100×. In some instances, the magnification of the one or more objective lenses may be at least 2×, at least 5×, at least 10×, at least 15×, at least 20×, at least 25×, at least 30×, at least 35×, at least 40×, at least 45×, at least 50×, at least 60×, at least 70×, at least 80×, at least 90×, or at least 100×. In some instances, the magnification of the one or more objective lenses may be at most 100×, at most 90×, at most 80×, at most 70×, at most 60×, at most 50×, at most 45×, at most 40×, at most 35×, at most 30×, at most 25×, at most 20×, at most 15×, at most 10×, at most 5×, or at most 2×. Any of the lower and upper values described in this paragraph may be combined to form a range included within the present disclosure, for example, in some instances the magnification of the one or more objective lenses may range from about 5× to about 25×. Those of skill in the art will recognize that the magnification of the one or more objective lenses may have any value within this range, e.g., about 7.5×.

Objective focal length: In some instances, the focal length of the one or more objective lenses may be the same or may be different, and may range between 20 mm and 200 mm. In some instances, the focal length of the one or more objective lenses may be at least 20 mm, at least 25 mm, at least 30 mm, at least 35 mm, at least 40 mm, at least 50 mm, at least 60 mm, at least 70 mm, at least 80 mm, at least 90 mm, at least 100 mm, at least 120 mm, at least 140 mm, at least 160 mm, at least 180 mm, or at least 200 mm. In some instances, the focal length of the one or more objective lenses may be at most 200 mm, at most 180 mm, at most 160 mm, at most 140 mm, at most 100 mm, at most 90 mm, at most 80 mm, at most 70 mm, at most 60 mm, at most 50 mm, at most 40 mm, at most 35 mm, at most 30 mm, at most 25 mm, or at most 20 mm. Any of the lower and upper values described in this paragraph may be combined to form a range included within the present disclosure, for example, in some instances the focal length of the one or more objective lenses may range from 25 mm to 120 mm. Those of skill in the art will recognize that the focal length of the one or more objective lenses may have any value within the range of values specified above, e.g., about 65 mm.

Objective working distance: In some instances, the working distance of the one or more objective lenses may be the same or may be different, and may range between about 100 μm and 30 mm. In some instances, the working distance may be at least 100 μm, at least 200 μm, at least 300 μm, at least 400 μm, at least 500 μm, at least 600 μm, at least 700 μm, at least 800 μm, at least 900 μm, at least 1 mm, at least 2 mm, at least 4 mm, at least 6 mm, at least 8 mm, at least 10 mm, at least 15 mm, at least 20 mm, at least 25 mm, or at least 30 mm. In some instances, the working distance may be at most 30 mm, at most 25 mm, at most 20 mm, at most 15 mm, at most 10 mm, at most 8 mm, at most 6 mm, at most 4 mm, at most 2 mm, at most 1 mm, at most 900 μm, at most 800 μm, at most 700 μm, at most 600 μm, at most 500 μm, at most 400 μm, at most 300 μm, at most 200 μm, at most 100 μm. Any of the lower and upper values described in this paragraph may be combined to form a range included within the present disclosure, for example, in some instances the working distance of the objective lens may range from 500 μm to 2 mm. Those of skill in the art will recognize that the working distance of the objective lens may have any value within the range of values specified above, e.g., about 1.25 mm.

Objective numerical aperture: In some instances, the numerical aperture of the one or more objective lenses may be the same or may be different, and may range from about 0.1 to about 1.4. In some instances, the numerical aperture may be at least 0.1, at least 0.2, at least 0.3, at least 0.4, at least 0.5, at least 0.6, at least 0.7, at least 0.8, at least 0.9, at least 1.0, at least 1.1, at least 1.2, at least 1.3, or at least 1.4. In some instances, the numerical aperture may be at most 1.4, at most 1.3, at most 1.2, at most 1.1, at most 1.0, at most 0.9, at most 0.8, at most 0.7, at most 0.6, at most 0.5, at most 0.4, at most 0.3, at most 0.2, or at most 0.1. Any of the lower and upper values described in this paragraph may be combined to form a range included within the present disclosure, for example, in some instances the numerical aperture may range from about 0.1 to about 0.6. Those of skill in the art will recognize that the numerical aperture may have any value within this range, e.g., about 0.55.

Tube lenses: In some instances, the imaging module may comprise one or more tube lenses, e.g., lenses positioned in the optical path between an objective lens (e.g., an infinity-corrected objective) and an image sensor to collimate and/or focus the light transmitted by the objective and form an image on the image sensor. In some instances, the one or more tube lenses may comprise fixed components of the imaging module. In some instances, the one or more tube lenses may be moveable (or replaceable) components of the imaging module, e.g., by mounting them on a rotating stage, mounting them on a translatable slide or stage, etc. In some instances, the one or more tube lenses may comprise both fixed and moveable (or replaceable) components of the imaging module.

Tube lens focal length: In some instances, the focal length for the one or more tube lenses may be the same or may be different, and may be at least 100 mm, at least 120 mm, at least 140 mm, at least 180 mm, at least 200 mm, at least 220 mm, at least 240 mm, at least 260 mm, at least 280 mm, at least 300 mm, at least 400 mm, at least 500 mm, or at least 600 mm.

Image sensors: In some instances, the imaging module may comprise one or more image sensors (or cameras) that may be the same or may be different, and may include any of a variety of image sensors including but not limited to, photodiode arrays, charge-coupled device (CCD) sensors or cameras, or complementary metal-oxide-semiconductor (CMOS) image sensors or cameras. In some instances, the one or more image sensors may comprise one-dimensional (linear) or two-dimensional pixel array sensors. In some instances, the one or more image sensors may comprise monochrome image sensors (e.g., configured to capture greyscale images) or color image sensors (e.g., configured to capture RGB or color images).

Image sensor pixel count: In some instances, the pixel count for the one or more image sensors may be the same or different, and may vary in terms of pixel size and pixel count. In some instances, the image resolution may depend on the pixel size and pixel count of the image sensors used. In some instances, the one or more image sensors may have a pixel count of at least 0.5 megapixels, at least 1 megapixels, at least 5 megapixels, at least 10 megapixels, at least 15 megapixels, at least 20 megapixels, at least 30 megapixels, at least 40 megapixels, at least 50 megapixels, at least 75 megapixels, at least 100 megapixels, at least 200 megapixels, at least 500 megapixels, or at least 1,000 megapixels.

Image sensor pixel size and pitch: In some instances, the pixel size and/or pitch selected for the one or more image sensors may be the same or different, and may range from about 0.1 μm to about 10 μm in at least one dimension. In some instances, the pixel size and/or pitch may be at least 0.1 μm, at least 0.5 μm, at least 1 μm, at least 2 μm, at least 3 μm, at least 4 μm, at least 5 μm, at least 6 μm, at least 7 μm, at least 8 μm, at least 9 μm, or at least 10 μm. In some instances, the pixel size and/or pitch may be at most 10 μm, at most 9 μm, at most 8 μm, at most 7 μm, at most 6 μm, at most 5 μm, at most 4 μm, at most 3 μm, at most 2 μm, at most 1 μm, at most 0.5 μm, or at most 0.1 μm. Any of the lower and upper values described in this paragraph may be combined to form a range included within the present disclosure, for example, in some instances the pixel size and/or pitch may range from about 3 μm to about 9 μm. Those of skill in the art will recognize that, in some instances, the pixel size and/or pitch may have any value within this range, e.g., about 1.4 μm.

Image sensor downsampling: In some instances, the images acquired by the one or more image sensors may be downsampled (either on-chip or through post-acquisition image processing) to reduce the image lateral resolution and/or image file size while keeping the same two-dimensional representation (or field-of-view) of the image. In some instances, the downsampled image may have a lateral resolution that is at least 2-fold, 4-fold, 6-fold, 8-fold, 10-fold, 12-fold, 14-fold, 16-fold, 18-fold, or 20-fold lower than the lateral resolution of an image acquired at full image sensor resolution. Examples of on-chip image downsampling techniques include, but are not limited to, image sensor pixel binning. Examples of image processing-based image downsampling techniques include, but are not limited to, direct downsampling, wavelet transformations, and discrete cosine transforms (see, e.g., Zhang, et al. (2011), "Interpolation-Dependent Image Downsampling", *IEEE Transactions On Image Processing,* 20(11): 3291-3296; Jagadeesan, et al. (2014), "An Efficient Image Downsampling Technique Using Genetic Algorithm and Discrete Wavelet Transform", *Journal of Theoretical and Applied Information Technology* 61(3): 506-514).

Acquiring a series of images: In some instances, the one or more image sensors may be used to capture single images, e.g., a single image for each decoding cycle of a plurality of decoding cycles used to decode a set of barcoded analytes. In some instances, the one or more image sensors may be used to capture a series of images, e.g., a series of images during each decoding cycle of a plurality of decoding cycles used to decode a set of barcoded analytes. In some instances, a series of images may comprise images (or video frames) that correspond to images captured before, during, and/or after an event, e.g., before, during, and/or after addition of a barcode probe to a sample being imaged. In some instances, a series of images may comprise at least 2 images, at least 3 images, at least 4 images, at least 5 images, at least 10 images, at least 20 images, at least 30 images, at least 40 images, at least 50 images, at least 100 images, at least 200 images, at least 300 images, at least 400 images, at least 500 images, at least 1,000 images, or more than 1,000 images.

Imaging frame rate: In some instances, the one or more image sensors may capture a series of images (or "frames") at a predefined image acquisition rate (or frame rate). For example, in some instances, the image acquisition rate may range from about 0.01 frames per second to about 1,000 frames per second. In some instances, the image acquisition rate may be at least 0.01 frames per second, at least 0.1 frames per second, at least 1.0 frames per second, at least 10 frames per second, at least 100 frames per second, or at least 1,000 frames per second.

Light sources: In some instances, the imaging module may comprise one or more light sources. Examples of light sources include, but are not limited to, tungsten lamps, tungsten-halogen lamps, arc lamps, lasers, light emitting diodes (LEDs), or laser diodes. In some instances, the one or more light sources may produce continuous wave, pulsed, Q-switched, chirped, frequency-modulated, and/or amplitude-modulated light at a specified wavelength (or within a specified wavelength bandpass) defined by the light source alone or in combination with one or more optical filters (e.g., one or more colored glass filters, narrowband interference filters, broadband interference filters, dichroic reflectors, diffraction gratings, etc.).

Imaging module image acquisition mode: In some instances, the imaging module may be configured to acquire images in any of a variety of imaging modes. Examples include, but are not limited to, bright-field, dark-field, fluorescence, phase contrast, or differential interference contrast (DIC), and the like, where the combination of magnification and contrast mechanism provides images having cellular or sub-cellular image resolution. In some instances, the imaging module may be configured to perform wide-field microscopic imaging (see, e.g., Combs, et al. (2017), "Fluorescence Microscopy: A Concise Guide to Current Imaging Methods", *Current Protocols in Neuroscience* 79, 2.1.1-2.1.25). In some instances, the imaging module may be configured to perform volumetric imaging (or optical sectioning) using camera-based approaches (e.g., scanned focus imaging, multi-focus imaging, extended focus imaging, etc.) or scanning-based approaches (e.g., fast three-dimensional scanning) (see, e.g., Mertz (2019), "Strategies for Volumetric Imaging with a Fluorescence Microscope", *Optica* 6(10): 1261-1268). In some instances, the optical imaging module may be configured to perform optical sectioning using light sheet microscopy (see, e.g., Combs, et al. (2017), ibid.; Power, et al. (2017), "A Guide to Light-Sheet Fluorescence Microscopy for Multiscale Imaging", *Nature Methods* 14(4): 360-373).

Wide-field microscopic imaging: In some instances, the imaging module (or system comprising the imaging module) may be configured to perform wide-field microscopic imaging (e.g., epi-fluorescence microscopic imaging). Used in combination with large format cameras having high sensitivity, high dynamic range, low noise characteristics, and fast frame rates, wide-field microscopy enables fast image acquisition and good contrast at low signal levels while offering diffraction-limited (or near-diffraction-limited) spatial (lateral) resolution over large fields of view (Combs, et al. (2017), ibid.).

Volumetric imaging: In some instances, the imaging module (or system comprising the imaging module) may be configured to perform volumetric imaging (or optical sectioning). In some instances, the imaging comprises acquisition of a plurality (or "stack") of two-dimensional (2D) images to form a three-dimensional (3D) representation of the sample, where each two-dimensional image is aligned with the other images of the plurality in the sample plane (e.g., the X-Y plane), but is offset from the other two-dimensional images in a direction parallel to the optical axis of the imaging module (e.g., in the Z-direction). In some instances, the stack of images may be acquired sequentially. In some instances, the stack of images may be acquired simultaneously. In some instances, the depth-of-field of the imaging module (i.e., the distance in the Z-direction between the nearest and the farthest points that are in acceptably sharp focus in an image) may be about equal to, or smaller than, the offset (or "step size") in the Z-direction between adjacent two-dimensional images of the stack. In some instances, the depth-of-field of the two-dimensional images may be adjusted by, e.g., adjusting the numerical aperture and/or focal length of the objective lens and/or tube lens.

Light sheet microscopy: In some instances, the imaging module (or system comprising the imaging module) may be configured to perform light sheet microscopy (e.g., light sheet fluorescence microscopy (LSFM)). In LSFM, for example, excitation light is delivered in the form of a thin sheet of laser light, and emitted light is collected in an orthogonal direction, using two perpendicular objective lenses (Combs, et al. (2017), ibid.). Fluorescence is excited by the light sheet and originates from a single plane in the sample. The light sheet is then scanned relative to the sample (or the sample is scanned relative to the light sheet) to build up a volumetric image.

Imaging module compound magnification: In some instances, the compound magnification of the imaging module (i.e., the effective magnification resulting from a combination of lenses (e.g., an objective lens, tube lens, and/or additional lenses) may range from about 40× to about 1000×. In some instances, the compound magnification of the imaging module may be at least 40×, at least 50×, at least 60×, at least 70×, at least 80×, at least 90×, at least 100×, at least 200×, at least 300×, at least 400×, at least 500×, at least 600×, at least 700×, at least 800×, at least 900×, or at least 1000×. In some instances, the compound magnification of the imaging module may be at most 1000×, at most 900×, at most 800×, at most 700×, at most 600×, at most 500×, at most 400×, at most 300×, at most 200×, at most 100×, at most 90×, at most 80×, at most 70×, at most 60×, at most 50×, or at most 40×. Any of the lower and upper values described in this paragraph may be combined to form a range included within the present disclosure, for example, in some instances the compound magnification of the imaging module may range from about 50× to about 700×. Those of skill in the art will recognize that the compound magnification of the imaging module may have any value within this range, e.g., about 750×.

Imaging module field-of-view (FOV): In some instances, the FOV of the imaging module may range, for example, between about 0.2 mm and 4 mm in diameter (or in the longest dimension). In some instances, the FOV may be at least 0.2, at least 0.4, at least 0.6, at least 0.8, at least 1.0 mm, at least 1.2 mm, at least 1.4 mm, at least 1.6 mm, at least 1.8 mm, at least 2.0 mm, at least 3.0 mm, or at least 4.0 mm in diameter (or in the longest dimension). In some instances, the FOV may be at most 4.0 mm, at most 3.0 mm, at most 2.0 mm, at most 1.8 mm, or at most 1.6 mm, at most 1.4 mm, at most 1.0 mm, at most 0.8 mm, at most 0.6 mm, at most 0.4 mm, or at most 0.2 mm in diameter (or in the longest dimension). Any of the lower and upper values described in this paragraph may be combined to form a range included within the present disclosure, for example, in some instances the FOV may range from about 1.2 mm to about 3.0 mm in diameter (or in the longest dimension). Those of skill in the art will recognize that, in some instances, the FOV may have any value within the range of values specified above, e.g., about 3.2 mm in diameter (or in the longest dimension).

Imaging module lateral optical resolution: In some instances, depending on, e.g., the numerical aperture of the objective lens in use and the wavelength of the light being imaged, the lateral optical resolution of the imaging module (i.e., the minimum distance between resolvable points in the sample plane of the imaging module) may range from about 0.2 μm to about 2 μm. In some instances, the lateral optical resolution may be at least 0.2 μm, at least 0.3 μm, at least 0.4 μm, at least 0.5 μm, at least 0.6 μm, at least 0.7 μm, at least 0.8 μm, at least 0.9 μm, at least 1.0 μm, at least 1.2 μm, at least 1.4 μm, at least 1.6 μm, at least 1.8 μm, or at least 2.0 μm. In some instances, the lateral optical resolution may be at most 2.0 μm, at most 1.8 μm, at most 1.6 μm, at most 1.4 μm, at most 1.2 μm, at most 1.0 μm, at most 0.9 μm, at most 0.8 μm, at most 0.7 μm, at most 0.6 μm, at most 0.5 μm, at most 0.4 μm, at most 0.3 μm, or at most 0.2 μm. Any of the lower and upper values described in this paragraph may be combined to form a range included within the present disclosure, for example, in some instances the lateral optical resolution may range from about 0.6 μm to about 1.2 μm. Those of skill in the art will recognize that, depending on the design of the imaging module, the lateral optical resolution may have any value within this range, e.g., about 0.85 μm.

Imaging module axial optical resolution: In some instances, the axial optical resolution (or "axial resolution") of the imaging module (i.e., the minimum distance between resolvable points that are separated axially along the optical axis of the imaging module) may range from about 0.5 μm to about 2 μm. In some instances, the axial optical resolution may be at least 0.5 μm, at least 0.6 μm, at least 0.7 μm, at least 0.8 μm, at least 0.9 μm, at least 1.0 μm, at least 1.2 μm, at least 1.4 μm, at least 1.6 μm, at least 1.8 μm, or at least 2.0 μm. In some instances, the axial optical resolution may be at most 2.0 μm, at most 1.8 μm, at most 1.6 μm, at most 1.4 μm, at most 1.2 μm, at most 1.0 μm, at most 0.9 μm, at most 0.8 μm, at most 0.7 μm, at most 0.6 μm, or at most 0.5 μm. Any of the lower and upper values described in this paragraph may be combined to form a range included within the present disclosure, for example, in some instances the axial optical resolution may range from about 0.7 μm to about 1.6 μm. Those of skill in the art will recognize that, depending on the design of the imaging module, the axial optical resolution may have any value within this range, e.g., about 0.75 μm.

Depth of field: In some instances, the depth of field and/or minimum step size in the Z-direction for an imaging module (comprising, e.g., an objective lens and/or tube lens) may range from about 0.2 μm to about 5 μm, or more. In some instances, the depth of field and/or minimum step size may be at least 0.2 μm, at least 0.4 μm, at least 0.6 μm, at least 0.8 μm, at least 1.0 μm, at least 1.5 μm, at least 2.0 μm, at least 2.5 μm, at least 3.0 μm, at least 3.5 μm, at least 4.0 μm, at least 4.5 μm, or at least 5 μm, or more. In some instances, the depth of field and/or minimum step size may be at most 5 μm, at most 4.5 μm, at most 4.0 μm, at most 3.5 μm, at most 3.0 μm, at most 2.5 μm, at most 2.0 μm, at most 1.5 μm, at most 1.0 μm, at most 0.8 μm, at most 0.6 μm, at most 0.4 μm, or at most 0.2 μm. Any of the lower and upper values described in this paragraph may be combined to form a range included within the present disclosure, for example, in some instances the depth of field and/or minimum step size may range from about 0.2 μm to about 1.5 μm. Those of skill in the art will recognize that, in some instances, the depth of field and/or minimum step size may have any value within the range of values specified above, e.g., about 0.24 μm. In some instances, the minimum step size in the Z-direction may be at least 1×, 2×, 3×, 4×, 5×, 6×, 7×, 8×, 9×, 10×, 15×, or 20× the depth of field.

Fluorescence excitation wavelengths: In any of the fluorescence imaging configurations described herein, e.g., for single channel fluorescence imaging or multichannel fluorescence imaging configurations, at least one of the one or more light sources of the imaging module may produce visible light, such as green light and/or red light. In some instances, the at least one light source, alone or in combination with one or more optical components, e.g., excitation optical filters and/or dichroic beam splitters, may produce fluorescence excitation light at about 350 nm, 375 nm, 400 nm, 425 nm, 450 nm, 475 nm, 500 nm, 525 nm, 550 m, 575 nm, 600 nm, 625 nm, 650 nm, 675 nm, 700 nm, 725 nm, 750 nm, 775 nm, 800 nm, 825 nm, 850 nm, 875 nm, or 900 nm. Those of skill in the art will recognize that, in some instances, the fluorescence excitation wavelength may have any value within this range of values, e.g., about 620 nm.

Fluorescence excitation light bandwidths: In any of the fluorescence imaging configurations described herein, e.g., for single channel fluorescence imaging or multichannel fluorescence imaging configurations, at least one of the one or more light sources, alone or in combination with one or more optical components, e.g., excitation optical filters and/or dichroic beam splitters, may produce fluorescence excitation light at the specified excitation wavelength within a bandwidth of ±2 nm, ±5 nm, ±10 nm, ±20 nm, ±40 nm, ±80 nm, or greater. Those of skill in the art will recognize that, in some instances, the excitation light bandwidth may have any value within this range, e.g., about +18 nm.

Fluorescence emission bands: In some instances, a fluorescence imaging module may be configured to detect fluorescence emission produced by any of a variety of fluorophores known to those of skill in the art. Examples of suitable fluorescence dyes for use in, e.g., genotyping and nucleic acid sequencing applications (e.g., by conjugation to nucleotides, oligonucleotides, or proteins) include, but are not limited to, fluorescein, rhodamine, coumarin, cyanine, and derivatives thereof, including the cyanine derivatives cyanine dye-3 (Cy3), cyanine dye-5 (Cy5), cyanine dye-7 (Cy7), etc.

Fluorescence emission wavelengths: In any of the fluorescence imaging configurations described herein, e.g., for single channel fluorescence imaging or multichannel fluorescence imaging configurations, the one or more detection channels of the imaging module may be configured to collect emission light at about 350 nm, 375 nm, 400 nm, 425 nm, 450 nm, 475 nm, 500 nm, 525 nm, 550 m, 575 nm, 600 nm, 625 nm, 650 nm, 675 nm, 700 nm, 725 nm, 750 nm, 775 nm, 800 nm, 825 nm, 850 nm, 875 nm, or 900 nm. Those of skill in the art will recognize that, in some instances, the emission wavelength may have any value within this range, e.g., about 825 nm.

Fluorescence emission light bandwidths: In any of the fluorescence imaging configurations described herein, e.g., for single channel fluorescence imaging or multichannel fluorescence imaging configurations, the one or more detection channels of the imaging module may be configured to collect light at the specified emission wavelength within a bandwidth of ±2 nm, ±5 nm, ±10 nm, ±20 nm, ±40 nm, ±80 nm, or greater. Those of skill in the art will recognize that, in some instances, the excitation bandwidths may have any value within this range, e.g., about ±18 nm.

Additional system components: In some instances, a system configured to implement the methods disclosed herein may comprise one or more commercial imaging instruments, one or more custom imaging modules, one or more additional processors or controllers (e.g., computers or computer systems), one or more sample carriers, one or more fluidics modules, one or more temperature control modules, one or more motion control modules (which may comprise one or more translation and/or rotation stages), one or more system control software packages, one or more data analysis (e.g., image processing) software packages, or any combination thereof. In some instances, the system may comprise an integrated system, e.g., where the different functional subsystems are mounted on a single framework or chassis, and packaged within a single housing. In some instances, the system may comprise a modular system, e.g., where the different functional subsystems are mounted on separate frameworks or chassis, and packaged in separate housings.

Sample carrier devices and adapters: In some instances, the biological sample is provided on any suitable substrate which may be fabricated from any of a variety of materials known to those of skill in the art including any transparent substrate. In some instances, a system configured to implement the methods disclosed herein may comprise one or more sample carrier devices and/or adapters configured to support or contain a sample, e.g., a tissue sample. Examples of sample carrier devices and adapters include, but are not limited to, microscope slides and/or adapters configured to mount microscope slides (with or without coverslips) on a microscope stage or automated stage (e.g., an automated translation or rotational stage), substrates, and/or adapters configured to mount slides on a microscope stage or automated stage, substrates comprising etched sample containment chambers (e.g., chambers open to the environment) and/or adapters configured to mount such substrates on a microscope stage or automated stage, flow cells and/or adapters configured to mount flow cells on a microscope stage or automated stage, or microfluidic devices and/or adapters configured to mount microfluidic devices on a microscope stage or automated stage.

In some instances, the one or more sample carrier devices may be designed for performing a variety of chemical analysis, biochemical analysis, nucleic acid analysis, cell analysis, or tissue analysis applications. In some instances, for example, flow cells and microfluidic devices may comprise a sample, e.g., a tissue sample. In some instances, flow cells and microfluidic devices may comprise a sample, e.g., a tissue sample, placed in contact with, e.g., a substrate (e.g., a surface within the flow cell or microfluidic device). In some instances, a flow cell may be a closed flow cell comprising fluid inlets and outlets, and a sample chamber or compartment that is not open to the surrounding environment. In some instances, a flow cell may be an open flow cell comprising fluid inlets and outlets, and a sample chamber or compartment that is open to and/or accessible from the surrounding environment.

In some instances, the systems disclosed herein may comprise 1, 2, 3, 4, 5, 6, 7, 8, 9, 10, or more than 10 sample carrier devices and/or adapters. In some instances, the one or more sample carrier devices may be fixed components of the disclosed systems. In some instances, the one or more sample carrier devices may be removable, exchangeable components of the disclosed systems. In some instances, the one or more sample carrier devices may be disposable or consumable components of the disclosed systems.

The sample carrier devices for the disclosed systems (e.g., microscope slides, substrates comprising one or more etched sample chambers, flow cells or microfluidic devices comprising one or more sample chambers, etc.) may be fabricated from any of a variety of materials known to those of skill in the art including, but not limited to, glass (e.g., borosilicate glass, soda lime glass, etc.), fused silica (quartz), silicon, polymer (e.g., polystyrene (PS), macroporous polystyrene (MPPS), polymethylmethacrylate (PMMA), polycarbonate (PC), polypropylene (PP), polyethylene (PE), high density polyethylene (HDPE), cyclic olefin polymers (COP), cyclic olefin copolymers (COC), polyethylene terephthalate (PET), polydimethylsiloxane (PDMS), etc.), polyetherimide (PEI) and perfluoroelastomer (FFKM) as more chemically inert alternatives, or any combination thereof. FFKM is also known as Kalrez.

The one or more materials used to fabricate sample carrier devices for the disclosed systems (e.g., microscope slides, substrates comprising one or more etched sample chambers, flow cells or microfluidic devices comprising one or more sample chambers, etc.) are often optically transparent to facilitate use with spectroscopic or imaging-based detection techniques. In some instances, the entire sample carrier device will be optically transparent. Alternatively, in some instances, only a portion of the sample carrier device (e.g., an optically transparent "window") will be optically transparent.

The sample carrier devices for the disclosed systems (e.g., microscope slides, substrates comprising one or more etched sample chambers, flow cells or microfluidic devices comprising one or more sample chambers, etc.) may be fabricated using any of a variety of techniques known to those of skill in the art, where the choice of fabrication technique is often dependent on the choice of material used, and vice versa. Examples of suitable sample carrier device fabrication techniques include, but are not limited to, extrusion, drawing, precision computer numerical control (CNC) machining and boring, laser photoablation, photolithography in combination with wet chemical etching, deep reactive ion etching (DRIE), micro-molding, embossing, 3D-printing, thermal bonding, adhesive bonding, anodic bonding, and the like (see, e.g., Gale, et al. (2018), "A Review of Current Methods in Microfluidic Device Fabrication and Future Commercialization Prospects", *Inventions* 3, 60, 1-25).

For sample carrier devices comprising sample chambers, e.g., chambers etched into a planar substrate or chambers within a flow cell or microfluidic device, the dimensions of the sample chambers may range from about 0.1 μm to about 10 cm in length, width, and/or height (depth). In some instances, the length, width, and/or height (depth) of the sample chambers (or "micro chambers") may be at least 0.1 μm, at least 0.5 μm, at least 1 μm, at least 5 μm, at least 10 μm, at least 50 μm, at least 100 μm, at least 500 μm, at least 1 mm, at least 5 mm, at least 1 cm, at least 5 cm, or at least 10 cm. Those of skill in the art will recognize that, in some instances, the length, width, and/or height (depth) of the sample chambers may have any value within this range, e.g., about 125 μm. In some instances, the length, width, and/or height (depth) of fluid channels (or "micro channels") within microfluidic devices (e.g., fluid channels to connect sample chambers to inlets or outlets) may have any value within the same range of values listed in this paragraph.

For sample carrier devices comprising sample chambers, e.g., chambers etched into a planar substrate or chambers within a flow cell or microfluidic device, the volume of the sample chambers (or "micro chambers") may range from about 1 nL to about 1 mL. In some instances, the volume of the sample chambers may be at least 1 nL, at least 5 nL, at least 10 nL, at least 50 nL, at least 100 nL, at least 500 nL, at least 1 μL, at least 5 μL, at least 10 μL, at least 50 μL, at least 100 μL, at least 500 μL, at least 1 mL. Those of skill in the art will recognize that, in some instances, the volume of the sample chambers may have any value within this range, e.g., about 1.3 μL.

Fluidics modules and components: In some instances, a system configured to implement the methods disclosed herein may comprise one or more fluidics modules (or fluidics controllers) configured to control the delivery of fluids such as reagents and/or buffers to a sample, e.g., a sample contained within a sample carrier device. In some instances, the one or more fluidics controllers may be configured to control volumetric flow rates for one or more fluids or reagents, linear flow velocities for one or more fluids or reagents, mixing ratios for one or more fluids or reagents, or any combination thereof. Fluidics modules may comprise one or more fluid flow sensors (e.g., flow rate sensors, pressure sensors, etc.), one or more fluid flow actuators (e.g., pumps), one or more fluid flow control devices (e.g., valves), one or more processors (and associated electronics), tubing and connectors to connect the one or more fluidics modules to one or more sample carrier devices, or any combination thereof.

In some instances, different modes of fluid flow control may be utilized at different points in time during an assay or analysis method, e.g. forward flow (relative to the inlet and outlet for a sample chamber, flow cell, or microfluidic device), reverse flow, oscillating or pulsatile flow, or any combination thereof. In some instances, for example, oscillating or pulsatile flow may be applied during assay wash/rinse steps to facilitate complete and efficient exchange of fluids within one or more sample chambers, flow cells, or microfluidic devices.

Fluid flow actuation: The one or more fluidics modules may be configured to support any of a variety of fluid flow actuation mechanisms known to those of skill in the art. Examples include, but are not limited to, pressure-driven flow, electrokinetic flow, electroosmotic flow, etc.

In some instances, fluid flow through the system may be controlled using one or more pumps, e.g., positive displacement pumps (e.g., diaphragm pumps, peristaltic pumps, piston pumps, syringe pumps, rotary vane pumps, etc.), metering pumps (e.g., oscillating positive displacement pumps designed for precise flow control), centrifugal pumps (e.g., rotary impellor pumps, axial impellor pumps), or any combination thereof. In some instances, fluid flow through a sample carrier device (e.g., a microfluidic device) may be controlled using miniaturized pumps integrated into the device (e.g., comprising electromechanically- or pneumatically-actuated miniature syringe or plunger mechanisms, chemical propellants, membrane diaphragm pumps actuated pneumatically or by an external piston, pneumatically-actuated reagent pouches or bladders, or electro-osmotic pumps). In some instances, fluid flow through the system may be controlled by applying positive pressure (e.g., using a pump or by applying positive pneumatic pressure) at one or more inlets of a sample carrier device. In some instances, fluid flow through the system may be controlled by applying negative pressure (e.g., using a pump or by applying negative pneumatic pressure (i.e., a vacuum)) at one or more outlets of a sample carrier device.

In some instances, fluid flow through the sample carrier device may be controlled using electrokinetic or electroosmotic flow (e.g., fluid flow controlled by applying electric fields within the sample carrier device). Electrokinetic effects include, for example, electrophoresis (the movement of charged particles within a fluid under the influence of an applied electric field), electroosmosis (the movement of fluid under the influence of an applied electric field), and streaming potentials or streaming currents (electrical potentials or currents generated by an electrolyte fluid moving through a porous material having charged surfaces). Electroosmosis, for example, may be actuated by using an electronic power supply and electrodes to apply an electric field across the length of a fluid channel or between the inlet and outlet of a sample chamber (see, e.g., Dutta, et al. (2002), "Electroosmotic Flow Control in Complex Microgeometries", *Journal of Microelectromechanical Systems* 11(1): 36-44; Ghosal (2004), "Fluid Mechanics of Electroosmotic Flow and its Effect on Band Broadening in Capillary Electrophoresis", *Electrophoresis* 25:214-228).

In some instances, the fluidics module may comprise one or more valves to facilitate the control of fluid flow to sample carrier devices. Examples of suitable valves include, but are not limited to, check valves, electromechanical two-way or three-way valves, pneumatic two-way and three-way valves, or any combination thereof. In some instances, fluid flow through a sample carrier device (e.g., a microfluidic device) may be controlled using miniaturized valves integrated into the device (e.g., one-shot "valves" fabricated using wax or polymer plugs that can be melted or dissolved, or polymer membranes that can be punctured; pinch valves constructed using a deformable membrane and pneumatic, hydraulic, magnetic, electromagnetic, or electromechanical (solenoid) actuation, one-way valves constructed using deformable membrane flaps, and miniature gate valves).

In some instances, different fluid flow rates may be utilized at different locations within a sample carrier device (e.g., a flow cell device comprising more than one sample chamber or a microfluidic device), or at different times in the assay or analysis process.

Temperature control modules: In some instances, a system configured to implement the methods disclosed herein may comprise one or more temperature control modules (or temperature controllers) configured to maintain a specified temperature within one or more sample carrier device for the purpose of facilitating the accuracy and reproducibility of assay or analysis results. Examples of temperature control components that may be incorporated into sample carrier devices and/or the system and controlled by a temperature control module include, but are not limited to, resistive heating elements, infrared light sources, Peltier heating or cooling devices, heat sinks, thermistors, thermocouples, and the like.

In some instances, the temperature control module may provide for a programmable temperature change at a specified, adjustable time prior to performing specific assay or analysis steps. In some instances, the temperature control module may provide for programmable changes in temperature over specified time intervals. In some instances, the temperature control module may further provide for cycling of temperatures between two or more set temperatures with specified frequency and ramp rates so that thermal cycling, e.g., for performing nucleic acid amplification reactions, may be performed.

In some instances, the temperature control module may be configured to maintain constant temperatures, to implement step changes in temperature, or to implement changes in temperature at a specified ramp rate over a temperature range between about 10° C. and about 95° C. In some instances, for example, the temperature within a sample carrier device may be held constant at a specified temperature of 10° C., 15° C., 20° C., 25° C., 30° C., 35° C., 40° C., 45° C., 50° C., 55° C., 60° C., 65° C., 70° C., 75° C., 80° C., 85° C., 90° C., or 95° C. (or at any temperature within this range). In some instances, the temperature within a sample carrier device may be held constant at a specified temperature to within ±0.1° C., ±0.25° C., ±0.5° C., ±1° C., ±2.5° C., or ±5° C. (or at any tolerance within this range). In some instances, the temperature within a sample carrier device (e.g., a microfluidic device) may be ramped at a rate of 0.1° C./s, 0.5° C./s, 1° C./s, 5° C./s, 10° C./s, 50° C./s, 100° C./s, 500° C./s, or 1000° C./s (or at any temperature ramp rate within this range) (see, e.g., Miralles, et al. (2013), "A Review of Heating and Temperature Control in Microfluidic Systems: Techniques and Applications", *Diagnostics* 3:33-67).

Motion control modules: In some instances, a system configured to implement the methods disclosed herein may comprise one or more motion control modules (or motion controllers) configured to control the position of one or more sample carrier devices relative to an imaging module objective lens, or to control the position of an imaging module objective lens relative to one or more sample carrier devices. In some instances, the motion control module may control the position of the sample carrier device in one dimension, two dimensions, or three dimensions (e.g., in the X-, Y-, and/or Z-directions) relative to the imaging module objective lens, or vice versa. In some instances, the motion control module may separately or additionally control a degree of rotation of the sample carrier device in one, two, or three dimensions. In some instances, the motion control module may be interfaced with an imaging module to also provide control of an autofocus mechanism. For example, the motion control module may be configured to adjust the focal plane by moving the sample carrier device and/or by moving an objective lens (or other optical component) of the imaging module. In some instances, the motion control module may be interfaced with an imaging module to reposition a sample carrier device in the sample plane (e.g., the X-Y plane) between acquisition of a series of images that are subsequently used to create a composition image having a larger effective field-of-view than that of an individual image (e.g., to perform imaging tiling). In some instances, the motion control module may be interfaced with an imaging module to reposition a sample carrier device in a direction parallel to the optical axis of the imaging module (e.g., in the Z-direction) between acquisition of a series of images that are subsequently used to create a three dimensional representation of the sample (e.g., to perform volumetric imaging).

In some instances, the motion control module may comprise one or more (e.g., one, two, three, or more than three) translation stages, one or more (e.g., one, two, three, or more than three) rotational stages, one or more (e.g., one, two, three, or more than three) linear encoders, one or more (e.g., one, two, three, or more than three) rotary encoders, associated motors and control electronics, or any combination thereof. In some instances, the motion control module may further control components of the imaging module such as an automated microscope objective lens turret or slide, an automated microscope tube lens turret or slide, or a microscope turret-mounted focus adjustment mechanism.

Suitable translation stages are commercially available from a variety of vendors, for example, Parker Hannifin. Precision translation stage systems typically comprise a combination of several components including, but not limited to, linear actuators, optical encoders, servo and/or stepper motors, and motor controllers or drive units. High precision and repeatability of stage movement is required for the systems and methods disclosed herein in order to ensure accurate and reproducible positioning and imaging of, e.g., fluorescence signals when interspersing repeated steps of reagent delivery and optical detection.

System control module: In some instances, a system configured to implement the methods disclosed herein may comprise one or more system control modules (or system controllers) configured to synchronize and control data communication between other functional units of the system, e.g., the one or more imaging modules, one or more fluidics modules, one or more temperature control modules, one or more motion control modules, or any combination thereof. In some instances, a system control module may comprise one or more processors, one or more power supplies, one or more wired and/or wireless data communication interfaces, one or more memory storage devices, one or more user interface devices (e.g., keyboards, mice, displays, etc.), or any combination thereof. In some instances, the system control function may be provided by an external computer or computer system. In some instances, the one or more system control modules may interface with one or more external computers or computer systems.

System chassis and housing: As noted above, in some instances, the system may comprise an integrated system, e.g., where the different functional subsystems are mounted on a single framework or chassis, and packaged within a single housing. In some instances, the system may comprise an integrated optofluidic system. In some instances, the system may comprise a modular system, e.g., where the different functional subsystems are mounted on separate frameworks or chassis, and packaged in separate housings. The chassis may be constructed using any of a variety of materials (e.g., extruded aluminum or steel framing) and techniques (e.g., using fasteners, soldering, welding, etc.) known to those of skill in the art. Similarly, the housing (or enclosure) may be constructed using any of a variety of materials (e.g., sheet metal, plastic, etc.) and techniques (e.g., sheet metal bending, molding, etc.) known to those of skill in the art.

Software for Performing Multi-Resolution Decoding:

Also disclosed herein is software (e.g., stored on a non-transitory, computer readable storage medium) configured to instruct a system to perform any of the multi-resolution decoding methods described herein. In some instances, the software may comprise system control software and/or data analysis and visualization software.

System control software: In some instances, the disclosed systems may comprise a processor or computer and computer-readable media that includes code for providing a user interface as well as manual, semi-automated, or fully-automated control of all system functions, e.g. control of one or more imaging modules (or commercial imaging instruments, e.g., microscopes), one or more fluid control modules, one or more temperature control modules, etc. As noted above, in some instances, the system processor or computer may be an integrated component of the system (e.g., a microprocessor or mother board embedded within a system control module). In some instances, the processor or computer may be a stand-alone personal computer or laptop computer. Examples of imaging system control functions that may be provided by the system control software include, but are not limited to, autofocus capability, control of illumination or excitation light exposure times and intensities, control of image acquisition rate, exposure time, data storage options, and the like. Examples of fluid flow control functions that may be provided by the system control software include, but are not limited to, volumetric fluid flow rates, fluid flow velocities, the timing and duration for sample and reagent additions, rinse steps, and the like. Examples of temperature control functions that may be provided by the system control software include, but are not limited to, specifying temperature set point(s) and control of the timing, duration, and ramp rates for temperature changes. Examples of motion control functions that may be provided by the system control software include, but are not limited to, range of travel, translation stage velocity, translation stage acceleration, translation stage positioning accuracy, degree of rotation, rate of rotation, rate of rotational acceleration, rotational stage positioning accuracy, and the like.

Data analysis software: In some instances, the disclosed systems may comprise one or more data analysis and visualization software packages. Examples include, but are not limited to image processing software, image analysis software, statistical analysis software, data visualization and display software, and the like.

Examples of image processing and analysis capability that may be provided by the software include, but are not limited to, manual, semi-automated, or fully-automated image exposure adjustment (e.g. white balance, contrast adjustment), manual, semi-automated, or fully-automated image noise adjustment (e.g., signal-averaging, filtering, and/or other noise reduction functionality, etc.), manual, semi-automated, or fully-automated edge detection and object identification (e.g., for identifying clusters of amplified template nucleic acid molecules on a substrate surface), manual, semi-automated, or fully-automated signal intensity measurements and/or thresholding in one or more detection channels (e.g., one or more fluorescence emission channels), manual, semi-automated, or fully-automated statistical analysis (e.g., for comparison of signal intensities to a reference value for base-calling purposes).

Any of a variety of image processing and analysis algorithms known to those of skill in the art may be used to implement real-time or post-processing image analysis capability. Examples include, but are not limited to, the Canny edge detection method, the Canny-Deriche edge detection method, first-order gradient edge detection methods (e.g. the Sobel operator), second order differential edge detection methods, phase congruency (phase coherence) edge detection methods, other image segmentation algorithms (e.g. intensity thresholding, intensity clustering methods, intensity histogram-based methods, etc.), feature and pattern recognition algorithms (e.g. the generalized Hough transform for detecting arbitrary shapes, the circular Hough transform, etc.), and mathematical analysis algorithms (e.g. Fourier transform, fast Fourier transform, wavelet analysis, auto-correlation, etc.), or combinations thereof.

Any of a variety of statistical analysis methods known to those of skill in the art may be used in processing data generated by performing the disclosed methods. Examples include, but are not limited to, clustering, eigenvector-based analysis, regression analysis, probabilistic graphical modeling, or any combination thereof.

In some instances, the system control and data analysis software (e.g., image processing/analysis software, statistical analysis software, etc.) may be written as separate software modules. In some instances, the system control and image processing/analysis software may be incorporated into an integrated software package.

Figure 13:
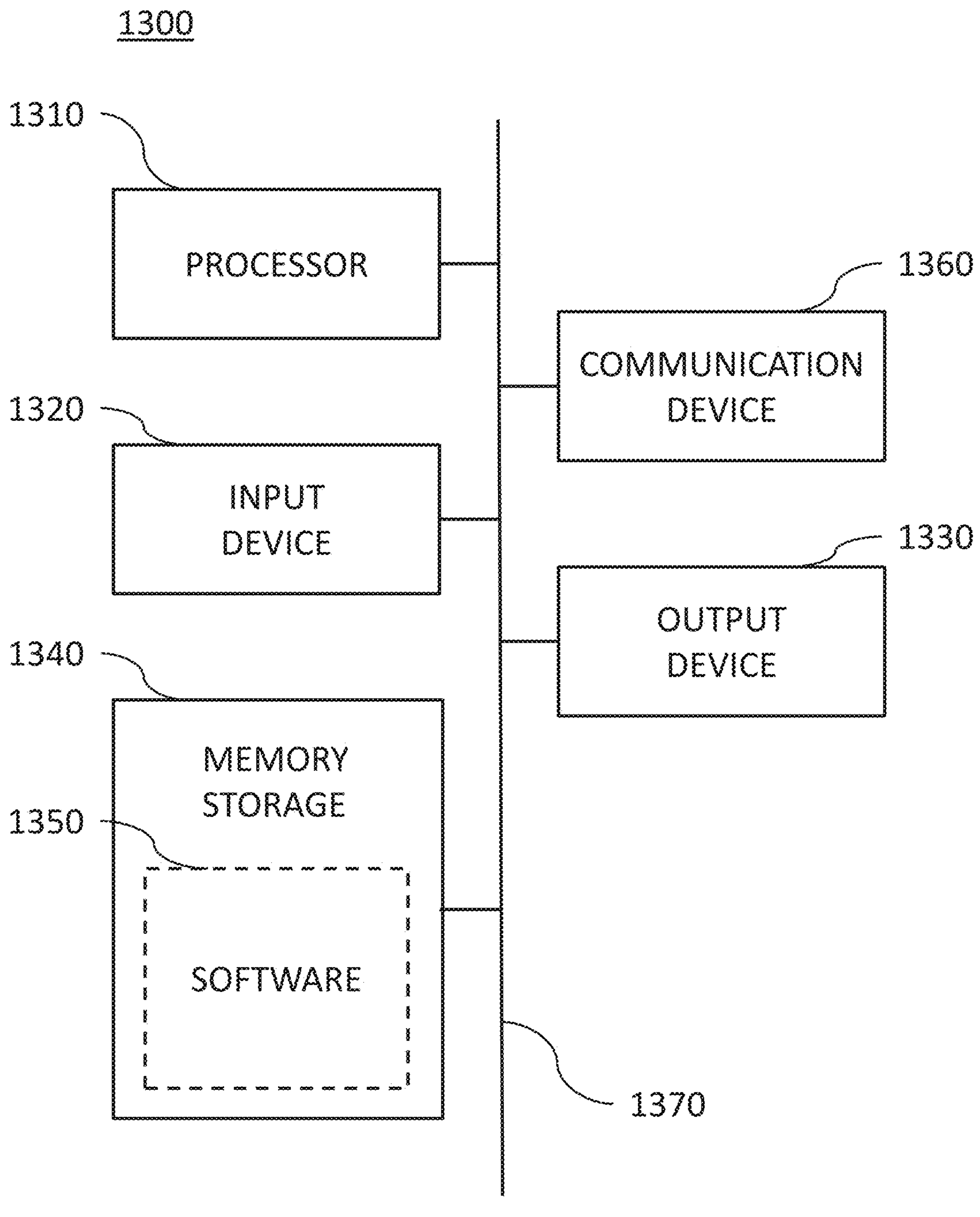
FIG. 13 depicts an exemplary computing device, in accordance with some instances of the systems described herein.

Processors and Computer Systems:

FIG. 13 illustrates an example of a computing device or system in accordance with one or more examples of the disclosure. Device 1300 can be a host computer connected to a network. Device 1300 can be a client computer or a server. As shown in FIG. 13, device 1300 can be any suitable type of microprocessor-based device, such as a personal computer, workstation, server, or handheld computing device (portable electronic device), such as a phone or tablet. The device can include, for example, one or more of processor 1310, input device 1320, output device 1330, memory/storage 1340, and communication device 1360. Input device 1320 and output device 1330 can generally correspond to those described above, and they can either be connectable or integrated with the computer.

Input device 1320 can be any suitable device that provides input, such as a touch screen, keyboard or keypad, mouse, or voice-recognition device. Output device 1330 can be any suitable device that provides output, such as a touch screen, haptics device, or speaker.

Storage 1340 can be any suitable device that provides storage, such as an electrical, magnetic, or optical memory including a RAM, cache, hard drive, or removable storage disk. Communication device 1360 can include any suitable device capable of transmitting and receiving signals over a network, such as a network interface chip or device. The components of the computer can be connected in any suitable manner, such as via a physical bus 1370 or wirelessly.

Software 1350, which can be stored in memory/storage 1340 and executed by processor 1310, can include, for example, the programming that embodies the functionality of the present disclosure (e.g., as embodied in the devices described above).

Software 1350 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1340, that can contain or store programming for use by or in connection with an instruction execution system, apparatus, or device.

Software 1350 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1300 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 1300 can implement any operating system suitable for operating on the network. Software 1350 can be written in any suitable programming language, such as C, C++, Java, or Python. In various implementations, application software embodying the functionality of the present disclosure can be deployed in different configurations, such as in a client/server arrangement or through a web browser as a web-based application or web service, for example.

EXAMPLES

The following examples are included for illustrative purposes only and are not intended to limit the scope of the present disclosure.

Example 1: Decoding Methods Using Multi-Resolution Images

This example describes three exemplary decoding approaches to performing multi-resolution in situ decoding. Three exemplary approaches for performing multi-resolution decoding are provided in FIG. 6, FIG. 8, and FIG. 10 (referred to as Schemes 1, 2, and 3 respectively). Based on these decoding scenarios and using the set of image acquisition settings provided in Table 1, the total time required to acquire images over N decoding cycles in C color channels was calculated. Additionally, the total data storage requirement and reduction in data storage requirement was also calculated and compared to decoding approaches that utilize only high resolution ("high res standard") or low resolution images ("low res standard").

As shown in Table 2, shorter total imaging times and smaller data storage requirements may be achieved by using a multi-resolution decoding process as described herein.

TABLE 1

| Exemplary image acquisition settings | | |
|---|---|---|
| Magnification (High-res mult) | M | 16 |
| Number cycles | N | 20 |
| Number channels | C | 4 |
| Field of views | F | 25 |
| Exposure time | Te | 10 ms |
| Stage translation time (avg) | Ts | 15 ms |
| Number of z-slices | Z | 15 |
| Image width (pixels) | | 2000 |
| Image height (pixels) | | 2000 |
| Bit depth | | 16 |
| Data compression factor | | 0.5 |

TABLE 2

Exemplary time and data requirements

| | Imaging time (seconds) | Speedup | Data Size (GB) | Data Size Reduction | Data Rate (MB/s) |
|---|---|---|---|---|---|
| High-res standard | 5346.0 | | 1810.5 | | 346.791 |
| Low-res standard | 334.1 | | 113.2 | | 346.791 |
| Scheme 1 | 396.0 | 13.5 | 134.1 | 0.074 | 346.791 |
| Scheme 2 | 577.5 | 9.3 | 195.6 | 0.108 | 346.791 |
| Scheme 3 | 311.5 | 17.2 | 96.5 | 0.053 | 317.177 |

It should be understood from the foregoing that, while particular implementations of the disclosed methods and systems have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

What is claimed is:

1. A method comprising:

receiving a series of first images of a biological sample, wherein the first images of the series of first images have a first optical resolution, wherein the series of first images comprises a z-stack of images, and wherein the series of first images is acquired using an image sensor;

identifying locations for a plurality of target analytes based on the series of first images;

receiving at least one second image of the biological sample, wherein the at least one second image has a second optical resolution that is the same as the first optical resolution, the at least one second image corresponding to at least one decoding cycle of a plurality of decoding cycles used for in situ decoding of the plurality of target analytes, wherein the at least one second image is acquired using the image sensor, and wherein the at least one second image is computationally downsampled after acquisition to a lower optical resolution; and extracting feature data associated with all or a portion of the plurality of target analytes from the at least one second image based on the locations for the plurality of target analytes identified in the series of first images.

2. The method of claim 1, further comprising using the feature data extracted from the at least one second image to decode the plurality of target analytes.

3. The method of claim 1, wherein locations for all target analytes of the plurality of target analytes are identified based on the series of first images.

4. The method of claim 1, wherein feature data associated with all of the plurality of target analytes is extracted from at least one second image.

5. The method of claim 1, wherein the feature data comprises signal intensity data.

6. The method of claim 1, wherein the series of first images comprises signals detected from a plurality of probes associated with all target analytes.

7. The method of claim 1, wherein the extraction of feature data from the at least one second image comprises identifying a region of interest (ROI) in the at least one second image for each location of a target analyte identified in the series of first images.

8. The method of claim 1, wherein the series of first images comprises a series of images acquired in different detection channels.

9. The method of claim 1, wherein the series of first images comprises a series of images acquired of different fields of view.

10. A system comprising:

one or more processors; and a non-transitory computer readable storage medium communicatively coupled to the one or more processors and configured to store instructions that, when executed by the one or more processors, cause the one or more processors to perform a method comprising:

receiving a series of first images of a biological sample, wherein the first images of the series of first images have a first optical resolution, and wherein the series of first images comprises a z-stack of images;

identifying locations for a plurality of target analytes based on the series of first images;

receiving at least one second image of the biological sample, wherein the at least one second image has a second optical resolution that is the same as the first optical resolution, the at least one second image corresponding to at least one decoding cycle of a plurality of decoding cycles used for in situ decoding of the plurality of target analytes, and wherein the at least one second image is computationally downsampled after acquisition to a lower optical resolution; and extracting feature data associated with all or a portion of the plurality of target analytes from the at least one second image based on the locations for the plurality of target analytes identified in the series of first images.

11. The system of claim 10, wherein the instructions further comprise using the feature data extracted from the at least one second image to decode the plurality of target analytes.

12. The system of claim 10, wherein the system further comprises a first image sensor, wherein the series of first images and the at least one second image are received from the first image sensor.

13. The system of claim 10, wherein the feature data comprises signal intensity data.

14. The system of claim 10, wherein the series of first images comprises signals detected from a plurality of probes associated with all target analytes.

15. The system of claim 10, wherein extracting feature data from the at least one second image comprises identifying a region of interest (ROI) in the at least one second image for each location of a target analyte identified in the series of first images.

16. The system of claim 10, wherein the series of first images comprises a series of images acquired in different detection channels.

17. A method comprising:

receiving a plurality of high-resolution images of a sample during at least a first cycle of fluorescent probing of the sample, wherein the plurality of high-resolution images comprises at least one z-stack of images representing a volume of the sample, wherein the plurality of high-resolution images is acquired using an image sensor, and wherein the plurality of high-resolution images comprises a first plurality of light signals representing a plurality of probes bound to a plurality of analytes within the sample;

determining first positional information of the first plurality of light signals from the at least one high-resolution image;

receiving at least one low-resolution image of the sample during at least a second cycle of fluorescent probing of the sample, wherein receiving the at least one low-resolution image comprises acquiring, using the image sensor, at least one additional high-resolution image during the at least a second cycle of fluorescent probing, and generating the at least one low-resolution image by downsampling the at least one additional high-resolution image; and determining a second plurality of light signals within the at least one low-resolution image based on the first positional information, wherein the second plurality of light signals comprises two or more colors.

18. The method of claim 17, wherein the at least one low-resolution image comprises a resolution of about 0.50 μm/pixel to about 0.80 μm/pixel.

19. The method of claim 17, wherein the high-resolution images of the plurality of high-resolution images comprise a resolution of about 0.10 μm/pixel to about 0.30 μm/pixel.

20. The method of claim 17, further comprising determining at least one codeword based on the first plurality of light signals and the second plurality of light signals.

21. The method of claim 20, further comprising assigning a transcript based on the determined codeword.

22. The method of claim 17, wherein the at least a first cycle comprises an anchor cycle.

23. The method of claim 17, wherein the at least a first cycle comprises two or more probing cycles, wherein the first plurality of light signals comprises two or more colors.

24. The method of claim 17, wherein the at least a second cycle comprises a probing cycle.

25. The method of claim 17, wherein the sample comprises a tissue sample.

* * * * *